United States Patent
Ohgaru et al.

(10) Patent No.: US 7,839,569 B2
(45) Date of Patent: Nov. 23, 2010

(54) POLARIZING PLATE AND LIQUID CRYSTAL DISPLAY

(75) Inventors: Ikuko Ohgaru, Minami-Ashigara (JP); Hiroaki Sata, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 958 days.

(21) Appl. No.: 11/659,576

(22) PCT Filed: Sep. 13, 2005

(86) PCT No.: PCT/JP2005/017240

§ 371 (c)(1), (2), (4) Date: Feb. 7, 2007

(87) PCT Pub. No.: WO2006/033313

PCT Pub. Date: Mar. 30, 2006

(65) Prior Publication Data
US 2007/0258141 A1    Nov. 8, 2007

(30) Foreign Application Priority Data
Sep. 22, 2004  (JP) .................... 2004-276108

(51) Int. Cl.
    G02B 5/30  (2006.01)
(52) U.S. Cl. .................. 359/494; 349/96; 359/500; 428/1.31
(58) Field of Classification Search ........... 349/96–103, 349/FOR. 114; 359/483, 485, 494, 497, 359/500, 501; 428/1.3, 1.31, 1.33
    See application file for complete search history.

(56) References Cited

U.S. PATENT DOCUMENTS

| | | | |
|---|---|---|---|
| 6,577,361 B1 * | 6/2003 | Sekiguchi et al. | 349/96 |
| 2003/0214624 A1 * | 11/2003 | Fujii et al. | 349/158 |
| 2007/0048461 A1 * | 3/2007 | Nakajima et al. | 428/1.31 |

FOREIGN PATENT DOCUMENTS

| | | | | |
|---|---|---|---|---|
| EP | 0 911 656 A2 | 4/1999 | | |
| JP | 04277719 | * 10/1992 | ........ | 349/FOR. 114 |
| JP | 2587398 B2 | 12/1996 | | |
| JP | 2002-71957 A | 3/2002 | | |
| JP | 2002-333523 A | 11/2002 | | |
| JP | 2003-270442 A | 9/2003 | | |
| WO | WO 2004/013667 A1 | 2/2004 | | |
| WO | WO 2004/050751 A1 | 6/2004 | | |

OTHER PUBLICATIONS

International Search Report.

* cited by examiner

*Primary Examiner*—Frank G Font
(74) *Attorney, Agent, or Firm*—Buchanan Ingersoll & Rooney PC

(57) ABSTRACT

A polarizing plate comprising a polarizer comprising polyvinyl alcohol and a protective film on at least one side of the polarizer, the polarizer having a difference of 5.0% or smaller between maximum and minimum of an in-plane phase difference Rpva thereof in any area thereof measuring 39 cm wide and 65 cm long.

15 Claims, 1 Drawing Sheet

POLARIZING PLATE AND LIQUID CRYSTAL DISPLAY

TECHNICAL FIELD

This invention relates to a polarizing plate having a polarizer with a substantially uniform in-plane phase difference and a liquid crystal display (hereinafter, LCD) freed of streaky unevenness of density by use of the polarizing plate.

BACKGROUND ART

LCDs are widely applied to monitors of personal computers, mobile devices, and TV sets in view of various advantages such as low voltage, low power consumption, and allowing for size and thickness reduction. Various modes have been proposed for LCDs according to the alignment of liquid crystal molecules in a liquid crystal cell. A twisted nematic (TN) mode has been the mainstream, in which the orientation direction of liquid crystal molecules is twisted from one side to the other side of the cell at about 90°.

An LCD is generally composed of a liquid crystal cell, an optical compensation film, and a polarizer. The optical compensation film, which serves to eliminate image discoloration or widen the viewing angle, includes a stretched birefringent film and a transparent film coated with a liquid crystal compound. Japanese Patent 2587398 discloses a viewing angle widening technique using, in a TN mode liquid crystal cell, an optical compensation film prepared by applying a discotic liquid crystal compound to a triacetyl cellulose film, aligning the liquid crystal molecules, and fixing the alignment. Even such a latest technique is still unsatisfactory, however, in applications to LCD TVs that are expected to have a wide screen and be seen from wide angles and therefore strictly required to have reduced viewing angle dependence. Under this situation, LCD modes different from the TN mode have been studied, including an IPS (in-plane switching) mode, an OCB (optically compensatory bend) mode, and a VA (vertically aligned) mode. In particular, a VA mode is attracting attention for application to TV monitors because of its high contrast and relatively high production yield.

In general, polyvinyl alcohol (hereinafter, PVA) is mostly used as a material of a polarizer essential to LCDs. PVA film is uniaxially stretched followed by dyeing with iodine or a dichroic dye, or dyeing may precede stretching, further followed by crosslinking with a boron compound to make a polarizer (polarizing film).

A cellulose acylate film is characterized by having higher optical isotropy (a low retardation value) compared with other polymer films. It is therefore common to use a cellulose acylate film in applications demanding optical isotropy such as a protective film of a polarizing plate.

To the contrary, optical anisotropy (a higher retardation value) is required of the optical compensation film (retardation film). An optical compensation film for a VA mode, in particular, is required to have a front retardation (Re) of 30 to 200 nm and a thickness direction retardation (Rth) of 70 to 400 nm. Hence, a synthetic polymer film with a high retardation value, such as polycarbonate film or polysulfone film, has usually been used as an optical compensation film.

In short, it has been a general principle in the field of optical materials to use a synthetic polymer film where optical anisotropy (a high retardation value) is demanded and to use cellulose acylate film where optical isotropy (a low retardation value) is demanded.

Contrary to the general principle, EP 911656 proposes a cellulose acetate film having a high retardation value and useful in applications demanding optical anisotropy. According to the proposal, a high retardation value of a cellulose triacetate film is achieved by adding an aromatic compound having at least two aromatic rings, especially a compound having a 1,3,5-triazine ring, as a retardation increasing agent to cellulose triacetate and stretching the resulting film. Because cellulose triacetate is generally difficult to stretch, it is known difficult to increase the birefringence of cellulose triacetate by stretching. According to the EP, co-stretching the additive allows for increasing the birefringence to achieve a high retardation value. The resulting film also functions as a protective film of a polarizing plate, thereby providing a competitive, slim LCD.

JP-A-2002-71957 discloses an optical film containing a cellulose ester having acyl groups having 2 to 4 carbon atoms as substituents. The acyl group substituents satisfy relations: $2.0 \leq A+B \leq 3.0$ and $A<2.4$, where A is the substitution degree of acetyl, and B is the substitution degree of propionyl or butyryl. The refractive index Nx in the slow axis direction and the refractive index Ny in the fast axis direction of the optical film, both at 590 nm, satisfy the relationship: $0.0005 \leq Nx-Ny \leq 0.0050$.

JP-A-2003-270442 discloses a polarizing plate for use in a VA mode LCD. The polarizing plate comprises a polarizer and an optically biaxial, mixed fatty acid cellulose ester film. The polarizing plate is placed with the cellulose ester film between a liquid crystal cell and the polarizer.

JP-A-2002-333523 discloses a polarizing plate having an in-plane phase difference (Δnd) of 500 to 1000 nm and an LCD having the polarizing plate. The proposed polarizing plate exhibits high contrast characteristics and high dimensional stability due to reduced residual stress.

The above-described related art techniques are effective in providing inexpensive and thin LCDs. On the other hand, LCD technology has recently been rapidly increasing application to televisions. Since LCD-TVs have a brighter backlight than other LCD monitors, display unevenness is more outstanding. In particular, a wide-screen LCD-TV requires a wide and yet uniform screen properties. Therefore, a polarizing plate for these applications is required to have a wide area with uniform quality.

The currently available, wide polarizing plates lack uniformity of stretching, that is, they suffer uneven stretching. The uneven stretching is primarily attributed to uneven alignment of PVA. The unevenness can be evaluated in terms of variation of PVA's in-plane retardation Rpva that correlates to the PVA's degree of alignment.

The stretch alignment unevenness in PVA is apt to occur in the direction perpendicular to the stretching direction and appears as streaky unevenness in density when an LCD is lit from the back. Use of such a polarizing plate in a wide-screen LCD results in streaky defects on the screen. Hence, development of a polarizing plate with little stretch alignment unevenness in PVA has been demanded.

JP-A-2002-333523 supra specifies the in-plane retardation of a polarizing plate and proposes a process of producing a polarizing plate with sufficient optical characteristics but gives no considerations to uniformity of the in-plane retardation value.

DISCLOSURE OF THE INVENTION

An object of the present invention is to provide a polarizing plate that performs an excellent optically compensatory function and uniform quality even with an increased area and to provide an LCD using the polarizing plate.

As a result of extensive investigations, the present inventors have found that the above object is accomplished by using a polarizer involving small unevenness of stretch alignment of a PVA film.

The present invention provides a polarizing plate having a polarizer comprising polyvinyl alcohol and a protective film on at least one side of the polarizer. The polarizer has a difference of 5.0% or smaller between the maximum and the minimum of an in-plane phase difference Rpva thereof in any area measuring 39 cm wide and 65 cm long.

The present invention provides preferred embodiments of the polarizing plate, in which:

(1) The difference of the in-plane phase difference Rpva between any two points 1 cm apart is 10 nm or smaller.

(2) The polarizer is produced by a process including the step of swelling before the step of stretching, and the step of stretching is biaxial stretching.

(3) The protective film on one side of the polarizer has a front retardation value Re (590) and a thickness direction retardation value Rth(590), both at a wavelength of 590 nm, satisfying formulae (1) and (2), respectively:

$$20\ \mathrm{nm} \leq Re(590) \leq 200\ \mathrm{nm} \tag{1}$$

$$70\ \mathrm{nm} \leq Rth(590) \leq 400\ \mathrm{nm} \tag{2}$$

(4) The ratio of the Re(590) to the Rth(590) is 0.1 to 0.8.

(5) The protective film on one side of the polarizer is a cellulose acylate film containing, as a main polymer component, a cellulose mixed fatty acid ester having an acetyl group and an acyl group containing at least three carbon atoms substituting the hydroxyl groups of cellulose. The cellulose mixed fatty acid ester satisfies formulae (3) and (4):

$$2.0 \leq A+B \leq 3.0 \tag{3}$$

$$0 < B \tag{4}$$

wherein A is the degree of substitution by an acetyl group; and B is the degree of substitution by an acyl group having 3 or more carbon atoms.

(6) The acyl group having at least three carbon atoms is a butanoyl group.

(7) The acyl group having at least three carbon atoms is a propionyl group.

(8) The protective film on one side of the polarizer is a film of a cellulose acylate having acyl groups containing at least two carbon atoms and satisfying formulae (5) and (6):

$$2.0 \leq DS2+DS3+DS6 \leq 3.0 \tag{5}$$

$$DS6/(DS2+DS3+DS6) \geq 0.315 \tag{6}$$

wherein DS2, DS3, and DS6 represent the degree of substitution of the hydroxyl groups at the 2-position, 3-position and 6-position, respectively, of a glucose unit constituting cellulose by the acyl group.

(9) The acyl group as referred to in (8) above is an acetyl group.

(10) The protective film on one side of the polarizer contains at least one of a plasticizer, an ultraviolet absorber, a release agent, a dye, and a matting agent.

(11) The protective film on one side of the polarizer contains at least one retardation developing agent selected from a rod-like compound and a discotic compound.

(12) The protective film on one side of the polarizer comprises a polymer film and an optically anisotropic layer.

(13) The polarizing plate further comprises at least one of a hard coat layer, an antiglare layer, and an antireflective layer on a protective film disposed on the other side of the polarizer.

(14) The polarizing plate further comprises a phase difference film stuck to the protective film on one side of the polarizer via an adhesive.

The present invention also provides an LCD having the polarizing plate of the present invention with the protective film facing a liquid crystal cell.

The polarizing plate according to the present invention involves reduced unevenness of stretch alignment of the polarizer. Use of the polarizing plate of the invention provides an LCD having a uniform display quality even with a wide area.

Figure 1:
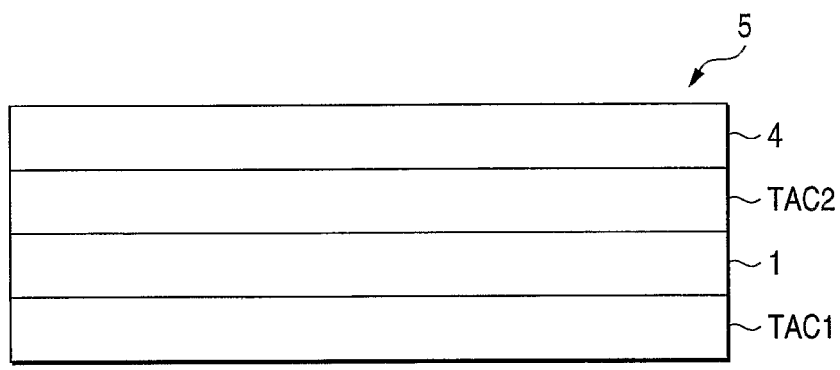
FIG. 1 schematically illustrates a layer structure of an embodiment of the polarizing plate according to the present invention.

Reference numerals used to identify various structural features in the drawings include the following.

1, 11, 21: Polarizer
4: Functional layer
5, 15, 25: Polarizing plate

BEST MODE FOR CARRYING OUT THE INVENTION

The polarizing plate of the present invention has a polarizer comprising polyvinyl alcohol and a protective film on at least one side of the polarizer. The polarizer has a difference of 5.0% or smaller between the maximum and the minimum of an in-plane phase difference Rpva thereof in any area thereof measuring 39 cm wide and 65 cm long.

The area of 39 cm in width and 65 cm in length as referred to in the invention corresponds to the screen of a 30-in. LCD TV and can be seen as a measure of evaluating applicability to a wide screen LCD.

A polarizing plate is generally composed of a polarizer and a transparent protective film disposed on each side of the polarizer. The polarizing plate of the invention preferably has a specific optical cellulose acylate film (described later) as a protective film on at least one side of the polarizer. The protective film on the other side may be the specific cellulose acylate film or an ordinary cellulose acylate film. In the present invention, the uniform display quality of the polarizing plate is achieved by reducing the thickness variation in the width direction of the polarizer.

Polarizers include an iodine polarizer, a dichroic polarizer, and a polyene polarizer. The iodine polarizer and the dichroic polarizer are generally prepared using PVA film. The polarizer that can be used in the invention is preferably a PVA-based dichroic polarizer composed of PVA and dichroic molecules.

PVA is a polymeric material obtained by saponification of polyvinyl acetate. It may contain a component copolymerizable with vinyl acetate, such as an unsaturated carboxylic acid, an unsaturated sulfonic acid, an olefin or a vinyl ether. A modified PVA containing an acetoacetyl group, a sulfonic acid group, a carboxyl group, an oxyalkylene group, etc. is useful as well.

The degree of saponification of the PVA is preferably, but not limited to, 80 to 100 mol %, still preferably 90 to 100 mol %. The degree of polymerization of the PVA is preferably 1000 to 3800, still preferably 1500 to 3800.

The PVA preferably has a degree of syndiotacticity of 55% or higher to have improved durability as taught in Japanese Patent 2978219. PVA having a degree of syndiotacticity of 45 to 52.5% as described in Japanese Patent 3317494 is also used preferably.

The PVA-based dichroic polarizer is preferably prepared by first forming PVA into film, followed by introduction of dichroic molecules. PVA film is preferably prepared, as is commonly practiced, by casting a PVA solution in water or an organic solvent. The concentration of the PVA solution is usually 5 to 20% by weight. Casting the PVA solution gives PVA film having a thickness of 10 to 200 μm. For the details of PVA film formation, reference can be made to Japanese Patent 3342516, JP-A-9-328593, JP-A-13-302817, and JP-A-14-144401.

The crystallinity of the PVA film is not particularly limited. The PVA film having an average crystallinity (Xc) of 50% to 75% by weight disclosed in Japanese Patent 3251073 and the PVA film having a crystallinity of 38% or less disclosed in JP-A-14-236214 can be used, for example.

The birefringence (Δn) of the PVA film is preferably as small as possible. The PVA film having a birefringence of $1.0 \times 10^{-3}$ or smaller described in Japanese Patent 3342156 is preferably used. Otherwise a PVA film having a birefringence of 0.02 to 0.01 may be used to obtain a high polarization while avoiding a break during film stretching as proposed in JP-A-14-228835, or a PVA film having a birefringence satisfying formula: $0.0003 \leq (nx+ny)/2-nz \leq 0.01$ may be used as taught in JP-A-14-60505. The PVA film preferably has an in-plane retardation of 0 to 100 nm, still preferably 0 to 50 nm, and a thickness direction retardation Rth of 0 to 500 nm, still preferably 0 to 300 nm.

Other PVA films that are preferably used in the invention to make a polarizer include one having a 1,2-glycol bond content of 1.5 mol % or less as described in Japanese Patent 3021494, one containing not more than 500 optically foreign particles of 5 μm or greater per 100 cm$^2$ as described in JP-A-13-316492, one prepared by high-temperature waterjet cutting with a waterjet temperature variation of 1.5° C. or smaller in the TD as proposed in JP-A-14-30163, one prepared from a PVA solution containing 1 to 100 parts by weight of a tri- to hexahydric alcohol, e.g., glycerin, and one prepared from a PVA solution containing at least 15% by weight of a plasticizer based on PVA as disclosed in JP-A-6-289225.

The thickness of the unstretched PVA film is not particularly limited but is preferably 1 μm to 1 mm, more preferably 20 to 200 μm, from the standpoint of handling stability and stretch uniformity. It is possible to use such a thin PVA film as to generate a stress of 10 N or less when 4 to 6 fold stretched in water as described in JP-A-14-236212.

The dichroic molecules that can be preferably used to stain the PVA film include higher-order iodide ions, such as $I_3^-$ or $I_5^-$, and dichroic dyes. Higher order iodide ions are particularly preferred in the present invention. As described in Nagata Ryo (ed.), *Henkoban no oyo*, CMC Publishing Co., Ltd. and *Kogyo zairyo*, vol. 28, No. 7, pp. 39-45, PVA film is immersed in a potassium iodide aqueous solution having iodine dissolved therein and/or a boric acid aqueous solution to have higher order iodide ions absorbed and aligned in the PVA film.

In using a dichroic dye as dichroic molecules, azo dyes, particularly bisazo dyes and trisazo dyes are preferred. It is preferred for the dichroic dye to be water soluble. To obtain a water soluble dichroic dye, a hydrophilic substituent, such as a sulfonic acid group, an amino group or a hydroxyl group, may be introduced into the dichroic molecules to make the form of a free acid or a salt with an alkali metal, an ammonium or an amine.

Examples of useful dichroic dyes include benzidine dyes, such as C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151, and C.I. Direct Green 1; diphenylurea dyes, such as C.I. Direct Yellow 44, C.I. Direct Red 23, and C.I. Direct Red 79; stilbene dyes, such as C.I. Direct Yellow 12; dinaphthylamine dyes, such as C.I. Direct Red 31; and J acid dyes, such as C.I. Direct Red 81, C.I. Direct Violet 9, and C.I. Direct Blue 78.

Further included are C.I. Direct Yellow 8, C.I. Direct Yellow 28, C.I. Direct Yellow 86, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red 2, C.I. Direct Red 39, C.I. Direct Red 83, C.I. Direct Red 89, C.I. Direct Red 240, C.I. Direct Red 242, C.I. Direct Red 247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 168, C.I. Direct Blue 202, C.I. Direct Blue 236, C.I. Direct Blue 249, C.I. Direct Blue 270, C.I. Direct Green 59, C.I. Direct Green 85, C.I. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54, and the dichroic dyes disclosed in JP-A-62-70802, JP-A-1-161202, JP-A-1-172906, JP-A-1-172907, JP-A-1-183602, JP-A-1-248105, JP-A-1-265205, and JP-A-7-261024. Two or more of dichroic dyes may be used to create a desired hue. In using a dichroic dye, the adsorption thickness may be 4 μm or larger as described in JP-A-14-82222.

The dichroic molecule content in the PVA film is usually in the range of from 0.01% to 5% by weight based on the PVA matrix. Too small a dichroic molecule content results in low polarization, and too large a dichroic molecule content results in reduction of transmission.

The polarizer preferably has a thickness of 5 to 40 μm, still preferably 10 to 35 μm. It is a preferred manipulation that the thickness ratio of polarizer to protective film (described later) be 0.01 to 0.16 as proposed in JP-A-14-174727.

The polarizing plate may further has an adhesive layer, a separate sheet, and a releasable protective sheet in addition to the above-described polarizer and a protective film hereinafter described.

The polarizing plate is produced as follows. The polarizing plate is preferably produced by a process including the steps of swelling, dyeing, hardening, stretching, drying, laminating with a protective film, and post-lamination drying. The order of the steps of dyeing, hardening, and stretching can be changed as desired. Two or more of the steps may be carried out simultaneously. The hardening step may be followed by washing with water as taught in Japanese Patent 3331615.

The process is preferably carried out in this order: swelling, dyeing, hardening/stretching, drying, laminating with a protective film, and post-lamination drying. In the course of, or after, these steps, the step of on-line inspection of the surface conditions may be provided.

The swelling step is preferably conducted using only water. A boric acid aqueous solution may be used to swell PVA film to a controlled degree so as to obtain stabilized optical performance and to avert wrinkling of the film. The swelling temperature and time, which are arbitrarily decided, are preferably 10° to 60° C. and 5 to 2000 seconds.

In the dyeing step, the method of JP-A-2002-86554 can be adopted. Instead of the immersion method, dyeing can also be accomplished by coating or spraying with an iodine or dye solution. The dyeing technique proposed in JP-A-13-290025 may be followed, in which a PVA film is stretched at a specific stretch ratio in a dyeing bath at a specific dye or iodine concentration at a specific bath temperature while agitating the bath.

Where higher order iodide ions are used as dichroic molecules, it is preferred to use a potassium iodide aqueous solution having iodine dissolved therein to obtain a polarizer achieving a high contrast. The iodine-potassium iodide aqueous solution preferably has an iodine concentration of 0.05 to 20 g/l, a potassium iodide concentration of 3 to 200 g/l, an iodine/potassium iodide weight ratio of 1 to 2000. The solution more preferably has an iodine concentration of 0.5 to 2 g/l, a potassium iodide concentration of 30 to 120 g/l, an iodine/potassium iodide weight ratio of 30 to 120. The dyeing with the iodine-potassium iodide aqueous solution is preferably carried out at a bath temperature of 10° to 60° C., still preferably 20° to 50° C., for 10 to 1200 seconds, still preferably 30 to 600 seconds.

The dyeing bath may contain a boron compound, such as boric acid or borax, as described in Japanese Patent 3145747.

The hardening step is preferably carried out by incorporating a crosslinking agent into the film by immersion in, or coating with, a crosslinking agent solution. The step of hardening may be effected in several divided stages as taught in JP-A-11-52130.

Useful crosslinking agents include those described in U.S. Pat. No. 232,897. Boric acid compounds are the most preferred. As proposed in Japanese Patent 3357109, a polyfunctional aldehyde may be used to improve dimensional stability, nevertheless.

In using boric acid as a crosslinking agent, a boric acid-potassium iodide aqueous solution to which metal ions are added can be used. Zinc chloride is preferably added as a metal ion source. Other zinc sources, such as zinc halides (e.g., zinc iodide) or zinc salts, e.g., zinc sulfate or zinc acetate, may be used in place of zinc chloride as proposed in JP-A-2000-35512.

In the present invention, hardening is preferably carried out by immersing the PVA film in a zinc chloride-containing boric acid-potassium iodide aqueous solution. The zinc chloride-containing boric acid-potassium iodide aqueous solution preferably has a boric acid concentration of 1 to 100 g/l, still preferably 10 to 80 g/l, a potassium iodide concentration of 1 to 120 g/l, still preferably 5 to 100 g/l, and a zinc chloride concentration of 0.01 to 10 g/l, still preferably 0.02 to 8 g/l. Hardening is preferably achieved at a solution temperature of 10° to 60° C., still preferably 20° to 50° C., for 10 to 1200 seconds, still preferably 30 to 600 seconds.

The step of stretching is preferably performed by longitudinal uniaxial stretching as described in U.S. Pat. No. 2,454,515 or tentering as described in JP-A-2002-86554. The stretch ratio is preferably 2 to 12, still preferably 3 to 10. With respect to the relation between stretch ratio, unstretched film thickness, and resulting polarizer thickness, the manipulation according to JP-A-14-40256 in which (polarizer thickness after bonding a protective film/unstretched film thickness)×(total stretch ratio)>0.17 may be used for preference. With respect to the relation between the width A of a polarizer from the final bath and the width B of the polarizer at the time of bonding a protective film, the manipulation of JP-A-14-40247 in which $0.80 \leq B/A \leq 0.95$ may be used preferably.

The alignment unevenness in the resulting PVA polarizer as a result of stretching should be within such a range that the difference between the maximum and the minimum of an in-plane phase difference Rpva is not more than 5%, i.e., from 0% up to 5.0% in any area measuring 39 cm wide and 65 cm long. The difference is preferably 0% to 4.5%. The difference is calculated from [(maximum−minimum)/minimum)]×100. It is preferred that the difference of Rpva between any two points 1 cm apart be 10 nm or smaller, namely, 10 nm/cm or smaller, still preferably 8 nm/cm or smaller. The in-plane phase difference Rpva is measured with a near infrared phase difference measurement system KOBRA-WX100/IR available from Oji Scientific Instruments.

A larger in-plane phase difference Rpva means a higher degree of alignment of PVA molecules and superior optical performance. If the difference of Rpva is greater than 5.0%, highly aligned parts and poorly aligned parts of the polarizer look differently to create streaky mottling when lit by strong light from the back in a condition of crossed Nicols. Furthermore, where the Rpva difference is steeper than 10 nm/cm, the streaky mottling will appear more clearly.

There are several means for preparing a polarizer with small stretch alignment unevenness of PVA. Such means include to provide the step of swelling before the step of dyeing and to increase the bath temperature in the dyeing and the hardening steps. By swelling or by treating at an increased temperature in the dyeing and the hardening steps, sufficient water can be given to the PVA film to be stretched so that stretching may be effected uniformly. To achieve uniform stretching, it is preferred for the PVA film immediately before being stretched to have a water content of 40% to 75% by weight. Providing the step of swelling is practically preferred to increasing the water temperature in the dyeing and the hardening steps because the increased temperature can greatly affect the optical performance of the resulting polarizer.

To conduct the step of stretching by stretching with a fixed width or by biaxial stretching is another means for obtaining a polarizer with small stretch alignment unevenness. Stretching with a fixed with is performed by holding both edges of a film with a pinch guider, a cross guider, tender clips, an expander roll, a spiral roll, etc. to prevent the film from contracting in the width direction. Biaxial stretching is stretching in both longitudinal and transverse directions, which can be carried out either simultaneously or successively. The stretch ratio is preferably 2 to 12, still preferably 3 to 10, in the longitudinal direction and 1 to 2 in the transverse direction.

The drying step is carried out in a manner known from JP-A-2002-86554. Preferred drying conditions are 30° to 100° C. in temperature and 30 seconds to 60 minutes in time. The stretched film may be subjected to a heat treatment such that the discoloration temperature in water may be 50° C. or higher as proposed in Japanese Patent 3148513, or the film may be aged in an atmosphere with a controlled temperature and humidity as disclosed in JP-A-7-325215 and JP-A-7-325218.

The step of laminating with a protective film is a step in which the polarizer from the drying step is laminated on both sides thereof with a protective film. Laminating is preferably carried out by applying an adhesive immediately before lamination and passing the films between a pair of rolls. It is preferred to adjust the moisture content of the polarizer to be laminated in order to reduce the unevenness like grooves in a record attributed to the stretching. In the present invention, the moisture content is preferably adjusted to 0.1% to 30%.

The adhesive to be used is not particularly limited. Useful adhesives include PVA resins (inclusive of modified PVA having an acetoacetyl group, a sulfonic acid group, a carboxyl group, an oxyalkylene group, etc.) and a boron compound aqueous solution, with PVA resins being preferred. The adhesive is preferably applied to a dry thickness of 0.01 to 5 μm, still preferably 0.05 to 3 μm.

In order to enhance the adhesion between the polarizer and the protective film, it is preferred to hydrophilize the protective film by surface treatment before adhesion. Surface treatment for hydrophilization can be achieved by any known method, for example, saponification with an alkali solution or corona treatment. The surface treatment may be followed by providing a primer layer of gelatin, etc. for enhancing the adhesion. As described in JP-A-14-267839, the protective film preferably has a water contact angle of 50° or smaller.

The step of drying after lamination is carried out under conditions described in JP-A-2000-86554. Preferred conditions are 30° to 100° C. in temperature and 30 seconds to 60 minutes in time. Preferably, the film may be subjected to aging in an atmosphere with a controlled humidity and temperature as proposed in JP-A-7-325220.

The polarizer thus prepared preferably has an iodine content of 0.1 to 3.0 g/m$^2$, a boron content of 0.1 to 5.0 g/m$^2$, a potassium content of 0.1 to 2.0 g/m$^2$, and a zinc content of 0 to 2.0 g/m$^2$. The potassium content may be 0.2% by weight or less as described in JP-A-13-166143. The zinc content may be 0.04% to 0.5% by weight as described in JP-A-12-35512.

The polarizer can contain an organotitanium compound and/or an organozirconium compound, which can be added in any of the steps of dyeing, stretching, and hardening, to improve the dimensional stability as proposed in Japanese Patent 3323255. A dichroic dye may be incorporated into the polarizer for the purpose of hue adjustment.

The specific cellulose acylate film that is preferably used as a protective film of the polarizing plate will then be described. Two or more different types of the cellulose acylates may be used as a mixture.

The cellulose acylate used in the invention is a mixed fatty acid ester of cellulose obtained by displacing the hydroxyl groups of cellulose with an acetyl group and an acyl group having 3 or more carbon atoms. The degrees of substitution of the hydroxyl groups by the acyl groups satisfy formulae (3) and (4):

$$2.0 \leq A+B \leq 3.0 \tag{3}$$

$$0 < B \tag{4}$$

wherein A and B each represent the degree of substitution of the hydroxyl groups by acyl groups; more specifically, A is the degree of substitution by an acetyl group, and B is the degree of substitution by an acyl group having 3 or more carbon atoms.

The glucose units linked via a β-1,4 bond to make up cellulose each have a free hydroxyl group at the 2-, 3-, and 6-positions. A cellulose acylate is a polymer with a part or all of the hydroxyl groups esterified with an acyl group. The degree of substitution by an acyl group is a proportion of esterified hydroxyl groups at each of the 2-, 3-, and 6-positions (a hundred percent esterification is a degree of substitution of 1).

The sum of the substitution degrees A and B, (A+B), ranges form 2.0 to 3.0 as represented by formula (3), preferably from 2.2 to 2.9, still preferably 2.40 to 2.85. The substitution degree B is greater than 0, preferably greater than 0.6.

Where (A+B) is smaller than 2.0, the cellulose acylate is so hydrophilic that it is susceptible to the influences of the surrounding humidity. It is preferred that 280% or more, more preferably 30% or more, even more preferably 31% or more, most preferably 32% or more, of the acyl substituents having 3 or more carbon atoms are at the 6-position of the glucose units. The sum of the substitution degrees A and B at the 6-position of the glucose units is preferably 0.75 or greater, still preferably 0.80 or greater, even still preferably 0.85 or greater.

A cellulose acylate satisfying the above-described conditions provides a film-forming solution with satisfactory solubility and filterability (i.e., low viscosity) even in a chlorine-free organic solvent.

Where the cellulose acylate film is provided as a protective film on the liquid crystal cell side of the polarizer, the cellulose acylate preferably satisfies formula (5) and (6):

$$2.0 \leq DS2+DS3 \leq 3.0 \tag{5}$$

$$DS6/(DS2+DS3+DS6) \geq 0.315 \tag{6}$$

wherein DS2, DS3, and DS6 represent the degree of substitution of the hydroxyl groups at the 2-position, 3-position and 6-position, respectively, of a glucose unit constituting cellulose by an acyl group.

With the formulae (5) and (6) satisfied, the optical performance of the cellulose acylate film can easily be controlled within preferred ranges.

The acyl group having 3 or more carbon atoms may be either an aliphatic group or an aromatic group to make alkylcarbonyl esters, alkenylcarbonyl esters, aromatic carbonyl esters, aromatic alkylcarbonyl esters, and so on. The acyl group may have a substituent. Examples of suitable acyl groups having 3 or more carbon atoms include propionyl, butanoyl, pentanoyl, hexanoyl, heptanoyl, octanoyl, decanoyl, dodecanoyl, tridecanoyl, tetradecanoyl, hexadecanoyl, octadecanoyl, isobutanoyl, t-butanoyl, cyclohexanecarbonyl, oleoyl, benzoyl, naphthylcarbonyl, and cinnamoyl. Preferred of them are propionyl, butanoyl, dodecanoyl, octadecanoyl, t-butanoyl, oleoyl, benzoyl, naphthylcarbonyl, and cinnamoyl. Particularly preferred are propionyl and butanoyl. The degree of substitution B by a propionyl group is preferably 1.3 or greater.

Examples of the cellulose mixed fatty acid ester include cellulose acetate propionate and cellulose acetate butyrate.

Fundamental principles for the synthesis of cellulose acylates are described in Migita, et al., *Mokuzai kagaku*, pp. 180-190, Kyoritsu Shuppan (1968). Typical is a liquid phase acetylation process using a carboxylic acid anhydride, acetic acid, and a sulfuric acid catalyst.

More specifically, a cellulose raw material such as cotton linter or wood pulp is pre-treated with an adequate amount of acetic acid and poured into a previously cooled carboxylating mixed solution to completely esterify the cellulose to obtain an cellulose acylate having a total degree of substitution at the 2-, 3-, and 6-positions of almost 3.00. The carboxylating mixed solution usually contains acetic acid as a solvent, carboxylic acid anhydrides as an esterifying agent, and sulfuric acid as a catalyst. The carboxylic acid anhydrides are usually used in stoichiometrical excess with respect to the total amount of the cellulose as a counter reactant and water content in the reaction system. After completion of the esterification, an aqueous solution of a neutralizing agent (e.g., a carbonate, acetate or oxide of calcium, magnesium, iron, aluminum or zinc) is added to hydrolyze the residual excess carboxylic acid anhydride and to neutralize the esterification catalyst. The resulting complete ester is saponified and aged by maintaining at 50° to 90° C. in the presence of a small amount of an acetylation catalyst (usually, the residual sulfuric acid may serve) until a desired acyl substitution degree and polymerization degree are obtained. At the time when a desired cellulose acylate is obtained, the catalyst remaining in the system may or may not be completely neutralized with the above-recited neutralizing agent, and the cellulose acylate solution is poured into water or diluted sulfuric acid, or water or diluted sulfuric acid is added to the cellulose acylate solution. The thus separated cellulose acylate is further worked up by washing with water, stabilization or like procedures to obtain the aforementioned specific cellulose acylate.

It is preferred that the polymer component of the above-described specific cellulose acylate film to be used in the invention be substantially made up of the specific cellulose acylate. The term "substantially" as used herein is intended to mean that at least 55% by weight, preferably 70% by weight or more, still preferably 80% by weight or more, of the polymer component is the specific cellulose acylate.

The cellulose acylate is preferably used in a particulate form. It is preferred that 90% by weight or more of the cellulose acylate particles to be used have a particle size between 0.5 mm and 5 mm and that 50% by weight or more of the particles have a particle size between 1 mm and 4 mm. The shape of the cellulose acylate particles is preferably as spherical as possible.

The cellulose acylate preferably has a viscosity-average degree of polymerization of 200 to 700, still preferably 250 to 550, even still preferably 250 to 400, particularly preferably 250 to 350. The average degree of polymerization can be measured by the intrinsic viscosity method by Uda, et al. (Uda Kazuo and Saito Hideo, *Journal of Fiber Science and Technology*, Japan, Vol. 18, No. 1, pp. 105-120, 1962). For the details, reference can be made to JP-A-9-95538.

Removal of low-molecular components results in an increase of average molecular weight (polymerization degree) but reduces the viscosity than that of an ordinary cellulose acylate. Therefore, the cellulose acylate to be used is advantageously freed of low-molecular components. A cellulose acylate with reduced low-molecular components is obtained by removing low-molecular components from a cellulose acylate synthesized in a usual synthesis method by washing with an appropriate organic solvent. In preparing a cellulose acylate with reduced low-molecular components, the amount of the sulfuric acid catalyst used in the acetylation reaction is preferably controlled within a range of from 0.5 to 25 parts by weight per 100 parts by weight of the cellulose acylate. So controlling the amount of the catalyst is also advantageous from the aspect of uniform molecular weight distribution of the resulting cellulose acylate. The moisture content of the cellulose acylate is preferably not more than 2% by weight, still preferably 1% by weight or lower, even still preferably 0.7% by weight or lower. In general, a cellulose acylate has a moisture content, which is known to be 2.5% to 5% by weight. Drying is needed to achieve moisture content of 2% or lower. The manner of drying is not restricted as long as a desired moisture content is reached.

For the details of the raw material cotton and the synthesis of cellulose acylates, reference can be made to *Journal of Technical Disclosure*, No. 2001-1745, pp. 7-12, Japan Institute of Invention and Innovation, March, 2001.

The cellulose acylate film that can be used in the invention is obtained from a solution of the above-described specific cellulose acylate in an organic solvent which can contain additives if desired.

The additives that can be added to the cellulose acylate solution include plasticizers, ultraviolet (UV) absorbers, deterioration inhibitors, retardation (optical anisotropy) developing agents, retardation (optical anisotropy) reducing agents, fine particles, dyes, release agents, and infrared absorbers. In the present invention, addition of a retardation developing agent is preferred. Addition of at least one of a plasticizer, a UV absorber, a dye, and a release agent is also recommended.

The additives may be either solid or oily. That is, they are not limited by melting point or boiling point. For example, a UV absorber having a melting point lower than 20° C. and one having a melting point of 20° C. or higher may be used as mixed, or a mixture of plasticizers having different solidification points may be used as suggested in JP-A-2001-151901.

The UV absorber to be used is freely chosen according to the intended purpose from among salicylic esters, benzophenones, benzotriazoles, benzoates, cyanoacrylates, nickel complex salts, and so forth. Benzophenones, benzotriazoles, and salicylic esters are preferred. Examples of benzophenone UV absorbers include 2,4-dihydroxybenzophenone, 2-hydroxy-4-acetoxybenzophenone, 2-hydroxy-4-methoxybenzophenone, 2,2'-dihydroxy-4-methoxybenzophenone, 2,2'-dihydroxy-4,4'-methoxybenzophenone, 2-hydroxy-4-n-octoxybenzophenone, 2-hydroxy-4-dodecyloxybenzophenone, and 2-hydroxy-4-(2-hydroxy-3-methacryloxy)propoxybenzophenone. Examples of benzotriazole UV absorbers include 2-(2'-hydroxy-3'-tert-butyl-5'-methylphenyl)-5-chlorobenzotriazole, 2-(2'-hydroxy-5'-t-butylphenyl)benzotriazole, 2-(2'-hydroxy-3',5'-di-t-amylphenyl)benzotriazole, 2-(2'-hydroxy-3',5'-di-t-butylphenyl)-5-chlorobenzotriazole, and 2-(2'-hydroxy-5'-t-octylphenyl)benzotriazole. Examples of salicylic ester UV absorbers include phenyl salicylate, p-octylphenyl salicylate, and p-t-butylphenyl salicylate. Particularly preferred of the recited UV absorbers are 2-hydroxy-4-methoxybenzophenone, 2,2'-dihydroxy-4,4'-methoxybenzophenone, 2-(2'-hydroxy-3'-t-butyl-5'-methylphenyl)-5-chlorobenzotriazole, 2-(2'-hydroxy-5'-t-butylphenyl)benzotriazole, 2-(2'-hydroxy-3',5'-di-t-amylphenyl)benzotriazole, and 2-(2'-hydroxy-3',5'-di-t-butylphenyl)-5-chlorobenzotriazole.

It is preferred to use a combination of UV absorbers having different absorption wavelengths to provide a protection over a broader range of wavelengths. The UV absorbers for LCD applications are required to have high absorption at 370 nm or shorter for protecting liquid crystals from deterioration and to hardly absorb visible light at 400 nm or longer for securing display quality. For these considerations, the above-recited benzotriazole compounds, benzophenone compounds and salicylic esters are preferred. Inter alia, benzotriazole UV absorbers are particularly preferred; for they hardly cause coloring in the cellulose acylate film.

In addition to the above-recited UV absorbers, the compounds described in the following publications are also useful: JP-A-60-2235852, JP-A-3-199201, JP-A-5-1907073, JP-A-5-194789, JP-A-5-271471, JP-A-6-107854, JP-A-6-118233, JP-A-6-148430, JP-A-7-11055, JP-A-7-11056, JP-A-8-29619, JP-A-8-239509, and JP-A-2000-204173.

The amount of the UV absorber(s) is preferably 0.001% to 5%, still preferably 0.01% to 1%, by weight based on the cellulose acylate. At amounts less than 0.001% by weight, sufficient UV absorbing effects are not obtained. At amounts exceeding 5% by weight, the UV absorber can bleed on the film surface.

The UV absorber may be added in dissolving the cellulose acylate in a solvent or be added to the dope (film-forming cellulose acylate solution). For easy control of spectral absorption characteristics, the UV absorber is preferably mixed into the dope immediately before casting by means of a static mixer, etc.

The deterioration inhibitors serve to prevent the cellulose acylate from deteriorating due to decomposition. Useful deterioration inhibitors include butylamine, hindered amine compounds (see JP-A-8-325537), guanidine compounds (see JP-A-5-271471), benzotriazole UV absorbers (see JP-A-6-235819), and benzophenone UV absorbers (see JP-A-6-118233).

The plasticizers preferably include phosphoric esters and carboxylic esters. Examples of preferred plasticizers are triphenyl phosphate, tricresyl phosphate, cresyldiphenyl phosphate, octyldiphenyl phosphate, biphenyldiphenyl phosphate, trioctyl phosphate, tributyl phosphate, dimethyl phthalate, diethyl phthalate, dibutyl phthalate, dioctyl phthalate, diphenyl phthalate, di(ethylhexyl)phthalate, triethyl O-acetylcitrate, tributyl O-acetylcitrate, acetyltriethyl citrate, acetyltributyl citrate, butyl oleate, methylacetyl ricinoleate, dibutyl sebacate, triacetin, tributyrin, butylphthalylbutyl glycolate, ethylphthalylethyl glycolate, methylphthalylethyl glycolate, and butylphthalylbutyl glycolate. Still preferred of them are (di)pentaerythritols, glycerol esters, and diglycerol esters.

The release agents include ethyl citrate and its derivatives. The infrared absorbers include those described in JP-A-2001-194522.

As stated, a dye can be added to the cellulose acylate for hue control. The amount of the dye to be added for that purpose is preferably 10 to 1000 ppm, still preferably 50 to 500 ppm, based on the cellulose acylate. By such addition of a dye brings about reduction of light piping of the cellulose acylate film and reduction of yellowness. The dye may be added together with the cellulose acylate to a solvent in the preparation of the cellulose acylate solution (dope) or any other stage in the dope preparation or after the dope preparation. The dye may be added to the UV absorber to be in-line added.

The dye that is preferably used in the invention for the purpose of hue control is represented by formula (I) or (II):

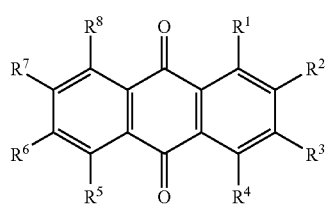

(I)

wherein $R^1$, $R^2$, $R^3$, $R^4$, $R^5$, $R^6$, $R^7$, and $R^8$ each represent a hydrogen atom, a hydroxyl group, an aliphatic group, an aromatic group, a heterocyclic group, a halogen atom, a cyano group, a nitro group, $COR^9$, $COOR^9$, $NR^9R^{10}$, $NR^{10}COR^{11}$, $NR^{10}SO_2R^{11}$, $CONR^9R^{10}$, $SO_2NR^9R^{10}$, $COR^{11}$, $SO_2R^{11}$, $OCOR^{11}$, $NR^9CONR^{10}R^{11}$, $CONHSO_2R^{11}$ or $SO_2NHCOR^{11}$; $R^9$ and $R^{10}$ each represent a hydrogen atom, an aliphatic group, an aromatic group or a heterocyclic group; $R^{11}$ represents an aliphatic group, an aromatic group or a heterocyclic group; $R^9$ and $R^{10}$ may be connected together to form a 5- or 6-membered ring; and a combination of $R^1$ and $R^2$ or a combination of $R^2$ and $R^3$ may form a ring.

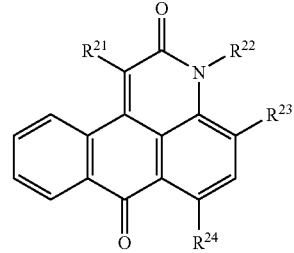

(II)

wherein $R^{21}$, $R^{23}$, and $R^{24}$ each represent a hydrogen atom, a hydroxyl group, a nitro group, a cyano group, an aliphatic group, an aromatic group, $COR^{29}$, $COOR^{29}$, $NR^{29}R^{30}$, $NR^{30}COR^{31}$ or $NR^{30}SO_2R^{31}$; $R^{22}$ represents an aliphatic group or an aromatic group; $R^{20}$ and $R^{30}$ each have the same meaning as $R^9$ and $R^{10}$ in formula (I); and $R^{31}$ has the same meaning as $R^{11}$ in formula (I); provided that at least one of $R^{21}$, $R^{22}$, $R^{23}$, and $R^{24}$ is a substituent (≠hydrogen atom).

In formula (I), the aliphatic group represented by $R^1$ through $R^{11}$ includes an alkyl group having 1 to 20 carbon atoms (e.g., methyl, ethyl, n-butyl, isopropyl, 2-ethylhexyl, n-decyl or n-octadecyl), a cycloalkyl group having 1 to 20 carbon atoms (e.g., cyclopentyl or cyclohexyl), and an allyl group, each of which may have a substituent. The substituent includes a halogen atom (e.g., F, Cl, Br or I), a hydroxyl group, a cyano group, a nitro group, a carboxyl group, an aryl group having 6 to 10 carbon atoms (e.g., phenyl or naphthyl), an amino group having up to 20 carbon atoms (e.g., $NH_2$, $NHCH_3$, $N(C_2H_5)_2$, $N(C_4H_9)_2$, $N(C_8H_7)_2$, anilino or 4-methoxyanilino), an amide group having 1 to 20 carbon atoms (e.g., acetylamino, hexanoylamino, benzoylamino or octadecanoylamino), a carbamoyl group having 1 to 20 carbon atoms (e.g., unsubstituted carbamoyl, methylcarbamoyl, ethylcarbamoyl, octylcarbamoyl or hexadecylcarbamoyl), an ester group having 2 to 20 carbon atoms (e.g., methoxycarbonyl, ethoxycarbonyl, phenoxycarbonyl, n-butoxycarbonyl or dodecyloxycarbonyl), an alkoxy or aryloxy group having up to 20 carbon atoms (e.g., methoxy, ethoxy, butoxy, isopropoxy, benzyloxy, phenoxy or octadecyloxy), a sulfonamide group having 1 to 20 carbon atoms (e.g., methanesulfonamide, ethanesulfonamide, butanesulfonamide, benzenesulfonamide or octanesulfonamide), a sulfamoyl group having 0 to 20 carbon atoms (e.g., unsubstituted sulfamoyl, methylsulfamoyl, butylsulfamoyl or decylsulfamoyl), and a 5- or 6-membered heterocyclic group (e.g., pyridyl, pyrazolyl, morpholino, piperidino, pyrrolino or benzoxazolyl).

The aromatic group represented by $R^1$ through $R^{11}$ includes a substituted or unsubstituted aryl group having 6 to 10 carbon atoms (e.g., phenyl or naphthyl). The substituent of the aryl group includes those recited above as the substituent of the aliphatic group and, in addition, an alkyl group having 1 to 20 carbon atoms (e.g., methyl, ethyl, butyl, t-butyl or octyl).

The heterocyclic group as represented by $R^1$ through $R^{11}$ is a substituted or unsubstituted 5- or 6-membered heterocyclic ring (e.g., pyridine, piperidine, morpholine, pyrrolidine, pyrazole, pyrazolidone, pyrazoline, pyrazolone or benzoxazole). The substituent of the heterocyclic group includes those recited above as the substituent of the aromatic group.

The 5- or 6-membered ring formed by the connection of $R^9$ and $R^{10}$ includes a morpholine ring, a piperidine ring, and a pyrrolidine ring. The ring formed by the connection of $R^1$ and $R^2$ or the connection of $R^2$ and $R^3$ is preferably a 5- or 6-membered ring (e.g., a benzene ring or a phthalimide ring).

In formula (II), the aliphatic group represented by $R^{21}$ through $R^{24}$ has the same meaning as the aliphatic group represented by $R^1$ through $R^{11}$ in formula (I), and the aromatic group represented by $R^{21}$ through $R^{24}$ has the same meaning as the aromatic group represented by $R^1$ through $R^{11}$ in formula (I).

The aforementioned additives may be added at any stage in the preparation of the dope. The step of adding the additives may be provided separately as the final step of dope preparation. The amount of each of the additives to be added is not limited as long the intended effect may be exerted. Where the cellulose acylate protective film has a multilayer structure, the kind and the amount of the additive may vary among the sublayers. The selection of kinds and amounts of additives in a cellulose acylate film is well-known in the art as described, e.g., in JP-A-2001-151902. It is preferred to select the kind and the amount of the additives so that the glass transition point Tg of the resulting cellulose acylate film may be between 70° and 150° C., still preferably between 80° and 135° C., as measured with a dynamic viscoelasticity measuring device Vibron DVA-225 from ITK Co., Ltd., in view of suitability to polarizing plate processing and LCD assembly.

Additional information about the additives to the cellulose acylate film is obtained from *Journal of Technical Disclosure*, No. 200 1-1745, p. 16 et seq., Japan Institute of Invention and Innovation, March, 2001.

In the present invention, addition of the retardation developing agent is particularly preferred to develop large optical anisotropy to achieve a preferred retardation value.

The retardation developing agent includes rod-like or discotic compounds. The rod-like or discotic compounds include compounds having at least two aromatic rings.

The rod-like compound as a retardation developing agent is preferably added in an amount of 0.1 to 30 parts by weight, still preferably 0.5 to 20 parts by weight, per 100 parts by weight of the total polymer component inclusive of the cellulose acylate. The discotic compound as a retardation developing agent is preferably added in an amount of 0.05 to 30 parts by weight, still preferably 0.1 to 20 parts by weight, even still preferably 0.2 to 15 parts by weight, particularly preferably 0.5 to 10 parts by weight, per 100 parts by weight of the total polymer component including the cellulose acylate.

The discotic compound is superior to the rod-like compound in developing retardation Rth and is preferably used where a particularly high Rth is desired. Two or more retardation developing agents can be used in combination.

It is preferred for the rod-like or discotic compound as a retardation developing agent to show a maximum absorption in a wavelength region of 250 to 400 nm and substantially no absorption in the visible region.

The discotic compound having at least two aromatic rings will be described in detail. The terminology "aromatic ring" as used herein includes not only aromatic hydrocarbon rings but also aromatic heterocyclic rings.

The aromatic hydrocarbon ring is preferably a 6-membered ring, namely a benzene ring.

The aromatic heterocyclic ring is usually an unsaturated heterocyclic ring. The aromatic heterocyclic ring is preferably a 5- to 7-membered ring, still preferably a 5- or 6-membered ring. The aromatic heterocyclic ring generally has a largest number of double bonds. The hetero atoms preferably include nitrogen, oxygen, and sulfur, with nitrogen being particularly preferred. Examples of the aromatic heterocyclic ring include a furan ring, a thiophene ring, a pyrrole ring, an oxazole ring, an isoxazole ring, a thiazole ring, an isothiazole ring, an imidazole ring, a pyrazole ring, a furazan ring, a triazole ring, a pyran ring, a pyridine ring, a pyridazine ring, a pyrimidine ring, a pyrazine ring, and a 1,3,5-triazine ring.

The aromatic ring preferably includes a benzene ring, a furan ring, a thiophene ring, a pyrrole ring, an oxazole ring, a thiazole ring, an imidazole ring, a triazole ring, a pyridine ring, a pyrimidine ring, a pyrazine ring, and a 1,3,5-triazine ring. A 1,3,5-triazine ring is particularly preferred. Specific examples of preferred discotic compounds are given, e.g., in JP-A-2001-166144.

The number of the aromatic rings possessed by the discotic compound is preferably 2 to 20, still preferably 2 to 12, even still preferably 2 to 8, particularly preferably 2 to 6. The connection mode between two of the aromatic rings may be any of (a) fusion (to make a fused ring), (b) via a single bond, and (c) via a linking group. Being aromatic, the rings do not form a spiro bonding.

The fused rings (two or more aromatic rings fused together) include an indene ring, a naphthalene ring, an azulene ring, a fluorene ring, a phenanthrene ring, an anthracene ring, an acenaphthalene ring, a biphenylene ring, a naphthacene ring, a pyrene ring, an indole ring, an isoindole ring, a benzofuran ring, a benzothiophene ring, an indolizine ring, a benzoxazole ring, a benzothiazole ring, a benzimidazole ring, a benzotriazole ring, a purine ring, an indazole ring, a chromene ring, a quinoline ring, an isoquinoline ring, quinolidine ring, quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxathiin ring, a phenoxazine ring, and a thianthrene ring. Preferred of them are a naphthalene ring, an azulene ring, an indole ring, a benzoxazole ring, a benzothiazole ring, a benzimidazole ring, a benzotriazole ring, and a quinoline ring.

The single bond in the connection mode (b) is preferably a bond between carbon atoms of the two aromatic rings. Two aromatic rings may be connected via two or more single bonds to form an aliphatic ring or a non-aromatic ring therebetween.

The linking group in the connection mode (c) is preferably between carbon atoms of the two aromatic rings. The linking group preferably includes an alkylene group, an alkenylene group, an alkynylene group, —CO—, —O—, —NH—, —S—, and combinations thereof. Examples of the combination of linking groups are shown below. The order of the unit linking groups may be inverted.

c1: —CO—O— c2: —CO—NH— c3: -alkylene-O— c4: —NH—CO—NH— c5: —NH—CO—O— c6: —O—CO—O— c7: —O-alkylene-O—

C8: —CO-alkenylene-

C9: —CO-alkenylene-NH— c10: —CO-alkenylene-O— c11: -alkylene-CO—O-alkylene-O—CO-alkylenec12: —O-alkylene-CO—O-alkylene-O—CO-alkylene-O— c13: —O—CO-alkylene-CO—O— c14: —NH—CO-alkenylenec15: —O—CO-alkenylene-

The aromatic rings and the linking groups may have a substituent. The substituent includes a halogen atom (e.g., F, Cl, Br or I), a hydroxyl group, a carboxyl group, a cyano group, an amino group, a nitro group, a sulfo group, a carbamoyl group, a sulfamoyl group, a ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfonamide group, an aliphatic substituted amino group, an aliphatic substituted carbamoyl group, an aliphatic substituted sulfamoyl group, an aliphatic substituted ureido group, and a non-aromatic heterocyclic group.

The alkyl group preferably contains 1 to 8 carbon atoms. An acyclic alkyl group is preferred to a cyclic alkyl group, and a straight-chain alkyl group is preferred to a branched alkyl group. The alkyl group may have a substituent (e.g., hydroxyl, carboxyl, alkoxy or alkylamino). Examples of the substituted or unsubstituted alkyl group are methyl, ethyl, n-butyl, n-hexyl, 2-hydroxyethyl, 4-carboxybutyl, 2-methoxyethyl, and 2-diethylaminoethyl.

The alkenyl group preferably contains 2 to 8 carbon atoms. An acyclic alkenyl group is preferred to a cyclic alkenyl group, and a straight-chain alkenyl group is preferred to a branched one. The alkenyl group may have a substituent. Examples of the alkenyl group are vinyl, allyl, and 1-hexenyl.

The alkynyl group preferably contains 2 to 8 carbon atoms. An acyclic alkynyl group is preferred to a cyclic one. A straight-chain alkynyl group is preferred to a branched one. The alkynyl group may have a substituent. Examples of the alkynyl group are ethynyl, 1-butynyl, and 1-hexynyl.

The aliphatic acyl group preferably has 1 to 10 carbon atoms. Examples of the aliphatic acyl group include acetyl, propanoyl, and butanoyl.

The aliphatic acyloxy group preferably contains 1 to 10 carbon atoms. Examples of the aliphatic acyloxy group include acetoxy.

The alkoxy group preferably contains 1 to 8 carbon atoms. The alkoxy group may have a substituent (e.g., an alkoxy group). Examples of the substituted or unsubstituted alkoxy group include methoxy, ethoxy, butoxy, and methoxyethoxy.

The alkoxycarbonyl group preferably contains 2 to 10 carbon atoms. Examples of the alkoxycarbonyl group include methoxycarbonyl and ethoxycarbonyl.

The alkoxycarbonylamino group preferably contains 2 to 10 carbon atoms. Examples of the alkoxycarbonylamino group include methoxycarbonylamino and ethoxycarbonylamino.

The alkylthio group preferably contains 1 to 12 carbon atoms. Examples of the alkylthio group are methylthio, ethylthio, and octylthio.

The alkylsulfonyl group preferably contains 1 to 8 carbon atoms. Examples of the alkylsulfonyl group are methanesulfonyl and ethanesulfonyl.

The aliphatic amide group preferably contains 1 to 10 carbon atoms. Examples include acetamide.

The aliphatic sulfonamide group preferably contains 1 to 8 carbon atoms. Examples include methanesulfonamide, butanesulfonamide, and n-octanesulfonamide.

The aliphatic substituted amino group preferably contains 1 to 10 carbon atoms. Examples of the aliphatic substituted amino group include dimethylamino, diethylamino, and 2-carboxyethylamino.

The aliphatic substituted carbamoyl group preferably contains 2 to 10 carbon atoms. Examples are methylcarbamoyl and diethylcarbamoyl.

The aliphatic substituted sulfamoyl group preferably contains 1 to 8 carbon atoms. Examples include methylsulfamoyl and diethylsulfamoyl.

The aliphatic substituted ureido group preferably contains 2 to 10 carbon atoms. Examples include methylureido.

The non-aromatic heterocyclic group includes piperidino and morpholino.

The discotic compound as a retardation developing agent preferably has a molecular weight of 300 to 800.

The rod-like compound that can be used preferably as a retardation developing agent is a compound having a straight-linear molecular structure. To have a "straight-linear molecular structure" means that the compound has a straight-linear molecular structure when it is in its most thermodynamically stable state. The most thermodynamically stable structure can be obtained through crystal structure analysis or molecular orbital calculation. For instance, molecular orbital calculation is performed with molecular orbital calculation software (e.g., WinMOPAC 2000 form Fujitsu Ltd.) to obtain the molecular structure in which the heat of formation is lowest. To have a "straight-linear molecular structure" indicates that the molecular main chain makes an angle of 140° or larger in the thermodynamically most stable structure as determined.

The rod-like compounds preferably having at least two aromatic rings include those represented by formula (III):

$$Ar^1-L^1-Ar^2 \qquad (III)$$

wherein $Ar^1$ and $Ar^2$ each present an aromatic group; and $L^1$ is a divalent linking group.

In formula (III), the terminology "aromatic group" includes an aryl group (aromatic hydrocarbon group), a substituted aryl group, an aromatic heterocyclic group, and a substituted aromatic heterocyclic group. A substituted or unsubstituted aryl group is preferred to a substituted or unsubstituted aromatic heterocyclic group. The aromatic heterocyclic ring is usually unsaturated. The aromatic heterocyclic ring is preferably a 5- to 7-membered ring, still preferably a 5- or 6-membered ring. The aromatic heterocyclic ring generally has a largest number of double bonds. The hetero atom preferably includes nitrogen, oxygen and sulfur atoms. A nitrogen atom or a sulfur atom is still preferred.

The aromatic ring of the aromatic group includes a benzene ring, a furan ring, a thiophene ring, a pyrrole ring, an oxazole ring, a thiazole ring, an imidazole ring, a triazole ring, a pyridine ring, a pyrimidine ring, and a pyrazine ring, with a benzene ring being particularly preferred.

The substituents of the substituted aryl group and the substituted aromatic heterocyclic group include a halogen atom (e.g., F, Cl, Br or I), a hydroxyl group, a carboxyl group, a cyano group, an amino group, an alkylamino group (e.g., methylamino, ethylamino, butylamino or dimethylamino), a nitro group, a sulfo group, a carbamoyl group, an alkylcarbamoyl group (e.g., N-methylcarbamoyl, N-ethylcarbamoyl or N,N-dimethylcarbamoyl), a sulfamoyl group, an alkylsulfamoyl group (e.g., N-methylsulfamoyl, N-ethylsulfamoyl or N,N-dimethylsulfamoyl), a ureido group, an alkylureido group (e.g., N-methylureido, N,N-dimethylureido or N,N,N'-trimethylureido), an alkyl group (e.g., methyl, ethyl, propyl, butyl, pentyl, heptyl, octyl, isopropyl, sec-butyl, t-amyl, cyclohexyl or cyclopentyl), an alkenyl group (e.g., vinyl, allyl or hexenyl), an alkynyl group (e.g., ethynyl or butynyl), an acyl group (e.g., formyl, acetyl, butyryl, hexanoyl or lauryl), an acyloxy group (e.g., acetoxy, butyryloxy, hexanoyloxy or lauryloxy), an alkoxy group (e.g., methoxy, ethoxy, propoxy, butoxy, pentyloxy, heptyloxy or octyloxy), an aryloxy group (e.g., phenoxy), an alkoxycarbonyl group (e.g., methoxycarbonyl, ethoxycarbonyl, propoxycarbonyl, butoxycarbonyl, pentyloxycarbonyl or heptyloxycarbonyl), an aryloxycarbonyl group (e.g., phenoxycarbonyl), an alkoxycarbonylamino group (e.g., butoxycarbonylamino or hexyloxycarbonylamino), an alkylthio group (e.g., methylthio, ethylthio, propylthio, butylthio, pentylthio, heptylthio or octylthio), an arylthio group (e.g., phenylthio), an alkylsulfonyl group (e.g., methylsulfonyl, ethylsulfonyl, propylsulfonyl, butylsulfonyl, pentylsulfonyl, heptylsulfonyl or octylsulfonyl), an amide group (e.g., acetamide, butylamide, hexylamide or laurylamide), and a non-aromatic heterocyclic group (e.g., morpholyl or pyrazinyl).

The substituents of the substituted aryl group and the substituted aromatic heterocyclic group preferably include a halogen atom, a cyano group, a carboxyl group, a hydroxyl group, an amino group, an alkylamino group, an acyl group, an acyloxy group, an amide group, an alkoxycarbonyl group, an alkoxy group, an alkylthio group, and an alkyl group.

The alkyl group and the alkyl moiety of the alkylamino, alkoxycarbonyl, alkoxy and alkylthio groups may have a substituent. Examples of the substituent of the alkyl group or moiety include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, a ureido group, an alkylureido group, an alkenyl group, an alkynyl group, an acyl group, an acyloxy group, an acylamino group, an alkoxy group, an aryloxy group, an alkoxycarbonyl group, an aryloxycarbonyl group, an alkoxycarbonylamino group, an alkylthio group, an arylthio group, an alkylsulfonyl group, an amide group, and a non-aromatic heterocyclic group. Preferred of these substituents are a halogen atom, a hydroxyl group, an amino group, an alkylamino group, an acyl group, an acyloxy group, an acylamino group, an alkoxycarbonyl group, and an alkoxy group.

In formula (III), the divalent linking group represented by $L^1$ is selected from an alkylene group, an alkenylene group, an alkynylene group, —O—, —CO—, and combinations thereof.

The alkylene group may have a cyclic structure. A cyclic alkylene group is preferably a cyclohexylene group, still preferably a 1,4-cyclohexylene group. A straight-chain acyclic alkylene group is preferred to a branched acyclic alkylene group. The alkylene group preferably contains 1 to 20 carbon atoms, still preferably 1 to 15 carbon atoms, even still preferably 1 to 10 carbon atoms, particularly preferably 1 to 8 carbon atoms, especially preferably 1 to 6 carbon atoms.

The alkenylene group and the alkynylene group preferably have an acyclic structure. A straight-chain acyclic structure is preferred to a branched one. The alkenylene group and the alkynylene group preferably contain 2 to 10 carbon atoms, still preferably 2 to 8 carbon atoms, even still preferably 2 to 6 carbon atoms, particularly preferably 2 to 4 carbon atoms, most preferably 2 carbon atoms (i.e., vinylene or ethynylene).

The arylene group preferably contains 6 to 20 carbon atoms, still preferably 6 to 16 carbon atoms, even still preferably 6 to 12 carbon atoms.

In the molecular structure of formula (III), $Ar^1$ and $Ar^2$ preferably make an angle of 140° or greater at $L^1$.

The rod-like compound can be synthesized by the processes described in published literatures such as *Mol. Crysta. Liq. Cryst.*, vol. 53, p. 229 (1979), ib., vol. 89, p. 93 (1982), ib., vol. 145, p. 111 (1987), ib., vol. 170, p. 43 (1989), *J. Am. Chem.*, vol. 40, p. 420 (1975), and *Tetrahedron*, vol. 48, No. 16, p. 343 (1992).

Of the rod-like compounds of formula (III) preferred are those represented by formula (IV):

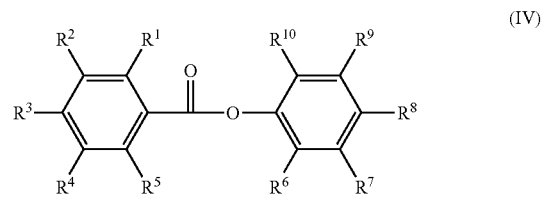

wherein $R^1$, $R^2$, $R^3$, $R^4$, $R^5$, $R^6$, $R^7$, $R^9$, and $R^{10}$ each represent a hydrogen atom or a substituent; at least one of $R^1$, $R^2$, $R^3$, $R^4$, and $R^5$ represents an electron donating group; $R^8$ represents a hydrogen atom, an alkyl group having 1 to 4 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group or a halogen atom.

In formula (IV), the substituent represented by $R^1$, $R^2$, $R^3$, $R^4$, $R^5$, $R^6$, $R^7$, $R^9$, and $R^{10}$ include a group of substituents T described later.

At least one of $R^1$, $R^2$, $R^3$, $R^4$, and $R^5$ represents an electron donating group. Preferably at least one of $R^1$, $R^3$, and $R^5$ is an electron donating group. Still preferably $R^3$ is an electron donating group. An electron donating group is a group having a Hammett substituent constant σp of 0 or smaller. The electron donating group whose σp value of 0 or smaller described in *Chem. Rev.*, vol. 91, p. 165 (1991) are preferred. Still preferred are those having a σp of −0.85 to 0, such as an alkyl group, an alkoxy group, an amino group, and a hydroxyl group. The electron donating group preferably includes an alkyl group and an alkoxy group, still preferably an alkoxy group (preferably containing 1 to 12 carbon atoms, still preferably 1 to 8 carbon atoms, even still preferably 1 to 6 carbon atoms, particularly preferably 1 to 4 carbon atoms).

$R^1$ preferably represents a hydrogen atom or an electron donating group, still preferably an alkyl group, an alkoxy group, an amino group or a hydroxyl group, even still preferably an alkyl group having 1 to 4 carbon atoms, an alkoxy group having 1 to 12 carbon atoms, particularly preferably an alkoxy group (preferably containing 1 to 12 carbon atoms, still preferably 1 to 8 carbon atoms, even still preferably 1 to 6 carbon atoms, particularly preferably 1 to 4 carbon atoms), most preferably a methoxy group.

$R^2$ preferably represents a hydrogen atom, an alkyl group, an alkoxy group, an amino group or a hydroxyl group, still preferably a hydrogen atom, an alkyl group or an alkoxy group, even still preferably a hydrogen atom, an alkyl group (preferably having 1 to 4 carbon atoms, still preferably a methyl group) or an alkoxy group (preferably having 1 to 12 carbon atoms, still preferably 1 to 8 carbon atoms, even still preferably 1 to 6 carbon atoms, particularly preferably 1 to 4 carbon atoms). Particularly preferably $R^2$ is a hydrogen atom, a methyl group or a methoxy group.

$R^3$ preferably represents a hydrogen atom or an electron donating group, still preferably a hydrogen atom, an alkyl group, an alkoxy group, an amino group or a hydroxyl group, even still preferably an alkyl group or an alkoxy group, particularly preferably an alkoxy group (preferably having 1 to 12 carbon atoms, still preferably 1 to 8 carbon atoms, even still preferably 1 to 6 carbon atoms, particularly preferably 1 to 4 carbon atoms). Particularly preferably $R^3$ represents an n-propoxy group, an ethoxy group or a methoxy group.

$R^4$ preferably represents a hydrogen atom or an electron donating group, still preferably a hydrogen atom, an alkyl group, an alkoxy group, an amino group or a hydroxyl group, even still preferably a hydrogen atom, an alkyl group having 1 to 4 carbon atoms or an alkoxy group having 1 to 12 carbon atoms (preferably 1 to 8 carbon atoms, still preferably 1 to 6 carbon atoms, even still preferably 1 to 4 carbon atoms), particularly preferably a hydrogen atom, an alkyl group having 1 to 4 carbon atoms or an alkoxy group having 1 to 4 carbon atoms. Particularly preferably $R^4$ represents a hydrogen atom, a methyl group or a methoxy group.

$R^5$ preferably represents a hydrogen atom, an alkyl group, an alkoxy group, an amino group or a hydroxyl group, still preferably a hydrogen atom, an alkyl group or an alkoxy group, even still preferably a hydrogen atom, an alkyl group (preferably having 1 to 4 carbon atoms, particularly a methyl group) or an alkoxy group (preferably having 1 to 12 carbon atoms, still preferably 1 to 8 carbon atoms, even still preferably 1 to 6 carbon atoms, particularly preferably 1 to 4 carbon atoms), particularly preferably a hydrogen atom, a methyl group or a methoxy group.

$R^6$, $R^7$, $R^9$, and $R^{10}$ each preferably represent a hydrogen atom, an alkyl group having 1 to 12 carbon atoms, an alkoxy group having 1 to 12 carbon atoms or a halogen atom, still preferably a hydrogen atom or a halogen atom, even still preferably a hydrogen atom.

$R^8$ represents a hydrogen atom, an alkyl group having 1 to 4 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group or a halogen atom, each of which may have a substituent if possible. The substituent includes the substituents T described later.

$R^8$ preferably represents an alkyl group having 1 to 4 carbon atoms, an alkynyl group having 2 to 6 carbon atoms, an aryl group having 6 to 12 carbon atoms, an alkoxy group having 1 to 12 carbon atoms or an aryloxy group having 2 to 12 carbon atoms, still preferably an aryl group having 6 to 12 carbon atoms, an alkoxy group having 1 to 12 carbon atoms or an aryloxy group having 6 to 12 carbon atoms, even still preferably an alkoxy group having 1 to 12 carbon atoms (preferably 1 to 8 carbon atoms, still preferably 1 to 6 carbon atoms, even still preferably 14 carbon atoms), particularly preferably a methoxy group, an ethoxy group, an n-propoxy group, an isopropoxy group or an n-butoxy group.

Of the compounds of formula (IV), preferred are those represented by formula (IV-A):

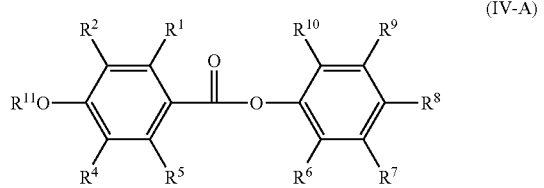

(IV-A)

wherein $R^{11}$ represents an alkyl group; $R^1$, $R^2$, $R^4$, $R^5$, $R^6$, $R^7$, $R^9$, and $R^{10}$ each represent a hydrogen atom or a substituent;

$R^8$ represents a hydrogen atom, an alkyl group having 1 to 4 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group or a halogen atom.

In formula (IV-A), $R^1$, $R^2$, $R^4$, $R^5$, $R^6$, $R^7$, $R^9$, and $R^{10}$ each have the same meaning as in formula (IV), and their preferred ranges are also the same as in formula (IV).

The alkyl group represented by $R^{11}$ is preferably an alkyl group having 1 to 12 carbon atoms and may be either straight or branched and may have a substituent. $R^{11}$ preferably represents an alkyl group having 1 to 8 carbon atoms, still preferably an alkyl group having 1 to 6 carbon atoms, even still preferably an alkyl group having 1 to 4 carbon atoms, e.g., methyl, ethyl, n-propyl, isopropyl, n-butyl, isobutyl or tert-butyl.

Of the compounds represented by formula (IV), still preferred are those represented by formula (IV-B):

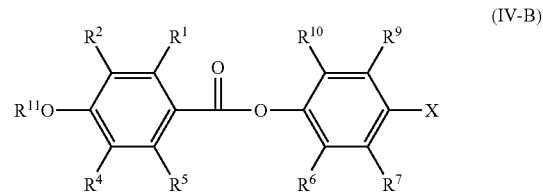

(IV-B)

wherein $R^1$, $R^2$, $R^4$, $R^5$, $R^6$, $R^7$, $R^9$, and $R^{10}$ each represent a hydrogen atom or a substituent; $R^{11}$ represents an alkyl group having 1 to 12 carbon atoms; and X represents an alkyl group having 1 to 4 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group or a halogen atom.

In formula (IV-B), $R^1$, $R^2$, $R^4$, $R^5$, $R^6$, $R^7$, $R^9$, and $R^{10}$ each have the same meaning as in formula (IV), and their preferred ranges are also the same as in formula (IV).

$R^{11}$ has the same meanings as in formula (IV-A), and its preferred range is also the same as in Formula (IV-A).

Where $R^1$, $R^2$, $R^4$, and $R^5$ each represent a hydrogen atom, X is preferably an alkyl group, an alkynyl group, an aryl group, an alkoxy group or an aryloxy group, still preferably an aryl group, an alkoxy group or an aryloxy group, even still preferably an alkoxy group (preferably having 1 to 12 carbon atoms, still preferably 1 to 8 carbon atoms, even still preferably 1 to 6 carbon atoms, particularly preferably 1 to 4 carbon atoms), particularly a methoxy group, an ethoxy group, an n-propoxy group, an isopropoxy group or an n-butoxy group.

Where at least one of $R^1$, $R^2$, $R^4$, and $R^5$ represents a substituent, X is preferably an alkynyl group, an aryl group, an alkoxycarbonyl group or a cyano group, still preferably an aryl group (preferably having 6 to 12 carbon atoms), a cyano group or an alkoxycarbonyl group (preferably having 2 to 12 carbon atoms), even still preferably an aryl group (preferably having 6 to 12 carbon atoms, still preferably a phenyl group, a p-cyanophenyl group or a p-methoxyphenyl group), an alkoxycarbonyl group (preferably having 2 to 12 carbon atoms, still preferably 2 to 6 carbon atoms, even still preferably 2 to 4 carbon atoms, particularly preferably methoxycarbonyl, ethoxycarbonyl or n-propoxycarbonyl) or a cyano group, particularly preferably a phenyl group, a methoxycarbonyl group, an ethoxycarbonyl group, an n-propoxycarbonyl group or a cyano group.

Of the compounds represented by formula (IV), even still preferred are those represented by formula (IV-C):

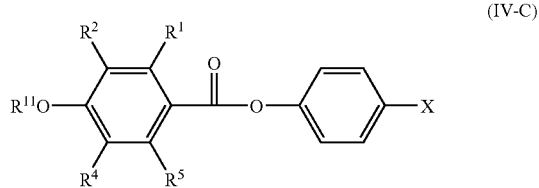

(IV-C)

wherein $R^1$, $R^2$, $R^4$, $R^5$, $R^{11}$, and X are as defined for formula (IV-B). Preferred ranges of $R^1$, $R^2$, $R^4$, $R^5$, $R^{11}$, and X are the same as described above.

Of the compounds represented by formula (IV), particularly preferred are those represented by formula (IV-D):

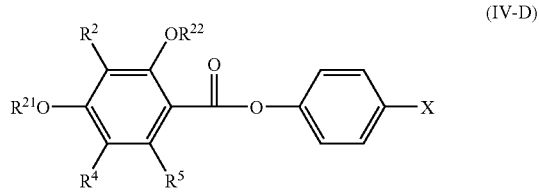

(IV-D)

wherein $R^2$, $R^4$, and $R^5$ are as defined for formula (IV-C); $R^{21}$ and $R^{22}$ each represent an alkyl group having 1 to 4 carbon atoms; and $X^1$ represents an aryl group having 6 to 12 carbon atoms, an alkoxycarbonyl group having 2 to 12 carbon atoms or a cyano group.

In formula (IV-D), preferred ranges of $R^2$, $R^4$, and $R^5$ are the same as described above. $R^{21}$ preferably represents an alkyl group having 1 to 3 carbon atoms, still preferably an ethyl group or a methyl group. $R^{22}$ preferably represents an alkyl group having 1 to 3 carbon atoms, still preferably an ethyl group or a methyl group, even still preferably a methyl group.

$X^1$ preferably represents an aryl group having 6 to 12 carbon atoms, an alkoxycarbonyl group having 2 to 6 carbon atoms or a cyano group, still preferably a phenyl group, a p-cyanophenyl group, a p-methoxyphenyl group, a methoxycarbonyl group, an ethoxycarbonyl group, an n-propoxycarbonyl group or a cyano group, even still preferably a phenyl group, a methoxycarbonyl group, an ethoxycarbonyl group, an n-propoxycarbonyl group or a cyano group.

Of the compounds represented by formula (IV), the most preferred are those represented by formula (IV-E):

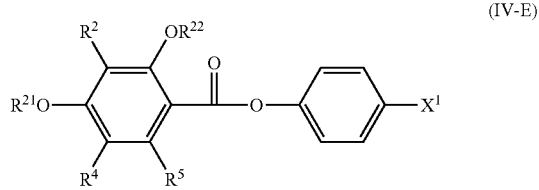

(IV-E)

wherein $R^2$, $R^4$, and $R^5$ are as defined above, provided that at least one of them is a group —$OR^{13}$ (wherein $R^{13}$ represents an alkyl group having 1 to 4 carbon atoms); and $R^{21}$, 122, and $X^1$ are as defined above.

Preferred ranges of $R^2$, $R^4$, and $R^5$ are the same as described above. Preferably $R^4$ and $R^5$ both represent —$OR^{13}$. Still preferably $R^4$ represents —$OR^{13}$. $R^{13}$ is preferably an alkyl group having 1 to 3 carbon atoms, still preferably methyl or ethyl, even still preferably methyl.

The substituents T referred to above include an alkyl group (preferably having 1 to 20 carbon atoms, still preferably 1 to 12 carbon atoms, even still preferably 1 to 8 carbon atoms, e.g., methyl, ethyl, isopropyl, t-butyl, n-octyl, n-decyl, n-hexadecyl, cyclopropyl, cyclopentyl or cyclohexyl), an alkenyl group (preferably having 2 to 20 carbon atoms, still preferably 2 to 12 carbon atoms, even still preferably 2 to 8 carbon atoms, e.g., vinyl, allyl, 2-butenyl or 3-pentenyl), an alkynyl group (preferably having 2 to 20 carbon atoms, still preferably 2 to 12 carbon atoms, even still preferably 2 to 8 carbon atoms, e.g., propargyl or 3-pentynyl), an aryl group (preferably having 6 to 30 carbon atoms, still preferably 6 to 20 carbon atoms, even still preferably 6 to 12 carbon atoms, e.g., phenyl, p-methylphenyl or naphthyl), a substituted or unsubstituted amino group (preferably having up to 20 carbon atoms, still preferably up to 10 carbon atoms, even still preferably up to 6 carbon atoms, e.g., amino, methylamino, dimethylamino, diethylamino or dibenzylamino), an alkoxy group (preferably having 1 to 20 carbon atoms, still preferably 1 to 12 carbon atoms, even still preferably 1 to 8 carbon atoms, e.g., methoxy, ethoxy or butoxy), an aryloxy group (preferably having 6 to 20 carbon atoms, still preferably 6 to 16 carbon atoms, even still preferably 6 to 12 carbon atoms, e.g., phenyloxy or 2-naphthyloxy), an acyl group (preferably having 1 to 20 carbon atoms, still preferably 1 to 16 carbon atoms, even still preferably 1 to 12 carbon atoms, e.g., acetyl, benzoyl, formyl or pivaloyl), an alkoxycarbonyl group (preferably having 2 to 20 carbon atoms, still preferably 2 to 16 carbon atoms, even still preferably 2 to 12 carbon atoms, e.g., methoxycarbonyl or ethoxycarbonyl), an aryloxycarbonyl group (preferably having 7 to 20 carbon atoms, still preferably 7 to 16 carbon atoms, even still preferably 7 to 10 carbon atoms, e.g., phenyloxycarbonyl), an acyloxy group (preferably having 2 to 20 carbon atoms, still preferably 2 to 16 carbon atoms, even still preferably 2 to 10 carbon atoms, e.g., acetoxy or benzoyloxy), an acylamino group (preferably having 2 to 20 carbon atoms, still preferably 2 to 16 carbon atoms, even still preferably 2 to 10 carbon atoms, e.g., acetylamino or benzoylamino), an alkoxycarbonylamino group (preferably having 2 to 20 carbon atoms, still preferably 2 to 16 carbon atoms, even still preferably 2 to 12 carbon atoms, e.g., methoxycarbonylamino), an aryloxycarbonyl group (preferably having 7 to 20 carbon atoms, still preferably 7 to 16 carbon atoms, even still preferably 7 to 12 carbon atoms, e.g., phenyloxycarbonylamino), a sulfonylamino group (preferably having 1 to 20 carbon atoms, still preferably 1 to 16 carbon atoms, even still preferably 1 to 12 carbon atoms, e.g., methanesulfonylamino or benzenesulfonylamino), a sulfamoyl group (preferably having up to 20 carbon atoms, still preferably up to 16 carbon atoms, even still preferably up to 12 carbon atoms, e.g., sulfamoyl, methylsulfamoyl, dimethylsulfamoyl or phenylsulfamoyl), a carbamoyl group (preferably having 1 to 20 carbon atoms, still preferably 1 to 16 carbon atoms, even still preferably 1 to 12 carbon atoms, e.g., carbamoyl, methylcarbamoyl, diethylcarbamoyl or phenylcarbamoyl), an alkylthio group (preferably having 1 to 20 carbon atoms, still preferably 1 to 16 carbon atoms, even still preferably 1 to 12 carbon atoms, e.g., methylthio or ethylthio), an arylthio group (preferably having 6 to 20 carbon atoms, still preferably 6 to 16 carbon atoms, even still preferably 6 to 12 carbon atoms, e.g., phenylthio), a sulfonyl group (preferably having 1 to 20 carbon atoms, still preferably 1 to 16 carbon atoms, even still preferably 1 to 12 carbon atoms, e.g., mesyl or tosyl), a sulfinyl group (preferably having 1 to 20 carbon atoms, still preferably 1 to 16 carbon atoms, even still preferably 1 to 12 carbon atoms, e.g., methanesulfinyl or benzenesulfinyl), a ureido group (preferably having 1 to 20 carbon atoms, still preferably 1 to 16 carbon atoms, even still preferably 1 to 12 carbon atoms, e.g., ureido, methylureido or phenylureido), a phosphoric amide group (preferably having 1 to 20 carbon atoms, still preferably 1 to 16 carbon atoms, even still preferably 1 to 12 carbon atoms, e.g., diethylphosphoric amide or phenylphosphoric amide), a hydroxyl group, a mercapto group, a halogen atom (e.g., F, Cl, Br or I), a cyano group, a sulfo group, a carboxyl group, a nitro group, a hydroxamic acid group, a sulfino group, a hydrazino group, an imino group, a heterocyclic group (containing a nitrogen atom, an oxygen atom, a sulfur atom, etc. as a hetero atom and preferably having 1 to 30 carbon atoms, still preferably 1 to 12 carbon atoms, e.g., imidazolyl, pyridyl, quinolyl, furyl, piperidyl, morpholino, benzoxazolyl, benzimidazolyl or benzothiazolyl), and a silyl group (preferably having 3 to 40 carbon atoms, still preferably 3 to 30 carbon atoms, even still preferably 3 to 24 carbon atoms, e.g., trimethylsilyl or triphenylsilyl). These substituents may be substituted.

When there are two or more substituents, they may be the same or different and may, if possible, be connected to each other to form a ring.

Specific examples of the rod-like compounds represented by formula (IV) include, but are not limited to, the following.

A-1
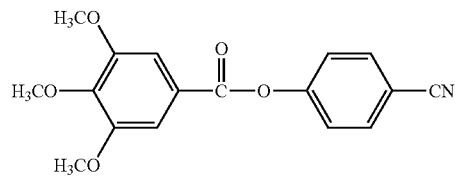

A-2
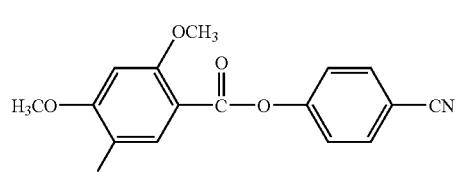

A-3
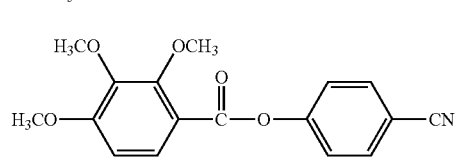

A-4
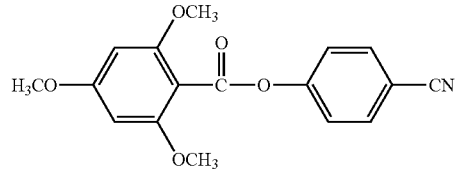

-continued

A-5
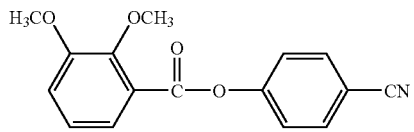

A-6
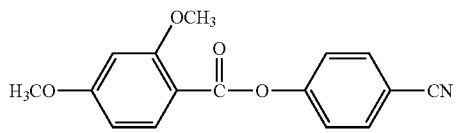

A-7
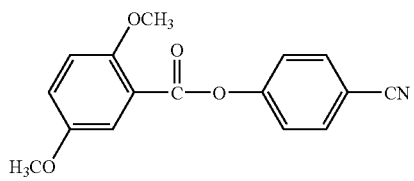

A-8
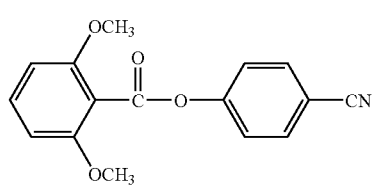

A-9
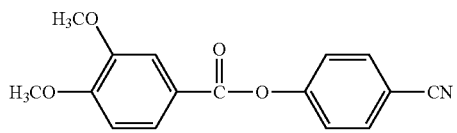

A-10
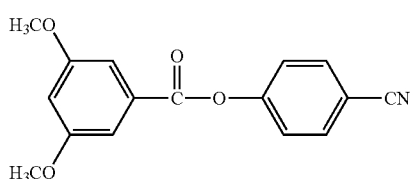

A-11
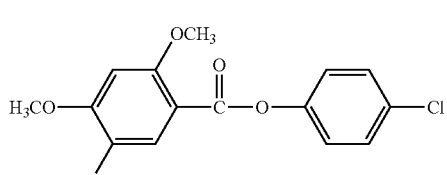

A-12
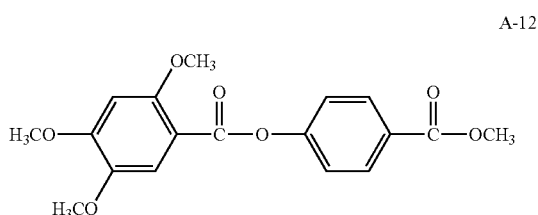

A-13
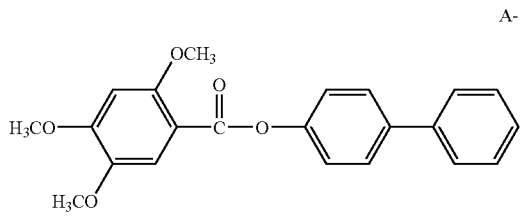

-continued

A-14: 2,4,5-trimethoxybenzoic acid 4-phenoxyphenyl ester

A-15: 2,4,5-trimethoxybenzoic acid phenyl ester

A-16: 2,4,5-trimethoxybenzoic acid 4-methoxyphenyl ester

A-17: 2,4,5-trimethoxybenzoic acid 4-ethylphenyl ester

A-18: 2,4,5-trimethoxybenzoic acid 4-methylphenyl ester

A-19: 4-methoxybenzoic acid 4-methylphenyl ester

A-20: 4-methoxybenzoic acid 4-methoxyphenyl ester

A-21: 4-methoxybenzoic acid 4-ethoxyphenyl ester

A-22: 4-methoxybenzoic acid 4-propoxyphenyl ester

A-23: 4-ethoxybenzoic acid 4-methoxyphenyl ester

A-24: 4-ethoxybenzoic acid 4-ethoxyphenyl ester

A-25: 4-ethoxybenzoic acid 4-propoxyphenyl ester

A-26: 4-propoxybenzoic acid 4-methoxyphenyl ester

A-27: 4-propoxybenzoic acid 4-ethoxyphenyl ester

A-28: 4-propoxybenzoic acid 4-propoxyphenyl ester

A-29: 4-methoxybenzoic acid 4-hexyloxyphenyl ester

A-30: 4-hexyloxybenzoic acid 4-methoxyphenyl ester

A-31: 4-propoxybenzoic acid 4-butoxyphenyl ester

A-32: 4-propoxybenzoic acid 4-isopropoxyphenyl ester

A-33: 2,4,5-trimethoxybenzoic acid 4-ethynylphenyl ester

A-34: 2,4,5-trimethoxybenzoic acid 3-cyanophenyl ester

-continued

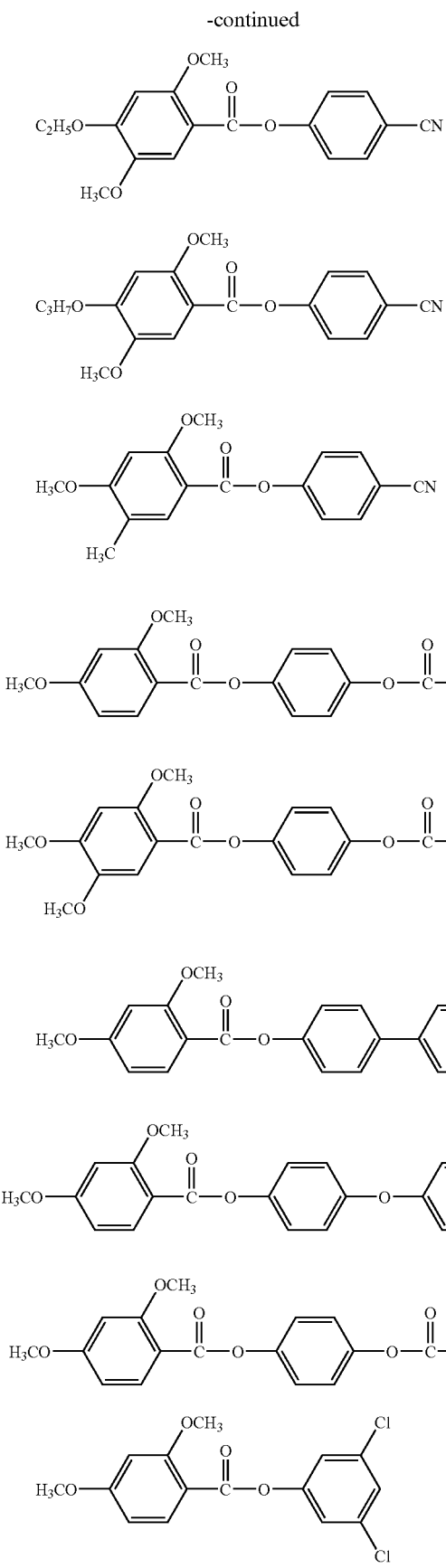
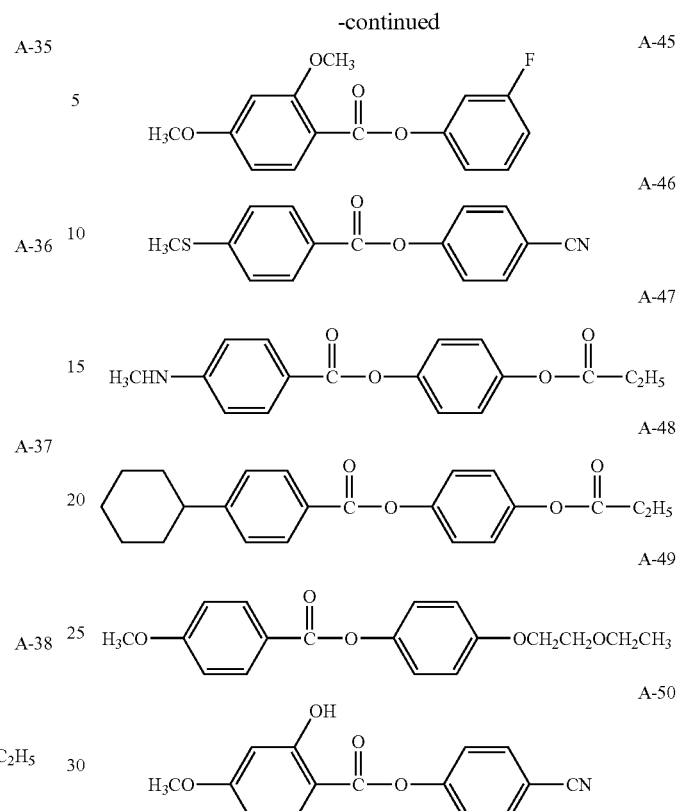

The compound of formula (IV) is synthesized by any mode of esterification reaction between a substituted benzoic acid and a phenol derivative. For example, a substituted benzoic acid is converted into an acid halide, which is condensed with phenol, or a substituted benzoic acid and a phenol derivative are condensed with dehydration using a condensing agent or a catalyst. The former process is preferred for the manufacturing advantages it offers.

Reaction solvents that can be used in the synthesis include hydrocarbons (preferably toluene and xylene), ethers (preferably dimethyl ether, tetrahydrofuran, and dioxane), ketones, esters, acetonitrile, dimethylformamide, and dimethylacetamide. The solvents may be used either individually or as a mixture of two or more thereof. Preferred of them are toluene, acetonitrile, dimethylformamide, and dimethylacetamide.

The reaction is preferably carried out at 0° to 150° C., still preferably 0° to 100° C., even still preferably 0° to 90° C., particularly preferably 20° to 90° C. The reaction is preferably conducted in the absence of a base. Where a base is used, usable bases include organic or inorganic bases, preferably organic bases, such as pyridine and tertiary alkylamines (preferably triethylamine or ethyldiisopropylamine).

Two or more kinds of rod-like compounds showing, in their solutions, the absorption peaks (λmax) at 250 nm or shorter wavelengths in the UV absorption spectrum may be used in combination.

The cellulose acylate film preferably contains fine particles as a matting agent. Fine particles that can be used in the invention include silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate, and calcium phosphate. Those containing silicon, particularly silicon dioxide, are preferred for turbidity reduction. It is preferred to use silicon dioxide particles having an average primary particle size of 20 nm or smaller, still preferably 5 to 16 nm, and an apparent specific gravity of 70 g/l or more, still preferably 90 to 200 g/l, even still preferably 100 to 200 g/l. The small primary particle size is advantageous for haze reduction. The high apparent specific gravity allows for preparation of a high concentration dispersion, which leads to reduction of haze and agglomerates.

The amount of the silicon dioxide fine particles, if used, is preferably 0.01 to 0.3 parts by weight per 100 parts by weight of the polymer component inclusive of the cellulose acylate.

The fine particles usually form secondary particles having an average particle size of 0.1 to 3.0 μm and are present in the film as agglomerates of the primary particles to provide the film with a surface unevenness of 0.1 to 3.0 μm. The average secondary particle size is preferably 0.2 to 1.5 μm, still preferably 0.4 to 1.2 μm, even still preferably 0.6 to 1.1 μm. Secondary particles greater than 1.5 μm increase haze, and those smaller than 0.2 μm have an insufficient inhibitory effect on film creaking.

The diameter of a circumcircle of a primary or secondary particle under a scanning electron microscope is taken as a particle size of the particle. A total of 200 particles at different sites are measured to obtain an average particle size.

Commercially available silicon dioxide particles can be made use of, including AEROSIL R972, R972V, R974, R812, 200, 200V, 300, R202, OX50 and TT600 (all available from Nippon Aerosil Co., Ltd.). Commercially available zirconium oxide particles, such as AEROSIL R976 and R811 (both from Nippon Aerosil Co., Ltd.), are useful.

Among these products, AEROSIL 200V and AEROSIL R972 (silicon dioxide) are particularly preferred as having an average primary particle size of 20 nm or smaller and an apparent specific gravity of 70 g/l or more and being highly effective in reducing frictional coefficient of the film while maintaining low turbidity.

Some techniques are proposed in preparing a matting agent dispersion to obtain a cellulose acylate film containing small secondary particles of the matting agent. In a method, the fine particles of a matting agent and a solvent are mixed by stirring to prepare a dispersion. Separately, a cellulose acylate solution (dope) is prepared. The matting agent dispersion is added to a small portion of the cellulose acylate solution and dissolved by stirring, followed by mixing with the rest of the dope. According to this method, silicon dioxide particles can be dispersed well and hardly re-agglomerate. In another method, a small amount of a cellulose acylate is dissolved in a solvent by stirring, and the fine particles are added thereto and dispersed in a dispersing machine. The resulting dispersion is thoroughly mixed with the dope in an in-line mixer. The present invention is not restricted by these methods. In dispersing the silicon dioxide particles in a solvent or a solution, the silicon dioxide concentration is preferably 5% to 30% by weight, still preferably 10% to 25% by weight, even still preferably 15% to 20% by weight. A higher dispersion concentration results in a lower liquid turbidity for the amount of addition, leading to reduction in haze and agglomerates. The amount of the matting agent in the final cellulose acylate dope is preferably 0.01 to 1.0 g/m$^2$, still preferably 0.03 to 0.3 g/m$^2$, even still preferably 0.08 to 0.16 g/m$^2$.

The solvent to be used in the preparation of the matting agent dispersion preferably includes lower alcohols, such as methyl alcohol, ethyl alcohol, propyl alcohol, isopropyl alcohol, and butyl alcohol, and organic solvents that can be used in the cellulose acylate dope preparation.

The organic solvents that can be used in dissolving a cellulose acylate to prepare a film-forming cellulose acylate solution (dope) will be described.

Both chlorine-containing solvent systems containing a chlorine-containing organic solvent as a main solvent and chlorine-free organic solvent systems are useful in the invention. A chlorine-containing organic solvent is preferably used as a main solvent in the preparation of the cellulose acylate solution. The chlorine-containing organic solvent is not particularly limited as long as it is capable of dissolving the cellulose acylate to give a casting dope. Preferred chlorine-containing organic solvents include dichloromethane and chloroform, with dichloromethane being still preferred. The chlorine-containing organic solvents may be used in combination with other organic solvents. In that case, however, dichloromethane should be used in a proportion of at least 50% by weight based on the organic solvent system. The other organic solvents that can be used in combination with the chlorine-containing solvents preferably include esters, ketones, ethers, alcohols, and hydrocarbons, each having 3 to 12 carbon atoms. The esters, ketones, ethers, and alcohols may have a cyclic structure. Compounds having two or more functional groups selected from an ester group, a keto group, and an ether group (i.e., —O—, —CO—, and —COO—) are useful as well. Other functional groups such as an alcoholic hydroxyl group may also be possessed. In the case of an organic solvent having two or more kinds of such functional groups, the number of the carbon atoms possessed by the solvent compound should fall within a range recited for compounds having any one of the functional groups. Esters having 3 to 12 carbon atoms include ethyl formate, propyl formate, pentyl formate, methyl acetate, ethyl acetate, and pentyl acetate. Ketones having 3 to 12 carbon atoms include acetone, methyl ethyl ketone, diethyl ketone, diisobutyl ketone, cyclopentanone, cyclohexanone, and methylcyclohexanone. Ethers having 3 to 12 carbon atoms include diisopropyl ether, dimethoxymethane, dimethoxyethane, 1,4-dioxane, 1,3-dioxolane, tetrahydrofuran, anisole, and phenetol. Examples of the organic solvents having two or more kinds of functional groups include 2-ethoxyethyl acetate, 2-methoxyethanol, and 2-butoxyethanol.

The alcohols that can be used in combination with the chlorine-containing organic solvent may be straight-chain, branched or cyclic and preferably include saturated aliphatic hydrocarbons. The hydroxyl group of the alcohol may be primary, secondary or tertiary. Examples of the alcohols are methanol, ethanol, 1-propanol, 2-propyl alcohol, 1-butanol, 2-butanol, t-butanol, 1-pentanol, 2-methyl-2-butanol, and cyclohexanol. Fluoroalcohols, such as 2-fluoroethanol, 2,2,2-trifluoroethanol, and 2,2,3,3-tetrafluoro-1-propanol, are also useful. The hydrocarbons that can be used in combination with the chlorine-containing organic solvent may be straight-chain, branched or cyclic and include aromatic ones and aliphatic ones. The aliphatic hydrocarbons may be saturated or unsaturated. Examples of the hydrocarbons are cyclohexane, hexane, benzene, toluene, and xylene.

Examples of the combinations of chlorine-containing organic solvents and other organic solvents include, but are not limited to:

(1) dichloromethane/methanol/ethanol/butanol (80/10/5/5 by weight, hereinafter the same)

(2) dichloromethane/acetone/methanol/propanol (80/10/5/5)

(3) dichloromethane/methanol/butanol/cyclohexane (80/10/5/5)

(4) dichloromethane/methyl ethyl ketone/methanol/butanol (80/10/5/5)

(5) dichloromethane/acetone/methyl ethyl ketone/ethanol/isopropyl alcohol (75/8/5/5/7)

(6) dichloromethane/cyclopentanone/methanol/isopropyl alcohol (80/7/5/8)

(7) dichloromethane/methyl acetate/butanol (80/10/10)

(8) dichloromethane/cyclohexanone/methanol/hexane (70/20/5/5)

(9) dichloromethane/methyl ethyl ketone/acetone/methanol/ethanol (50/20/5/5)

(10) dichloromethane/1,3-dioxolane/methanol/ethanol (70/20/5/5)

(11) dichloromethane/dioxane/acetone/methanol/ethanol (60/20/10/5/5)

(12) dichloromethane/acetone/cyclopentanone/ethanol/isobutanol/cyclohexane (65/10/10/5/5/5)

(13) dichloromethane/methyl ethyl ketone/acetone/methanol/ethanol (70/10/10/5/5)

(14) dichloromethane/acetone/ethyl acetate/ethanol/butanol/hexane (65/10/10/5/5/5)

(15) dichloromethane/methyl acetoacetate/methanol/ethanol (65/20/10/5), and

(16) dichloromethane/cyclopentanone/ethanol/butanol (65/20/10/5)

The chlorine-free organic solvents that can be used as a main solvent in the preparation of a cellulose acylate dope are not particularly limited as long as they are capable of dissolving the cellulose acylate to give a casting dope. Preferred chlorine-free organic solvents include esters, ketones, and ethers each of which contains 3 to 12 carbon atoms and may have a cyclic structure. Compounds having two or more functional groups selected from an ester group, a keto group, and an ether group (i.e., —O—, —CO—, and —COO—) are also useful as a main solvent. Other functional groups such as an alcoholic hydroxyl group may also be possessed. In the case of an organic solvent having two or more kinds of such functional groups, the number of the carbon atoms possessed by the solvent compound should fall within a range recited for compounds having any one of the functional groups. Esters having 3 to 12 carbon atoms include ethyl formate, propyl formate, pentyl formate, methyl acetate, ethyl acetate, and pentyl acetate. Ketones having 3 to 12 carbon atoms include acetone, methyl ethyl ketone, diethyl ketone, diisobutyl ketone, cyclopentanone, cyclohexanone, and methylcyclohexanone. Ethers having 3 to 12 carbon atoms include diisopropyl ether, dimethoxymethane, dimethoxyethane, 1,4-dioxane, 1,3-dioxolane, tetrahydrofuran, anisole, and phenetol. Examples of the organic solvents having two or more kinds of functional groups include 2-ethoxyethyl acetate, 2-methoxyethanol, and 2-butoxyethanol.

A choice is made from among the chlorine-free organic solvents from various viewpoints stated above. More specifically, the chlorine-free organic solvent that can be preferably used in the invention is a mixed solvent system containing the above-recited chlorine-free organic solvent as a main component. The mixed solvent system is preferably composed of a first solvent component selected from methyl acetate, ethyl acetate, methyl formate, ethyl formate, acetone, dioxolane, dioxane, and a mixture thereof, a second solvent component selected from a ketone having 4 to 7 carbon atoms and an acetoacetic ester, and a third solvent component selected from an alcohol or hydrocarbon having 1 to 10 carbon atoms, particularly an alcohol having 1 to 8 carbon atoms. Where the first solvent component is a mixture, the second solvent component may be omitted. The first solvent component is preferably methyl acetate, acetone, methyl formate, ethyl formate or a mixture thereof, and the second solvent component is preferably methyl ethyl ketone, cyclopentanone, cyclohexanone or methyl acetylacetate. The second solvent component may be a mixture of the solvents recited as a preferred second solvent component.

The alcohols as the third solvent component may be straight-chain or branched or cyclic and preferably include saturated aliphatic hydrocarbons. The hydroxyl group of the alcohols may be primary, secondary or tertiary. Examples of the alcohols are methanol, ethanol, 1-propanol, 2-propyl alcohol, 1-butanol, 2-butanol, t-butanol, 1-pentanol, 2-methyl-2-butanol, and cyclohexanol. Fluoroalcohols, such as 2-fluoroethanol, 2,2,2-trifluoroethanol, and 2,2,3,3-tetrafluoro-1-propanol, are also useful. The hydrocarbons as the third solvent component may be straight-chain, branched or cyclic and include aromatic ones and aliphatic ones. The aliphatic hydrocarbons may be saturated or unsaturated. Examples of the hydrocarbons are cyclohexane, hexane, benzene, toluene, and xylene. The third solvent component may be a single compound or a mixture of two or more compounds selected from these alcohols and hydrocarbons. Examples of preferred third solvent components include methanol, ethanol, 1-propanol, 2-propyl alcohol, 1-butanol, 2-butanol, cyclohexanol, cyclohexane, and hexane. Methanol, ethanol, 1-propanol, 2-propyl alcohol, and 1-butanol are particularly preferred.

The chlorine-free mixed solvent system preferably contains 20% to 95% by weight of the first solvent component, 2% to 60% by weight of the second solvent component, and 2% to 30% by weight of the third solvent component. Still preferably, the system contains 30% to 90% by weight of the first component, 3% to 50% by weight of the second component, and 3% to 25% by weight of the alcohol as the third component. Even still preferably, the solvent system contains 30% to 90% by weight of the first component, 3% to 30% by weight of the second component, and 3% to 15% by weight of the alcohol as the third component. More detailed information about the chlorine-free organic solvent system that can be used in the invention are given in *Journal of Technical Disclosure*, No. 2001-1745, pp. 12-16, Japan Institute of Invention and Innovation, March, 2001.

Preferred compositions of the chlorine-free organic solvent systems include, but are not limited to:

(1) methyl acetate/acetone/methanol/ethanol/butanol (75/10/5/5/5 by weight, hereinafter the same)

(2) methyl acetate/acetone/methanol/ethanol/propanol (75/10/5/5/5)

(3) methyl acetate/acetone/methanol/butanol/cyclohexane (75/10/5/5/5)

(4) methyl acetate/acetone/ethanol/butanol (81/8/7/4)

(5) methyl acetate/acetone/ethanol/butanol (82/10/4/4)

(6) methyl acetate/acetone/ethanol/butanol (80/10/4/6)

(7) methyl acetate/methyl ethyl ketone/methanol/butanol (80/10/5/5)

(8) methyl acetate/acetone/methyl ethyl ketone/ethanol/isopropyl alcohol (75/8/5/5/7)

(9) methyl acetate/cyclopentanone/methanol/isopropyl alcohol (80/7/5/8)

(10) methyl acetate/acetone/butanol (85/10/5)

(11) methyl acetate/cyclopentanone/acetone/methanol/butanol (60/15/14/5/6)

(12) methyl acetate/cyclohexanone/methanol/hexane (70/20/5/5)

(13) methyl acetate/methyl ethyl ketone/acetone/methanol/ethanol (50/20/20/5/5)

(14) methyl acetate/1,3-dioxolane/methanol/ethanol (70/20/5/5)

(15) methyl acetate/dioxane/acetone/methanol/ethanol (60/20/10/5/5)

(16) methyl acetate/acetone/cyclopentanone/ethanol/isobutanol/cyclohexane (65/10/10/5/5/5)

(17) methyl formate/methyl ethyl ketone/acetone/methanol/ethanol (50/20/5/5)

(18) methyl formate/acetone/ethyl acetate/ethanol/butanol/hexane (65/10/10/5/5/5)

(19) acetone/methyl acetoacetate/methanol/ethanol (65/20/10/5)

(20) acetone/cyclopentanone/ethanol/butanol (65/20/10/5)

(21) acetone/1,3-dioxolane/ethanol/butanol (65/20/10/5), and (22) 1,3-dioxolane/cyclohexanone/methyl ethyl ketone/methanol/butanol (55/20/10/5/5/5)

In addition to the above, a cellulose acylate solution can be prepared by a method in which a cellulose acylate is dissolved in a mixed solvent of methyl acetate, acetone, ethanol, and butanol at a ratio of 81/8/7/4 by part by weight, the solution is filtered and concentrated, and 2 parts by weight of butanol is added to the concentrated solution; a method in which a cellulose acetate is dissolved in a mixed solvent of methyl acetate, acetone, ethanol and butanol at a ratio of 84/10/4/2 by part by weight, the solution is filtered and concentrated, and 4 parts by weight of butanol is added to the concentrated solution; or a method in which a cellulose acetate is dissolved in a mixed solvent of methyl acetate, acetone, and ethanol at a ratio of 84/10/6 by part by weight, the solution is filtered and concentrated, and 5 parts by weight of butanol is added to the concentrated solution.

The dope based on the chlorine-free solvent system may contain 10% by weight or less of dichloromethane based on the total solvent system.

The cellulose acylate solution for film formation (dope) preferably has a concentration of 10% to 30% by weight, still preferably 13% to 27% by weight, even still preferably 15% to 25% by weight, in view of suitability to casting. The manner of preparing the cellulose acylate solution is not restricted as long as a desired concentration results. For example, a predetermined amount of a cellulose acylate may be dissolved in a solvent so as to give a concentration as designed, or a solution at a lower concentration (e.g., 9% to 14% by weight) than designed is once prepared, which is finally adjusted to a higher concentration as designed. It is also possible, to the contrary, that a solution at a higher concentration than designed is once prepared, to which various additives are added to result in a desired concentration.

In view of peelability or releasability of cast film from a casting support, the cellulose acylate solution is preferably such that the aggregates of cellulose acylate molecules (formed as a result of molecular association) in the solution as diluted with the same solvent system to a concentration of 0.1% to 5% by weight may have a molecular weight of 150,000 to 15,000,000, still preferably 180,000 to 9,000,000. The molecular weight of the aggregates is obtained by the static light scattering method. The diluted cellulose acylate solution is preferably such that the RMS radius, which is concomitantly determined in the molecular weight measurement by the static light scattering method, is 10 to 200 nm, still preferably 20 to 200 nm. Furthermore, the diluted cellulose acylate solution is preferably such that a second virial coefficient ranges from $-2 \times 10^{-4}$ to $+4 \times 10^{-4}$, still preferably from $-2 \times 10^{-4}$ to $+2 \times 10^{-4}$.

The molecular weight of aggregates, RMS radius, and secondary virial coefficient of the cellulose acylate solution are measured by the static light scattering method as follows. Although these measurements are made on a diluted solution, the results of the measurements duly reflect the behavior of the dope.

A cellulose acylate having been dried at 120° C. for 2 hours is dissolved in the same solvent as used in the preparation of a dope to prepare thin solutions having a concentration of 0.1%, 0.2%, 0.3%, and 0.4% by weight. In order to avoid moisture absorption, the cellulose acylate is weighed at 25° C. and 10% RH. Dissolving is effected under the same temperature condition (at room temperature or under cooling or heating) as used in the preparation of a dope. The solutions and the solvent are filtered through a 0.2 µm Teflon filter and measured for static light scattering on a light scattering spectrophotometer DLS-700 (from Otsuka Electronics Co., Ltd.) at 25° C. at an angle varied from 30° to 140° by an increment of 10°. The static light scattering data obtained are analyzed by Berry plots. The solvent refractive index, which is necessary for the analysis, is obtained with an Abbe refractometer system, and the refractive index increment (dn/dc), which is also necessary for the analysis, is measured with a differential refractometer DRM-1021 (from Otsuka Electronics) using the same solvent and solutions used in the measurement of light scattering.

The film-forming cellulose acylate solution (dope) is prepared by any method, i.e., at room temperature, while cooling, or at high temperature, or a combination thereof. The details of cellulose acylate dope preparation are described, e.g., in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-4-259511, JP-A-2000-273184, JP-A-11-323017, and JP-A-11-302388. These known techniques relating to dissolving a cellulose acylate in an organic solvent are appropriately applied to the present invention unless inconsistent with the scope and spirit of the present invention. For greater detail, particularly about chlorine-free solvent systems, reference can be made to *Journal of Technical Disclosure*, No. 2001-1745, pp. 22-25, Japan Institute of Invention and Innovation, March, 2001. Refer to *ibid*, p. 25 for concentration and filtration which are usually involved in cellulose acylate dope preparation. When a cellulose acylate is dissolved in an organic solvent at high temperature, the heating temperature is in most cases above the boiling point of the solvent. In such cases the system is placed under pressure.

The cellulose acylate dope preferably has the following viscosity and dynamic storage modulus to secure ease of casting. Measurement is made on 1 ml of a sample solution with a rheometer CSL 500 (from TA Instruments Inc.) using a stainless steel cone and plate geometry (cone diameter of 4 cm and angle of 2°) (from TA Instruments). A temperature ramp in oscillation mode is used by varying between 40° C. and −10° C. at a rate of 2° C./min. The static non-Newtonian viscosity n* (Pa·s) at 40° C. and the storage modulus G' (Pa) at −5° C. are measured. Before starting the measurement, the sample solution is maintained at the starting temperature until the solution temperature becomes constant. It is preferred for the dope to have a viscosity of 1 to 400 Pa·s at 40° C. and a dynamic storage modulus of 500 Pa or higher at 15° C. It is still preferred for the dope to have a viscosity of 10 to 200 Pa·s at 40° C. and a dynamic storage modulus of 100 to 1,000,000 Pa or higher at 15° C. It is also preferred for the dope to have a higher dynamic storage modulus at low temperatures. When a casting support is at −5° C., for instance, the dope preferably has a dynamic storage modulus of 10,000 to 1,000,000 Pa at −5° C. When a casting support is at −50° C., the dope preferably has a dynamic storage modulus of 10,000 to 5,000,000 Pa at −50° C.

In the present invention, using the specific cellulose acylate allows for preparation of a high-concentration and yet highly stable dope without involving the operation of concentration.

Understandably, the operation of concentration may be used where a cellulose acylate solution at a lower concentration is once prepared and then concentrated to a desired concentration to make dissolving easier. Concentration can be carried out by any method. For example, the method of JP-A-4-259511 is useful, in which a low concentration solution is introduced into a cylinder between the inner wall of the cylinder and the periphery of a rotating blade rotating along the inner wall of the cylinder while affording a temperature difference to the solution thereby causing the solvent to evaporate. The method disclosed in U.S. Pat. Nos. 2,541,012, 2,858,229, 4,414,341, and 4,504,355 is also effective, in which a heated low-concentration solution is sprayed into a container from a nozzle, and the solvent is flash-evaporated before the solution strikes against the inner wall of the container. The solvent vapor is driven out of the container, and the concentrated solution is withdrawn from the bottom of the container.

The dope is preferably filtered through an appropriate filter such as a metal screen or flannel to remove any insoluble matter and foreign matter (e.g., dust and impurity). To filter the cellulose acylate dope it is preferred to use a filter with an absolute filtration capability of 0.1 to 100 μm, still preferably 0.5 to 25 μm. The filter thickness is preferably 0.1 to 10 mm, still preferably 0.2 to 2 mm. With that thickness, the filtration pressure is preferably 1.6 MPa or lower, still preferably 1.2 MPa or lower, even still preferably 1.0 MPa or lower, particularly preferably 0.2 MPa or lower. Filters of known filter materials including glass fiber, cellulose fiber, filter paper, and fluoropolymers such as polytetrafluoroethylene are used. Filters made of ceramics or metals are preferred. The viscosity of the dope immediately before casting should be within a range suitable for casting, which is preferably from 10 to 2000 Pa·s, still preferably 30 to 1000 Pa·s, even still preferably 40 to 500 Pa·s. The temperature of the dope immediately before casting is preferably −5° to 70° C., still preferably −5° to 55° C.

The cellulose acylate dope is cast into film using a method and apparatus conventionally employed to carry out solvent casting. The dope prepared in a dissolving tank is once stored in a storage tank for defoaming. The thus obtained final dope is fed to a pressure die through a pressure pump, e.g., a constant displacement gear pump capable of precise metering by the number of rotations and uniformly cast through the slot of the pressure die on an endlessly moving metal support. When the dope on the support makes almost one revolution and reaches a peeling position, by which time the dope has half-dried, the half-dried dope called a web is peeled off the support. The web is dried while being conveyed by a tenter with its width fixed by clips, finally dried between a group of rolls in a dryer, and taken up on a winder with a prescribed length. The combination of the tenter and the dryer having rolls is subject to alteration depending on the purpose. Where a functional protective film for application to electronic displays is produced, a coater is often used in addition to the solvent casting equipment to provide a functional layer, such as an undercoating layer, an antistatic layer, an anti-halation layer, or a protective layer, on the cellulose acylate cast film.

Each of the steps involved in the formation of the cellulose acylate film will be briefly illustrated below, but the invention is not restricted thereto.

The finally prepared dope is cast on a rotating drum or band (support), and the solvent is made to evaporate to form a film. The dope to be cast is preferably adjusted to have a solids content of 5% to 40% by weight. The surface of the support is preferably mirror finished. The support surface temperature is preferably 30° C. or lower, still preferably −10° to 20° C. The casting methods described in JP-A-2000-301555, JP-A-2000-301558, JP-A-7-32391, JP-A-3-193316, JP-A-5-86212, JP-A-62-37113, JP-A-2-276607, JP-A-55-14201, JP-A-2-111511, and JP-A-2-208650 can be used.

Solvent casting may be carried out using a single cellulose acylate dope, or two or more cellulose acylate dopes nay be cast on the same support (layered casting) to obtain a laminate cast film. Layered casting may be carried out by casting the dopes through the respective dies provided at spacing in the moving direction of the support. The techniques described in JP-A-61-158414, JP-A-1-122419, and JP-A-11-198285 can be utilized. Layered casting may also be performed by co-casting two dopes through the respective die slots as described, e.g., in JP-B-60-27562, JP-A-61-94724, JP-A-61-947245, JP-A-61-104813, JP-A-61-158413, and JP-A-6-134933. The solvent casting technique proposed in JP-A-56-162617 is also useful, in which a flow of a high viscosity cellulose acylate dope is surrounded by a flow of a low viscosity cellulose acylate dope, and the two dopes are simultaneously extruded onto a support. In a preferred embodiment, the content of an alcohol component as a poor solvent is made higher in the outer dope than in the inner dope as proposed in JP-A-61-94724 and JP-A-61-94725. The technique disclosed in JP-B-44-20235 is also useful, in which a cast film formed by casting a first dope on a support from a first die is peeled, and a second dope is cast from a second die onto the cast film on the side that has been in contact with the support. The two or more cellulose acylate dopes used in layered casting may be either the same or different. To impart functions to two or more cellulose acylate layers, cellulose acylate dopes appropriate for the respective functions may be extruded from the respective slots. It is also possible to cast the cellulose acylate dope simultaneously with other functional layers (for example, an adhesive layer, a dye layer, an antistatic layer, an anti-halation layer, a UV absorbing layer and a polarizing layer).

To achieve a required film thickness by single layer casting, it is necessary to extrude a high-concentration, high-viscosity cellulose acylate dope. Such a dope has poor stability and tends to form solid matter, which can often cause machine trouble or results in formation of a cast film with poor surface smoothness. The above-described layered casting provides a solution to this problem. Since a plurality of highly viscous cellulose acylate dopes are cast from the respective die slots on a metal support simultaneously, the resulting cast film exhibits excellent surface properties such as improved smoothness. Furthermore, use of thick cellulose acylate dopes contributes to decrease in drying load and increase of production speed. In the case of co-casting, the thickness of the inner layer and that of the outer layer are not particularly limited. It is preferable that the outer thickness is 1% to 50%, still preferably 2% to 30%, of the total thickness. In the case of co-casting three or more layers, the total film thickness of the layer having been in contact with the metal support and the layer having been in contact with the atmosphere is defined as "outer thickness". Cellulose acylate dopes differing from each other in concentrations of the above-described additives such as a plasticizer, a UV absorber, and a matting agent can be co-cast to form a cellulose acylate laminate film. For example, a cellulose acylate laminate film composed of a skin layer/a core layer/a skin layer can be obtained. In this layer structure, a matting agent, for example, may be added in a larger amount to the skin layers or exclusively added to the skin layers. A plasticizer and a UV absorber may be added in larger amounts to the core layer than to the skin layer or added only to the core layer. The kind of plasticizers or UV absorbers may be changed between the core layer and the skin layers. For example, a less volatile plasticizer and/or UV absorber may be added to the skin layers, while a plasticizer having an excellent plasticizing effect or a UV absorber showing high UV absorption may be added to the core layer. It is also a preferred embodiment to add a release agent only to the support side skin layer. In case of chill-roll extrusion, since the dope is gelled by cooling the metal support, it is preferred to add an alcohol, i.e., a poor solvent in a larger amount to the skin layer. The skin layers and the core layer may have different Tgs. It is preferred that the Tg of the core layer be lower than that of the skin layer. The dopes for the skin layers and the core layer may have different viscosities. While it is usually preferred that the viscosity of the skin layers be lower than that of the core layer, the viscosity of the core layer may be lower than that of the skin layers.

Casting a dope is carried out by, for example, a method wherein a prepared dope is uniformly extruded from a pressure die onto a metal support, a method in which a dope once cast on a metal support is leveled with a doctor blade to control the film thickness or a method using a reverse roll coater n which the film thickness is controlled by a roll rotating in the reverse direction. The method using a pressure die is preferred. Pressure dies include a coathanger type and a T-die type, each of which can be used preferably. In addition to the methods described above, use can be made of various known solvent casting techniques for forming a cellulose acylate film. By properly selecting conditions taking the differences, e.g., in boiling point of solvents into consideration, the effects and advantages as reported in the publications will be obtained.

The continuously moving metal support to be used in solvent casting includes a drum having the surface mirror finished by chromeplating and a stainless steel belt or band having the surface mirror polished. One or more pressure dies are provided above the metal support. A preferred number of the pressure dies is one or two. Where two or more pressure dies are provided, the dope to be cast may be divided into portions in amounts appropriate for the respective dies. It is also possible to feed the dope in predetermined amounts into the dies by using respective precise metering gear pumps. The temperature of the cellulose acylate dope to be cast preferably ranges from −10° to 55° C., still preferably from 25° to 50° C. The dope temperature may be maintained constant throughout the process involved in the dope preparation or vary from stage to stage. In the latter case, the temperature should be at a prescribed level immediately before being cast.

The cellulose acylate web on the metal support is dried usually by blowing hot air to the metal support (a drum or a belt), i.e., the exposed side of the web on the metal support or to the inner side of the drum or belt, or applying a temperature-controlled liquid to the inner side of the drum or belt (i.e., the side opposite to the casting side) to heat the drum or the belt by heat transfer and control the surface temperature. The liquid heat transfer method is preferred. The surface temperature of the metal support is not limited as long as it is not higher than the boiling points of the solvents used in the dope. To promote the drying or the loss of fluidity of the web on the metal support, it is preferred to set the support surface at a temperature lower than the lowest boiling point of the solvents used in the dope by 1 to 10° C., which does not apply, however, to the case where the web is stripped without cooling and drying.

The retardation of the cellulose acylate cast film can be controlled by stretching. Positive stretching in the width direction is proposed as disclosed, e.g., in JP-A-62-115035, JP-A-4-152125, JP-A-4-284211, JP-A-4-298310, and JP-A-11-48271. By stretching, the in-plane retardation value of the cellulose acylate film can be increased.

The stretching is carried out at room temperature or under heating. The heating temperature is preferably at or below the glass transition temperature of the film. The film can be stretched either uniaxially (in the longitudinal or transverse direction) or biaxially. Biaxial stretching may be conducted either simultaneously or successively. The stretch ratio is from 1% to 200%, preferably from 1% to 100%, still preferably from 1% to 50%. It is preferred for a birefringent optical film to have a larger refractive index in the transverse direction than in the longitudinal direction. Accordingly, it is recommended to stretch the film at a higher ratio in the transverse direction than in the longitudinal direction. The step of stretching may be incorporated into the line of film formation or may be carried out in a separate line on a film unwound from a roll. In the former case, the film as containing a residual solvent may be stretched. The residual solvent content of the film to be stretched is preferably 2% to 30%.

The thickness of the cellulose acylate film (after drying) is subject to variation depending on the intended use. It usually ranges from 5 to 500 μm, preferably 20 to 300 μm, still preferably 30 to 150 μm. For use in a VA mode liquid crystal display, it is preferably 40 to 110 μm.

A desired film thickness can be obtained by adjusting the solids concentration of the dope, the slot gap of the die, the extrusion pressure from the die, the moving speed of the metal support, and the like.

The width of the cellulose acylate film thus obtained is preferably 0.5 to 3 m, still preferably 0.6 to 2.5 m, even still preferably 0.8 to 2.2 m. The length of the film wound per roll is preferably 100 to 10,000 m, still preferably from 500 to 7,000 m, even still preferably 1,000 to 6,000 m. When the film is wound up, it is preferably knurled along at least one edge thereof. The knurling width is preferably 3 to 50 mm, still preferably 5 to 30 mm, and the knurling height is preferably 0.5 to 500 μm, still preferably from 1 to 200 μm. Knurling may be either one-sided or double-sided.

Variation in Re(590) in the width direction is preferably within ±5 nm, still preferably ±3 nm. Variation in Rth(590) in the width direction is preferably ±10 nm, still preferably ±5 nm. The same preference applies to variations in Re(590) and Rth(590) in the longitudinal direction.

In order to widen the viewing angle of LCDs, especially LCDs of VA mode, it is preferred for the cellulose acylate protective film to have optical characteristics satisfying formulae (7) and (8):

$$20 \text{ nm} \leq Re(590) \leq 200 \text{ nm} \quad (7)$$

$$70 \text{ nm} \leq Rth(590) \leq 400 \text{ nm} \quad (8)$$

The ratio of Re(590) to Rth(590) is preferably 0.1 to 0.8, still preferably 0.25 to 0.6. These optical characteristics can be controlled by selection of the kind and the amount of additives and the stretch ratio.

In the present invention, Re(λ) and Rth(λ) stand for an in-plane retardation and a thickness direction retardation at a wavelength λ. Re(λ) is measured for the incidence of light having a wavelength of λ nm in the direction normal to the film surface with a phase difference measurement system KOBRA 21ADH (from Oji Scientific Instruments). Rth(λ) is calculated by KOBRA 21ADH based on retardation values measured in three directions: first is the Re(λ) obtained above, second is a retardation measured for light of a wavelength λ nm incident in a direction rotated by +40° with respect to the normal direction of the film around the in-plane slow axis, which is decided by KOBRA 21ADH, as a tilting (rotation)

axis, and third is a retardation measured for light of a wavelength λ nm incident in a direction rotated by −40° with respect to the normal direction of the film surface around the in-plane slow axis as an a tilting (rotation) axis. A hypothetical value of average refractive index and the thickness of the film are also needed for calculation. The hypothetical value of average refractive index is known from *Polymer Handbook*, John Wiley & Sons, Inc. and catalogs of various optical films. The average refractive index of cellulose acylate is 1.48. KOBRA 21ADH thus calculates nx, ny, and nz.

The cellulose acylate film is used in both sides or only one side of a VA mode liquid crystal cell. Where used on both sides, the cellulose acylate film preferably has Re of 20 to 100 nm, still preferably 30 to 70 nm, and Rth of 70 to 300 nm, still preferably 100 to 200 nm. Where used on one side, the film preferably has Re of 30 to 150 nm, still preferably 40 to 100 nm, and Rth of 100 to 300 nm, still preferably 150 to 250 nm.

The variation in angle of in-plane slow axis of the cellulose acylate film preferably falls in a range of ±2°, still preferably ±1°, even still preferably ±0.5°, from a standard direction of a roll film. The "standard direction" is the longitudinal direction when the film is a longitudinally stretched film and the transverse direction when the film is a transversely stretched film.

The cellulose acylate film preferably has a difference ΔRe of 0 to 10 nm between the Re value measured at 25° C. and 10% RH and that at 25° C. and 80% RH (=Re10% RH−Re80% RH) and a difference ΔRth of 0 to 30 nm between the Rth value measured at 25° C. and 10% RH and that at 25° C. and 80% RH (=Rth10% RH−Rth80% RH), which is effective in reducing color change of LCDs with time.

The cellulose acylate film preferably has an equilibrium moisture content of 3.2% or less at 25° C. and 80% RH, which is also effective in reducing color change of LCDs with time. The moisture content of the cellulose acylate film is measured on a 7 mm wide and 35 mm long specimen by Karl Fischer's method using a moisture meter CA 03 and a sample dryer VA 05 (both available from Mitsubishi Chemical Corp.). The amount of moisture (g) is divided by the sample weight (g) to give a moisture content (%).

The cellulose acylate film preferably has a moisture permeability in terms of water vapor transmission rate (hereinafter, WVTR), normalized to a film thickness of 80 μm, of 400 to 1800 g/m²·24 hr at 60° C. and 95% RH, which is advantageous for reducing color change of LCDs with time. The WVTR reduces with film thickness. This is why the WVTR is normalized to a thickness of 80 μm irrespective of the sample's thickness. The WVTR normalized to a film thickness of 80 μm is calculated from formula: measured WVTR×measured film thickness (μm)/80 μm. WVTR Measurement is carried out in accordance with the method described in *Kobunshi no Bussei II* (Kobunshi Jikken Koza 4), Kyoritsu Shuppan, pp. 285-294: Joki Toka Ryo no Sokutei (Shituryo Ho, Ondokei Ho, Jokiatsu Ho, Kyuchaku Ho).

Glass transition temperature (Tg) of the cellulose acylate film is measured as follows. A 5 mm wide and 30 mm long specimen cut out of the unstretched cellulose acylate film is conditioned at 25° C. and 60% RH for at least 2 hours before measurement. The Tg measurement is made with a dynamic viscoelasticity measuring device Vibron DVA-225 from ITK Co., Ltd. at a sample length between grips of 20 mm, at a heating rate of 2° C./min from 30° to 200° C., and at a frequency of 1 Hz. The storage modulus is plotted on a logarithmic ordinate and temperature (° C.) on a linear abscissa. A line 1 (solid region) and a line 2 (glass transition region) showing a steep decrease in storage modulus observed at the phase transition from the solid region to the glass transition region are drawn. The intersection of the lines 1 and 2 indicates the temperature at which the storage modulus starts to decrease abruptly and the film starts to soften, i.e., at which the film begins to be transferred to the glass transition region. This temperature is referred to as the glass transition temperature Tg (dynamic viscoelasticity).

The cellulose acylate film preferably has a haze of 0.01% to 2%. The haze is measured for a specimen measuring 40 mm in width and 80 mm in length with a haze meter HGM-2DP (from Suga Test Instruments Co., Ltd.) in accordance with JIS K6714.

The cellulose acylate film preferably shows a change in mass of not more than 5% when left to stand at 80° C. and 90% RH for 48 hours and a change in dimension of not more than 5% when left to stand at 60° C. and 95% RH for 24 hours or at 90° C. and 5% RH for 24 hours.

The cellulose acylate film preferably has a photoelastic coefficient of $50 \times 10^{-13}$ cm²/dyne or less for reducing color change of LCDs with time. The photoelastic coefficient is measured by applying a tensile stress in the longitudinal direction to a 10 mm wide and 100 mm long specimen and measuring the retardation with an ellipsometer M150 (available from JASCO Corp.). The photoelastic coefficient is calculated from the change in retardation with stress.

The protective film that can be used in the present invention further includes a polymer film having an optically anisotropic layer. The optically anisotropic layer is preferably composed of a transparent polymer film, an alignment layer, and an optically anisotropic layer in that order.

The alignment layer can be provided by rubbing a layer formed of an organic compound (preferably a polymer), depositing an inorganic compound by oblique vacuum deposition, or forming a layer with microgrooves. An alignment layer that develops an aligning function on electric or magnetic field application or irradiation with light is also known. An alignment layer formed by rubbing a polymer layer is particularly preferred. The rubbing treatment is preferably carried out by rubbing the surface of a polymer layer with paper or cloth several times in a given direction. The rubbing direction is preferably substantially parallel to the absorption axis of the polarizer. Preferred polymers for preparing the alignment layer include polyimide, polyvinyl alcohol, and polymers described in JP-A-9-152509. The alignment layer preferably has a thickness of 0.01 to 5 μm, still preferably 0.05 to 2 μm.

The optically isotropic layer preferably contains a liquid crystal compound, particularly preferably a discotic liquid crystal compound. A discotic liquid crystal compound has a discotic core from which side chains extend radially as typically exemplified by triphenylene derivatives shown below.

Triphenylene Derivatives:

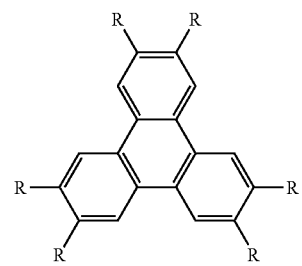

-continued

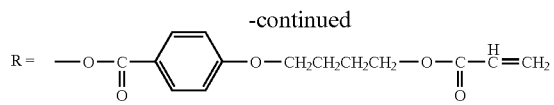

Substituents that react on heat or light application may be incorporated. Preferred examples of the discotic liquid crystal compounds are given in JP-A-8-50206.

The discotic liquid crystal molecules near the alignment layer are aligned substantially in parallel with the rubbing direction of the alignment layer with a pretilt angle. The discotic liquid crystal molecules on the atmosphere-facing side are aligned almost vertically. Thus, the discotic liquid crystal layer as a whole shows hybrid alignment, whereby to realize broadening of viewing angle in TN mode TFT-LCDs.

The optically anisotropic layer is usually obtained by applying a solution of the discotic compound and others (e.g., a polymerizable monomer and a photopolymerization initiator) in a solvent to the alignment layer, drying the coating film, heating the coating film to a temperature of discotic nematic phase formation, polymerizing the monomer by, for example, UV irradiation, followed by cooling. The discotic liquid crystal compound to be used in the invention preferably has a discotic nematic liquid crystal phase-solid phase transition temperature of 70° to 300° C., still preferably 70° to 170° C.

The compounds that are added to the optically anisotropic layer in addition to the discotic compound are not particularly limited as long as they are compatible with the discotic compound and do not hinder the alignment of the discotic compound and include, for example, a compound helping the discotic compound molecules change the tilt angle. Useful compounds preferably include polymerizable monomers (e.g., compounds having a vinyl group, a vinyloxy group, an acryloyl group or a methacryloyl group), fluorine-containing triazine compounds serving for alignment control on the air-facing side, and polymers such as cellulose acetate, cellulose acetate propionate, hydroxypropyl cellulose, and cellulose acetate butyrate. These compounds are usually added in an amount of 0.1% to 50% by weight, still preferably 0.1% to 30% by weight, based on the discotic compound.

The thickness of the optically anisotropic layer is preferably 0.1 to 10 µm, still preferably 0.5 to 5 µm.

The optically anisotropic layer may be a layer of non-liquid crystal polymer that is prepared by applying a solution of a non-liquid crystal compound in a solvent to a substrate followed by heat drying. Useful non-liquid crystal compounds include polymers such as polyamide, polyimide, polyester, polyether ketone, polyaryl ether ketone, polyamide-imide, and polyester-imide. These polymers can be used either individually or as a mixture of two or more thereof having different functional groups, such as a mixture of polyaryl ether ketone and polyamide. Preferred of these polymers is polyimide for high transparency, high alignment properties, and high stretchability. The substrate is preferably a triacetyl cellulose (TAC) film.

The laminate of the non-crystal liquid layer and the substrate may preferably be stretched 1.05 times in the transverse direction by means of a tenter. The resulting stretched laminate is applied to the polarizer with its substrate side facing the polarizer.

The optically anisotropic layer may also be a cholesteric liquid crystal layer as aligned and fixed which selectively reflects light in a wavelength region of 350 nm or shorter. The cholesteric liquid crystal compound is selected from those described in JP-A-3-67219, JP-A-3-140921, JP-A-5-61039, JP-A-6-186534, and JP-A-9-133810 which show the above-specified selective reflection. From the standpoint of stability of the alignment fixed layer, the cholesteric liquid crystal layer is preferably made of a cholesteric liquid crystal polymer, a nematic liquid crystal polymer containing a chiral agent, or a compound capable of polymerizing on light or heat application to form such a liquid crystal polymer.

The cholesteric liquid crystal layer as the optically anisotropic layer is formed by, for example, coating a cholesteric liquid crystal compound to a substrate. For the purpose of phase difference control, etc., a cholesteric liquid crystal compound may be applied in layers, or different cholesteric liquid crystal compounds may be applied in layers. Application is effected by an appropriate coating method, such as gravure coating, die coating, or dipping. The substrate is preferably a TAC film or any other polymer film.

In preparing the liquid crystal-containing optically anisotropic layer, any means for liquid crystal orientation can be taken. Among the means is a method in which the liquid crystal compound is applied on an alignment layer and thereby aligned. The alignment layer includes a rubbed layer of an organic compound (e.g., a polymer), an obliquely deposited layer of an inorganic compound, a layer with microgrooves, and a layer formed by accumulating Langmuir-Blodgett (LB) membranes of organic compounds (for example, ω-tricosanoic acid, dioctadecylmethylammonium chloride, and methyl stearate). An alignment layer that develops an aligning function on irradiation with light is also included. Furthermore, an alignment technique in which liquid crystal molecules are applied to a stretched film and thereby aligned (see JP-A-3-9325) or a technique in which liquid crystal molecules are aligned in an applied electric field or magnetic field can be used. The liquid crystal alignment is preferably as uniform as possible, and the liquid crystal molecules in the layer are preferably fixed in the aligned state.

The polarizing plate of the present invention in which the cellulose acylate film is used as a protective film of the polarizer is produced in a usual manner with no particular restriction. For example, the cellulose acylate film is treated with an alkali and adhered to one or both sides of the PVA polarizer via an aqueous solution of completely saponified PVA. The cellulose acylate film may be processed for easy adhesion in place of alkali treatment as described in JP-A-6-94915 and JP-A-6-118232. Adhesives applicable between the treated surface of the protective film and the polarizer include PVA adhesives such as PVA and polyvinyl butyral and vinyl latices such as butyl acrylate. The polarizing plate is composed of the polarizer and protective films on both sides thereof. It is possible that the polarizer is further protected on one side thereof with a releasable protective sheet and on the other side with a separate sheet. Both the releasable protective sheet and the separate sheet provide the polarizer with a protection during product shipment or inspection. The protective sheet is for protecting the viewer's side of the polarizer, while the separate sheet is for covering the adhesive layer with which the polarizer is bonded to the liquid crystal cell. The cellulose acylate protective film is preferably bonded to the polarizer with its slow axis coinciding with the transmission axis of the polarizer.

If the orthogonal precision between the slow axis of the cellulose acylate film and the absorption axis of the polarizer (orthogonal to the transmission axis of the polarizer) exceeds 1°, the polarizing plate constructed under crossed Nicols suffers from lowering in polarizing performance under crossed Nicols to cause light leakage. When combined with a liquid crystal cell, such a polarizing plate would fail to provide a sufficient black level or contrast. It is therefore desirable that the deviation of the direction of the main refractive index nx of the cellulose acylate film from the transmission axis of the polarizer be within 1°, more desirably within 0.5°.

If desired, the cellulose acylate film can be subjected to a surface treatment to have improved adhesion to a functional layer, such as a primer layer or a backcoating layer. Suitable surface treatments include a glow discharge treatment, a UV irradiation treatment, a corona treatment, a flame treatment, and an alkali treatment. The glow discharge treatment may be a low-temperature plasma treatment under a low gas pressure of $10^{-3}$ to 20 Torr or a plasma treatment under atmospheric pressure. Plasma gases, which form a plasma under the above conditions, include argon, helium, neon, krypton, xenon, nitrogen, carbon dioxide, fluorocarbons such as tetrafluoromethane, and mixtures thereof. Plasma forming gases are described in detail in *Journal of Technical Disclosure*, No. 2001-1745, pp. 30-32, Japan Institute of Invention and Innovation, March, 2001. The atmospheric pressure plasma treatment, which has recently been attracting attention, uses an irradiation energy of, for example, 20 to 500 kGy under 10 to 1000 keV, still preferably 20 to 300 kGy under 30 to 500 keV. Among the surface treatments described above, the alkali treatment (i.e., saponification) is particularly effective in enhancing the adhesion of the cellulose acylate film.

The alkali saponification treatment is preferably carried out by immersing the cellulose acylate film directly in a tank of a saponification solution or coating the film with the saponification solution by dip coating, curtain coating, extrusion coating, bar coating, extrusion slide coating, and the like. The solvent used in the preparation of the saponification solution should be chosen so as to have satisfactory wetting properties on the cellulose acylate film and maintain the film surface in a good condition without causing surface irregularities. From this viewpoint, an alcohol solvent, particularly isopropyl alcohol, is preferred. An aqueous solution of a surface active agent may also serve as a solvent. The alkali of the saponification solution is chosen from those soluble in the solvent selected. Potassium hydroxide or sodium hydroxide is preferred. The pH of the saponification solution is preferably 10 or higher, still preferably 12 or higher. The alkali saponification is preferably performed at room temperature for 1 second to 5 minutes, still preferably 5 seconds to 5 minutes, even still preferably 20 seconds to 3 minutes. After the saponification reaction, the saponified surface of the cellulose acylate film is preferably washed with water or successively washed with an acid and water.

The polarizing plate of the present invention preferably has at least one functional layer selected from a hard coat layer, an antiglare layer, and an antireflective layer provided on the surface of a protective film on the other side of the polarizing plate. In other words, as shown in FIG. 1, it is preferable to provide a functional layer on the protective film (TAC2) provided on the opposite side of the polarizing plate to a liquid crystal cell when employed in a liquid crystal display. One functional layer may have combined functions. For example, an antiglare layer may have a combined function as an antireflective layer or a hard coat layer.

In a preferred embodiment of the polarizing plate having a functional layer on the viewer's side protective film thereof, an antireflective layer composed of a light scattering sublayer and a low refractive index sublayer or an antireflective layer composed of a medium refractive index sublayer, a high refractive index sublayer, and a low refractive index sublayer in that order is provided on the viewer's side protective film.

The light scattering sublayer preferably contains matte particles dispersed therein. The part of the light scattering sublayer where the matte particles are absent preferably has a refractive index of 1.50 to 2.00, while the low refractive index sublayer provided on the light scattering sublayer preferably has a refractive index of 1.20 to 1.49. The light scattering sublayer has both an antiglare function and a hard coat function. The light scattering sublayer may have a single layer structure or a multilayer structure composed of, for example, two to four subdivided layers.

The antireflective layer is preferably designed to have the following surface profile: Ra (a mean line average surface roughness) of 0.08 to 0.40 µm; Rs (a 10 point height parameter) of not more than 10 times the Ra; Sm (a mean spacing between profile peaks at the mean line) of 1 to 100 µm; a standard deviation of the peak heights measured from the deepest valley of 0.5 µm or less; a standard deviation of Sm (a mean spacing between peaks at the mean line) of 20 µm or less; and the proportion of the slopes at 0° to 5° is 10% or more. The antireflective layer satisfying the above surface profile parameters achieves sufficient antiglare performance and a uniform matte appearance when observed with the naked eye. In order for reflected light to have a neutral tint, the reflected light on the antireflective layer preferably has an a* value of from −2 to 2 and a b* value of from −3 to 3 under a standard light source C, and a minimum to maximum refractive index ratio in a wavelength region of from 380 to 780 nm is preferably 0.5 to 0.99. It is also preferable for reducing yellowness of white display that the b* value of transmitted light be 0 to 3 under a standard light source C. Furthermore, when a grating of 40 µm by 120 µm is placed between a planar light source and the antireflective layer, it is preferred that the antireflective layer have a brightness distribution with a standard deviation of 20 or less on its surface. With this brightness distribution, the polarizing plate applied to a high definition panel has reduced glare.

The antireflective layer preferably has a specular reflectance of 2.5% or lower, a transmittance of 90% or higher, and a 60° gloss of 70% or less. With these optical characteristics, reflection of external light is suppressed, and the display visibility is improved. The specular reflectance is still preferably 1% or less, even still preferably 0.5% or less. To achieve no-glare and clarity of text when applied to high definition LCD panels, the antireflective layer preferably has a haze of 20% to 50%, an internal haze to total haze ratio of 0.3 to 1, a difference between the haze of the light scattering sublayer with no low refractive index sublayer formed thereon and the haze of the light scattering sublayer and the low refractive index sublayer formed thereon of 15% or less, a transmitted image clarity at an optical comb width of 0.5 mm of from 20% to 50%, and a transmission ratio of vertically incident light/light incident at 20 deviation from the vertical direction of from 1.5 to 5.0.

The low refractive index sublayer that can be used to make the antireflective layer preferably has a refractive index of 1.20 to 1.49, still preferably 1.30 to 1.44. To ensure low refractivity, the low refractive index sublayer preferably satisfies formula:

$$(m/4)\lambda \times 0.7 < n1d1 < (m/4)\lambda \times 1.3$$

where m a positive odd number; n1 is the refractive index of the low refractive index sublayer; d1 is the thickness (nm) of the low refractive index sublayer; and λ is a wavelength ranging from 500 to 550 nm.

The low refractive index sublayer preferably contains a fluoropolymer as a low refractive index binder. The fluoropolymer is preferably a polymer crosslinked on application of heat or an ionizing radiation and preferably has a dynamic frictional coefficient of 0.03 to 0.20, a contact angle with water of 90° to 120°, a pure water droplet sliding angle of 70° or smaller. Considering that a commercially available adhesive tape or label applied to the antireflective layer of an image display is desirably stripped off easily, the adhesive strength of the low refractive index sublayer to a commercially available pressure-sensitive adhesive tape is preferably 500 gf or less, still preferably 300 gf or less, even still preferably 100 gf or less, measured on a tensile tester. To secure scratch resistance, the low refractive index sublayer preferably has a surface hardness of 0.3 GPa or higher, still preferably 0.5 GPa or higher, measured with a microhardness meter.

The fluoropolymer includes one obtained by hydrolysis followed by dehydration condensation of a perfluoroalkyl-containing silane compound (e.g., heptadecafluoro-1,1,2,2-tetrahydrodecyl)triethoxysilane) and a fluorine-containing copolymers comprising a fluoromonomer unit and a monomer unit providing crosslinkability.

Examples of the fluoromonomer include fluoroolefins (e.g., fluoroethylene, vinylidene fluoride, tetrafluoroethylene, perfluorooctylethylene, hexafluoropropylene, and perfluoro-2,2-dimethyl-1,3-dioxole), partially or completely fluorinated alkyl ester derivatives of (meth)acrylic acid ("(meth)acrylic acid" denotes acrylic acid and/or methacrylic acid, hereinafter the same) (e.g., Viscoat 6FM from Osaka Organic Chemical Industry, Ltd. and M-2000 from Daikin Industries, Ltd.), and partially or completely fluorinated vinyl ethers. Perfluoroolefins are preferred. Hexafluoropropylene is particularly preferred for its refractive index, solubility, transparency, and availability.

The units for providing crosslinkability include those derived from monomers having self-crosslinking functionality, such as glycidyl (meth)acrylate ("(meth)acrylate" denotes acrylate and/or methacrylate, hereinafter the same) and glycidyl vinyl ether; those derived from monomers containing a carboxyl group, a hydroxyl group, an amino group or a sulfo group, such as (meth)acrylic acid, methylol (meth)acrylate, hydroxyalkyl (meth)acrylate, allyl acrylate, hydroxyethyl vinyl ether, hydroxybutyl vinyl ether, maleic acid, and crotonic acid; and those resulting from incorporating a crosslinking functional group (e.g., (meth)acryloyl group) into the above-recited unit through polymer reaction (for example by incorporating an acryloyl group to a hydroxyl group to form an acrylic acid chloride).

The fluorine-containing copolymer may further comprise, in addition to the fluoromonomer unit and the unit providing crosslinkability, a fluorine-free monomer unit to improve solvent solubility and transparency. Examples of such additional monomers include, but are not limited to, olefins (e.g., ethylene, propylene, isoprene, vinyl chloride and vinylidene chloride), acrylic esters (e.g., methyl acrylate, ethyl acrylate, and 2-ethylhexyl acrylate), methacrylic esters (e.g., methyl methacrylate, ethyl methacrylate, butyl methacrylate, and ethylene glycol dimethacrylate), styrene derivatives (e.g., styrene, divinylbenzene, vinyltoluene, and α-methylstyrene), vinyl ethers (e.g., methyl vinyl ether, ethyl vinyl ether, and cyclohexyl vinyl ether), vinyl esters (e.g., vinyl acetate, vinyl propionate, and vinyl cinnamate), acrylamides (e.g., N-t-butylacrylamide and N-cyclohexylacrylamide), methacrylamides, and acrylonitrile derivatives.

A curing agent may be added appropriately to the above-described polymer materials as disclosed in JP-A-10-25388 and JP-A-10-147739.

The light scattering sublayer is provided for the purpose of surface scattering and/or internal scattering and hard coat properties to improve scratch resistance. Therefore, the light scattering sublayer comprises a binder for developing hard coat properties, matte particles for developing light scattering properties, and, if desired, an inorganic filler for increasing the refractive index, preventing shrinkage on crosslinking, and increasing strength. The light scattering sublayer also functions as an antiglare layer to provide a polarizing plate having an antiglare layer.

The light scattering sublayer preferably has a thickness of 1 to 10 μm, still preferably 1.2 to 6 μm, to secure hard coat properties. Too small a thickness results in insufficient hardness. Too thick a layer tends to have curl and poor processability such as brittleness.

The binder of the light scattering sublayer is preferably a polymer having a saturated hydrocarbon main chain or a polyether main chain, still preferably a polymer having a saturated hydrocarbon main chain. The binder polymer preferably has a crosslinked structure. The binder polymer having a saturated hydrocarbon main chain is preferably a polymer of an ethylenically unsaturated monomer. Binder polymers having a saturated hydrocarbon main chain and a crosslinked structure preferably include homo- or copolymers of a monomer(s) containing two or more ethylenically unsaturated groups. Such a monomer may have an aromatic ring or at least one atom selected from a halogen atom except fluorine, a sulfur atom, a phosphorus atom, and a nitrogen atom to provide a binder polymer with an increased refractive index.

Examples of the monomer containing two or more ethylenically unsaturated groups include esters of polyhydric alcohols and (meth)acrylic acid, such as ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, and polyester polyacrylate; ethylene oxide-modified products of the above esters; vinylbenzene and its derivatives, such as 1,4-divinylbenzene, 2-acryloylethyl 4-vinylbenzoate, and 1,4-divinylcyclohexanone; vinylsulfones (e.g., divinylsulfone), acrylamides (e.g., methylenebisacrylamide); and methacrylamides. These monomers may be used as a combination of two or more thereof. The monomers affording a high refractive index include bis(4-methacryloylthiophenyl)sulfide, vinylnaphthalene, vinyl phenyl sulfide, and 4-methacryloxyphenyl-4'-methoxyphenyl thioether. These monomers may also be used as a combination of two or more thereof.

Polymerization of the ethylenically unsaturated group-containing monomer(s) can be conducted by applying an ionizing radiation or heat in the presence of a photo radical initiator or a thermal radical initiator. Accordingly, the light scattering sublayer is formed by applying a coating composition containing the ethylenically unsaturated group-containing monomer(s), a photo or thermal radical initiator, matte particles, and an inorganic filler to the protective film and curing the coating layer by radiation- or heat-induced polymerization. Known photo radical initiators and thermal radical initiators can be used.

The polymer having a polyether main chain is preferably a ring opening polymerization product of a polyfunctional epoxy compound. Ring opening polymerization of a polyfunctional epoxy compound is effected by applying an ionizing radiation or heat in the present of a photo-acid generator or a thermal acid generator. Accordingly, the light scattering sublayer can be formed by applying a coating composition containing the polyfunctional epoxy compound, a photo-acid generator or a thermal acid generator, matte particles, and an inorganic filler to the protective film and curing the coating layer by ionizing radiation- or heat-induced polymerization.

The monomer mixture may contain a monomer having a crosslinking functional group in place of, or in addition to, the monomer having two or more ethylenically unsaturated groups thereby to introduce a crosslinked structure into the binder polymer by the reaction of the crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group, and an active methylene group. Also included in monomers capable of introducing a crosslinked structure are vinylsulfonic acids, acid anhydrides, cyanoacrylate derivatives, melamine, etherified methylols, esters, urethanes, and metal alkoxides such as tetramethoxysilane. A functional group that decomposes to develop crosslinkability, such as a blocked isocyanate group, is also useful. That is, the crosslinking functional group as referred to herein includes not only a ready-to-react one but a group that decomposes to become ready to crosslink. The binder polymer containing such a crosslinking functional group forms a crosslinked structure on being heated after the coating composition is applied.

The matte particles that are used in the light scattering sublayer for imparting antiglare properties are greater than filler particles and usually have an average particle size of 1 to 10 μm, preferably 1.5 to 7.0 μm. The matte particles include inorganic compound particles and resin particles.

Examples of matte particles include particles of inorganic compounds, such as silica and titanium dioxide, and particles of resins, such as acrylic resins, crosslinked acrylic resins, polystyrene, crosslinked polystyrene, melamine resins, and benzoguanamine resins. Preferred of them are particles of crosslinked styrene, crosslinked acrylic resins, crosslinked acrylic styrene resins, and silica. The shape of the matte particles may be either spherical or irregular.

Two or more kinds of matte particles different in particle size may be used in combination. For example, larger particles may contribute to non-glare, and smaller particles may serve for other optical characteristics.

It is particularly desirable that the matte particles have a mono-dispersed particle size distribution. In other words, it is preferred that the matte particles be as close to each other as possible in particle diameter. Particles whose size is 20% or more greater than the mean particle size being taken as coarse particles, the proportion of such coarse particles in all the particles is preferably 1% or smaller, still preferably 0.1% or smaller, even still preferably 0.01% or smaller. Matte particles with such a narrow size distribution are prepared by classifying particles as synthesized in a usual manner. An increased number of times of classification and/or an increased degree of classification results in a narrower and thus more desirable size distribution.

The matte particles are preferably used in an amount of 10 to 1000 mg/m$^2$, still preferably 100 to 700 g/m$^2$, in the light scattering sublayer.

The particle size distribution of the matte particles is measured with a Coulter counter. The measured distribution is converted to a number distribution.

In order to increase the refractive index of the light scattering sublayer, the light scattering sublayer preferably contains an oxide of at least one metal selected from titanium, zirconium, aluminum, indium, zinc, tin, and antimony having a mean particle size of 0.2 μm or less, still preferably 0.1 μm or less, even still preferably 0.06 μm or less, as an inorganic filler.

Where matte particles having a high refractive index are used, it is a preferred manipulation to use a silicon oxide as a filler contributory to reducing the refractive index of the light scattering sublayer to the contrary, thereby to increase the difference in refractive index from the matte particles. The above-described preference for the particle size of inorganic fillers applies to the silicon oxide particles.

Examples of the inorganic fillers useful in the light scattering sublayer include $TiO_2$, $ZrO_2$, $Al_2O_3$, $In_2O_3$, $ZnO$, $SnO_2$, $Sb_2O_3$, ITO, and $SiO_2$. $TiO_2$ and $ZrO_2$ are preferred for increasing the refractive index. The inorganic filler may be surface treated with a silane coupling agent or a titan coupling agent to introduce a functional group reactive with a binder species.

The amount of the inorganic filler to be added is preferably 10% to 90%, still preferably 20% to 80%, even still preferably 30% to 75%, based on the total weight of the light scattering sublayer. The filler with the recited particle size is small enough as compared with light wavelengths and therefore does not cause light scattering. A disperse system of such a filler in a binder polymer behaves as an optically homogeneous substance.

The bulk refractive index of a mixture of the binder and the inorganic filler in the light scattering sublayer is preferably 1.50 to 2.00, still preferably 1.51 to 1.80, which can be achieved by proper selection of the kinds and the ratio of the binder and the inorganic filler. The selection can easily be established experimentally.

The coating composition for forming the light scattering sublayer can contain a fluorine-containing surface active agent and/or a silicone surface active agent to prevent coating unevenness, drying unevenness and spot defects thereby securing layer uniformity. A fluorine-containing surface active agent is particularly preferred for its capability of reducing coating unevenness, drying unevenness, spot defects, and like coating defects with a reduced amount of addition. By use of the surface active agent, coating defects can be reduced, which allows for high-speed coating and eventually leads to increased productivity.

As previously stated, the antireflective layer may have a structure composed of at least a medium refractive index sublayer, a high refractive index sublayer, and a low refractive index sublayer. The medium refractive index sublayer is the nearest to the protective film, and the low refractive index sublayer is outermost.

The antireflective layer with that layer structure is designed to satisfy the following relation: refractive index of the high refractive index sublayer>refractive index of the medium refractive index sublayer>refractive index of the protective film>refractive index of the low refractive index sublayer. A hard coat sublayer may be provided between the protective film and the medium refractive index sublayer. Otherwise, a hard coat sublayer may be provided between the medium refractive index sublayer and the high refractive index sublayer. Antireflective layer designs that can be used in the invention are described, e.g., in JP-A-8-122504, JP-A-8-110401, JP-A-10-300902, JP-A-2002-243906, and JP-A-2002-111706.

Each of the sublayers may have an additional function. For instance, the low refractive index sublayer may be given stainproof properties, or the high refractive index sublayer may be given antistatic properties. For the details, reference can be made to JP-A-10-206603 and JP-A-2002-243906.

The antireflective layer preferably has a haze of 5% or less, still preferably 3% or less, and a pencil hardness of H or higher, still preferably 2H or higher, even still preferably 3H or higher, measured in accordance with JIS K5400.

The medium refractive index sublayer and the high refractive index sublayer are each a cured film containing at least inorganic compound particles having a high refractive index and a mean particle size of 100 nm or smaller and a binder as a matrix.

The inorganic compounds with a high refractive index include those having a refractive index of 1.65 or higher, preferably those having a refractive index of 1.9 or higher, such as oxides or complex oxides of Ti, Zn, Sb, Sn, Zr, Ce, Ta, La, In, etc.

Such high-refractive fine particles can be obtained by, for example, surface treatment of particles with a surface treating agent, such as a silane coupling agent (see JP-A-11-295503, JP-A-11-153703, and JP-A-2000-9908), an anionic compound or an organometallic coupling agent (see JP-A-2001-310432); forming a core/shell structure having a high refractive particle as a core (see JP-A-2001-166104); or using a specific dispersant (see JP-A-11-153703, U.S. Pat. No. 6,210,858, and JP-A-2002-277609).

The matrix-forming binder includes known thermoplastic resins and known curing resins. The binder preferably includes a composition containing a polyfunctional compound having at least two, radical polymerizable and/or cation polymerizable groups, a composition containing an organometallic compound having a hydrolyzable group or a partial condensation product thereof, and a mixture of these compositions. Examples of these compounds are described in JP-A-2000-47004, JP-A-2000-315242, JP-A-2001-31871, and JP-A-2001-296401.

A cured film obtained from a composition containing a colloidal metal oxide and a metal alkoxide which is prepared by hydrolysis followed by condensation of the metal alkoxide is also a preferred matrix. The film is disclosed, e.g., in JP-A-2001-293818.

The high refractive index sublayer preferably has a refractive index of 1.70 to 2.20 and a thickness of 5 nm to 10 μm, still preferably 10 nm to 1 μm.

The refractive index of the medium refractive index sublayer is adjusted so as to be between the refractive index of the low refractive index sublayer (hereinafter recited) and that of the high refractive index sublayer. The medium refractive index sublayer preferably has a refractive index of 1.50 to 1.70 and a thickness of 5 nm to 10 μm, still preferably 10 nm to 1 μm.

The low refractive index sublayer, which is formed on the high refractive index sublayer, preferably has a refractive index of 1.20 to 1.55, still preferably 1.30 to 1.50.

The low refractive index sublayer is preferably designed to be a scratch-resistant and stainproof outermost sublayer. To impart slip properties to the surface is an effective means for greatly improving scratch resistance, which can be achieved by applying a known thin film technique using silicone compounds or fluorine-containing compounds.

The fluorine-containing compounds preferably include those containing a crosslinking or polymerizable functional group and having a fluorine content of 35% to 80% by weight. Examples of the fluorine-containing compounds are given in JP-A-9-222503, paras. [0018]-[0026], JP-A-11-38202, paras. [0019]-[0003], JP-A-2001-40284, paras. [0027]-[0028], and JP-A-2000-284102. The fluorine-containing compounds preferably have a refractive index of 1.35 to 1.50, still preferably 1.36 to 1.47.

The silicone compounds are polysiloxane compounds preferably containing a curable functional group or a polymerizable functional group in the polymer chain thereof to form a crosslinked structure in a film. Examples include reactive silicones (Silaplane available from Chisso Corp.) and polysiloxanes having a silanol group at both terminals thereof (see JP-A-11-258403).

The low refractive index sublayer comprising a fluorine-containing polymer or a silicone is preferably formed by applying a coating composition containing the fluorine-containing compound or polysiloxane compound having a crosslinking or polymerizable group, a polymerization initiator, a sensitizer, etc. to the high refractive index sublayer, etc. and applying light or heat to the coating layer either simultaneously with or after coating.

A sol-gel hardened film formed by condensation curing reaction between an organometallic compound, such as a silane coupling agent, and a silane coupling agent containing a specific fluorohydrocarbon group in the presence of a catalyst is also preferred. Examples of the latter silane coupling agent include polyfluoroalkyl-containing silane compounds or partial hydrolysis-condensation products thereof, particularly the compounds described in JP-A-58-142958, JP-A-58-147483, JP-A-58-147484, JP-A-9-157582, and JP-A-11-106704; and silyl compounds having a perfluoroalkyl ether group (i.e., a fluorine-containing long chain), such as the compounds described in JP-A-2000-117902, JP-A-2001-48590, and JP-A-2002-53804.

In addition to the components described above, the low refractive index sublayer may contain other additives, such as a filler, a silane coupling agent, a slip agent and a surface active agent. Examples of useful fillers include particles of inorganic compounds having a low refractive index and an average primary particle size of 1 to 150 nm, such as silicon dioxide (silica) and fluorine-containing compounds (e.g., magnesium fluoride, calcium fluoride, and barium fluoride), and fine organic particles described in JP-A-11-3820, paras. [0020]-[0038].

In case where the low refractive index sublayer is provided next to an outermost layer, the low refractive index sublayer may be formed by vapor phase processing such as vacuum evaporation, sputtering, ion plating or plasma-assisted CVD. Wet coating methods are preferred for economical considerations nevertheless.

The low refractive index sublayer preferably has a thickness of 30 to 200 nm, still preferably 50 to 150 nm, even still preferably 60 to 120 nm.

The hard coat layer is provided on the protective film having the antireflective layer to give a physical strength to the protective film. It is preferably provided between a transparent substrate and the high refractive index sublayer. The hard coat layer is preferably formed by crosslinking or polymerization of a photo- and/or heat-curing compound. The curing functional group of the curing compound is preferably a photopolymerizable functional group. An organometallic compound containing a hydrolyzable functional group or an organic alkoxysilyl compound is also preferred. Examples of useful compounds are the same as recited with respect to the high refractive index sublayer.

Examples of useful compositions for forming the hard coat layer are given in JP-A-2002-144913, JP-A-2000-9908, and WO00/46617.

The high refractive index sublayer can serve as a hard coat layer. In this case, it is preferable to form the hard coat layer by finely dispersing fine particles by using the technique described concerning the high refractive index sublayer.

The hard coat layer may contain particles having an average particle size of 0.2 to 10 μm to serve as an antiglare layer having an antiglare function.

The thickness of the hard coat layer can be appropriately designed depending on the purpose. The thickness of the hard coat layer preferably ranges from 0.2 to 10 µm, still preferably 0.5 to 7 µm.

The hard coat layer preferably has a pencil hardness of H or higher, still preferably 2H or higher, even still preferably 3H or higher, measured in accordance with JIS K5400. Furthermore, the hard coat layer preferably has as small Taber wear as possible in the Taber abrasion test specified in JIS K5400.

In addition to the antireflective layer, the polarizing plate of the present invention can have a forward scattering layer, a primer layer, an antistatic layer, an undercoating layer, a protective sheet, and the like.

Where an antistatic layer is provided, it is desirable to impart electrical conductivity represented by a volume resistivity of $10^{-8}$ ($\Omega cm^{-3}$) or less. Although volume resistivity could be reduced to $10^{-8}$ ($\Omega cm^{-3}$) or less by using a hygroscopic substance, a water-soluble inorganic salt, a certain surface active agent, a cationic polymer, an anionic polymer, colloidal silica, etc., the volume resistivity of the resulting layer is heavily dependent on temperature and humidity and, as a result, the layer can fail to secure sufficient conductivity under a low humidity condition. Therefore, it is advisable to use a metal oxide as an antistatic layer material. Colored metal oxides are unfavorable because they would make the whole film colored. It is recommended to use colorless metal oxides mainly composed of at least one of Zn, Ti, Sn, Al, In, Si, Mg, Ba, Bo, W. and V Examples of suitable metal oxides include ZnO, $TiO_2$, $SnO_2$, $Al_2O_3$, $In_2O_3$, $SiO_2$, MgO, BaO, $MoO_3$, $WO_3$, $V_2O_5$, and complex oxides thereof. In particular, ZnO, $TiO_2$, and $SnO_2$ are preferred. The metal oxide may be doped with a hetero atom. Effective metal oxides doped with a hetero atom include ZnO doped with Al or In, $SnO_2$ doped with Sb, Nb or a halogen atom, and $TiO_2$ doped with Nb or Ta. A particulate or fibrous crystalline metal (e.g., titanium oxide) having the above-described metal oxide adhered thereto is also useful, as described in JP-B-59-6235. While volume resistivity and surface resistivity, being different physical properties, are not easily compared, a volume resistivity of $10^{-8}$ ($\Omega cm^{-3}$) or less will be secured when the antistatic layer has a surface resistivity of about $10^{-10}$ ($\Omega$/square) or less, preferably $10^{-8}$ ($\Omega$/square) or less. The surface resistivity of the antistatic layer should be measured while the antistatic layer is outermost. Namely, the surface resistivity measurement of the antistatic layer is taken in the course of the formation of a laminate structure.

The LCD according to the invention includes an LCD using the polarizing plate according to the invention (first embodiment), an LCD of VA mode, OCB mode or TN mode having two polarizing plates according to the invention, one in the viewer's side and the other in the backlight side (second embodiment), and an LCD of VA mode having one polarizing plate according to the invention in the backlight side (third embodiment).

The polarizing plate of the invention is advantageously used in LCDs. The polarizing plate of the invention is applicable to a wide range of display modes of LCDs. Proposed LCD display modes include TN (twisted nematic), IPS (in-plane switching), FLC (ferroelectric liquid crystal), AFLC (anti-ferroelectric liquid crystal) OCB (optically compensatory bend), STN (supper twisted nematic), VA (vertically aligned), and HAN (hybrid aligned nematic). Of these modes, VA mode and OCB mode are preferred for application of the polarizing plate of the present invention.

In a liquid crystal cell of VA mode, rod-like liquid crystal molecules are aligned substantially vertically with no voltage applied. Liquid crystal cells of VA mode include (1) a liquid crystal cell of VA mode in a narrow sense of the term, in which rod-like liquid crystal molecules are substantially vertically aligned with no voltage applied and substantially horizontally aligned with voltage applied (see JP-A-2-176625), (2) a liquid crystal cell of MVA mode, in which the VA mode is modified to be multi-domain type so as to enlarge the viewing angle (described in SID97, Digest of tech. Papers, 28(1997), p. 845), (3) a liquid crystal cell of n-ASM mode or CPA mode, in which rod-like liquid crystal molecules are substantially vertically aligned with no voltage applied and substantially aligned in twisted multi-domain alignment with voltage applied (described in Nippon Ekisho Toronkai, Digest of tech. Papers (1998), pp. 58-59), and (4) a liquid crystal cell of SURVIVAL mode (published in LCD international 98).

Figure 2:
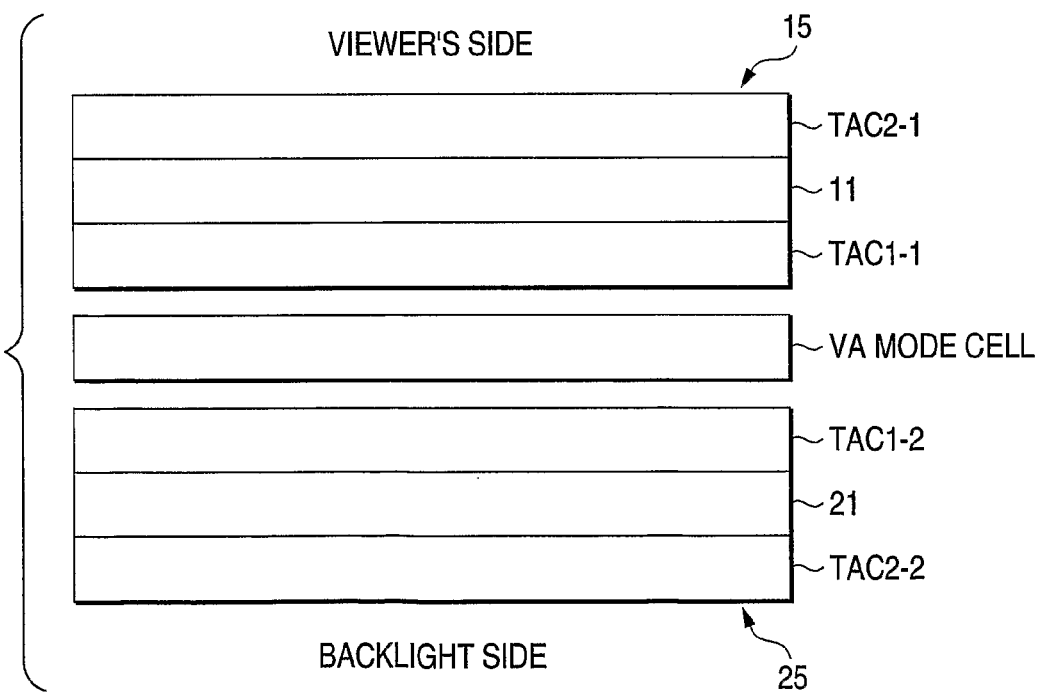
FIG. 2 schematically illustrating a structure of an embodiment of the liquid crystal display according to the present invention.

The LCD of VA mode includes one having a liquid crystal cell (VA mode cell) and two polarizing plates each consisting of TAC1, a polarizer, and TAC2, one plate being placed in the viewer's side, and the other in the backlight side, as shown in FIG. 2. The liquid crystal cell holds a liquid crystal between two electrodes.

In a liquid crystal cell of OCB mode, the rod-like liquid crystal molecules are aligned in a bend state so that the molecules in one side of the cell and those in the other side are aligned substantially in the opposite direction (symmetrically). OCB mode liquid crystal cells are disclosed in U.S. Pat. Nos. 4,583,825 and 5,410,422. Since the alignment of the rod-like liquid crystal molecules is symmetrical at both sides of the cell, a bend-alignment cell has a self compensation function. This is why a bend alignment mode is called "optically compensatory bend" mode. LCDs of bend alignment mode have an advantage of improved response time.

In another embodiment of the transmission LCD according to the invention, the specific cellulose acylate film is used as a protective film that is provided between the liquid crystal cell and the polarizer. The cellulose acylate film can be used as a protective film of only one of the polarizing plates (the cellulose acylate film is positioned between the cell and the polarizer) or as a protective film of both of the two polarizing plates (the cellulose acylate film is positioned between the cell and the polarizer of each polarizing plate). The polarizing plate is preferably adhered to the liquid crystal cell with the specific cellulose acylate film as specified in the invention (i.e., TAC1) in contact with the VA mode liquid crystal cell. Where the specific cellulose acylate film is used as a protective film (positioned between the cell and the polarizer) of one of the polarizing plates, whether that polarizing plate is placed on the viewer's side or the backlight side makes no difference in functionality. When the polarizing plate having the specific cellulose acylate film on the liquid crystal cell side is disposed on the viewer's side of the cell, that polarizing plate should have a functional layer formed on its outer side (the viewer's side), which can result in a reduction of production yield. From this viewpoint, the polarizing plate having the specific cellulose acylate film is preferably used on the backlight side of the liquid crystal cell.

In the second embodiment of the LCD, the polarizing plate of the invention is used on both sides of a liquid crystal cell. In the third embodiment of the LCD, the polarizing plate of the invention is used on only the backlight side of a liquid crystal cell.

The protective film (TAC2) may be either the specific cellulose acylate film as specified in the invention or a cellulose acylate film ordinarily employed in the art. Cellulose acylate films that can be used as TAC2 include, but are not limited to, KC4UX2M (thickness: 40 µm), KC5UX (thickness: 60 µm) and KC80UVSFD (thickness: 80 µm), all available from Konica Opto Corp.; and TD80U (thickness: 80 μm) and TF80U (thickness: 80 μm), both available from Fuji Photo Film Co., Ltd.

EXAMPLES

The present invention will now be illustrated in greater detail with reference to Examples, but it should be understood that the invention is not construed as being limited thereto. Unless otherwise noted, all the parts, percents, and ratios are by weight.

1. Preparation of Cellulose Acylate Films (Film Nos. 1 to 19)

1-1. Synthesis of Cellulose Acylate

Cellulose acylates having the acyl group(s) shown in Table 1 below at the respective substitution degree(s) shown in Table 1 were prepared by acylating 100 parts of cellulose with a carboxylic acid(s) in the presence of 7.8 parts of sulfuric acid as a catalyst at 40° C. The kind of the acyl group and the degree of substitution by the acyl group in the resulting cellulose acylate are decided by the selection of the kind and the amount of the corresponding carboxylic acid. After the acylation, the reaction system was aged at 40° C. and then washed with acetone to remove low molecular components. In Table 1, CTA stands for cellulose triacetate (acyl group: acetyl); CAB, cellulose acetate butyrate (acyl group: acetyl+butyryl); and CAP, cellulose acetate propionate (acyl group: acetyl+propionyl).

Into a dichloromethane/methanol mixed solvent (87/13) were put the cellulose acylate, a plasticizer (triphenyl phosphate (TPP) and biphenyldiphenyl phosphate (BDP)), and other additives (selected from UV absorbers 1 and 2 and retardation developing agents 1 and 2 shown below) as shown in Table 1 and stirred while heating to prepare a solution having a cellulose acylate concentration of 15%. At the same time, 0.05 parts of AEROSIL R972 (from Nippon Aerosil Co., Ltd.) as a matting agent was poured into the mixture and stirred under heating. In Table 1, the amounts (%) of the plasticizer system and the additive(s) are based on the weight of the cellulose acylate.

UV absorber 1 (abbreviated as UV-1 in Table 1):

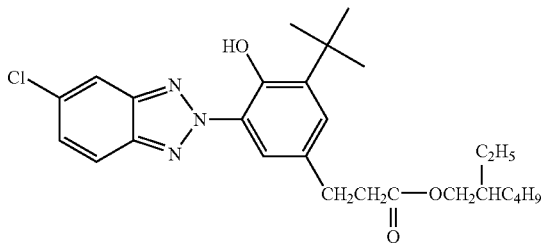

UV absorber 2 (abbreviated as UV-2 in Table 1):

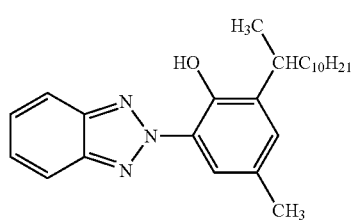

-continued

Retardation developing agent 1 (abbreviated as RD-1 in Table 1):

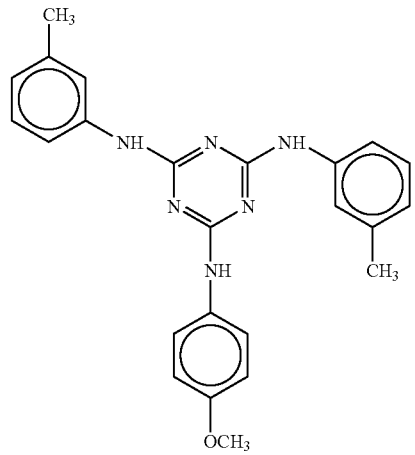

Retardation developing agent 2 (abbreviated as RV-2 in Table 1):

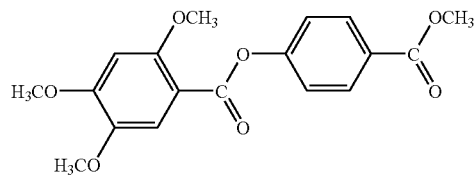

1-2. Casting

The dope thus prepared was cast on a band by use of a band casting machine. The half dried cast film with a residual solvent content of 25% to 35% was peeled from the band and stretched transversely by means of a tenter at a temperature of from about $(Tg-10)°$ to $(Tg+10)°$ C. to a stretch ratio of 10% to 30.5% (see Table 1).

The Tg of the cellulose acylate film was measured with a dynamic viscoelasticity measuring device (Vibron DVA-225 from ITK Co., Ltd.) at a sample length between grips of 20 mm, at a heating rate of 2° C./min from 30° to 200° C., and at a frequency of 1 Hz. The storage modulus was plotted on a logarithmic ordinate and temperature (° C.) on a linear abscissa. A line 1 (solid region) and a line 2 (glass transition region) showing a steep decrease in storage elastic modulus observed at the phase transition from the solid region to the glass transition region were drawn. The intersection of the lines 1 and 2 indicates the temperature at which the storage modulus started to decrease abruptly and the film started to soften, i.e., at which the film began to be transferred to the glass transition region. This temperature was referred to as the glass transition temperature Tg (dynamic viscoelasticity). The Tgs of all the cellulose acylate films prepared in Examples were in the range of from 110° to 160° C. as measured by the above-described method.

After conditioning at 25° C. and 60% RH for 2 hours, each of the resulting cellulose acylate films (compensation film) 1 to 19 was measured for retardation values (Re and Rth) at 590 nm at 25° C. and 60% RH with a phase difference measurement system KOBRA 21ADHE available from Oji Scientific Instruments. The results obtained are shown in Table 3.

All the cellulose acylate films prepared in Examples had a haze of 0.1 to 0.9, showed a change in mass of 0 to 3% when left to stand at 80° C. and 90% RH for 48 hours, and had a photoelastic coefficient of $50\times10^{-13}$ $cm^2/dyne$ or less. The matting agent used in the cellulose acylate films had an average secondary particle size of 1.0 µm or smaller.

2. Preparation of Protective Films with Optically Anisotropic Layer (Film Nos. 20 to 23)

2-1. Protective Films with Optically Anisotropic Layer (Film Nos. 20 and 21):

A cellulose acetate film (each of film Nos. 20 and 21 shown in Table 1) prepared in the same manner as for film Nos. 1 to 19 was coated with 5.2 ml/m² of a saponification solution having the following composition, followed by drying at 60° C. for 10 seconds. The film surface washed with running water for 10 seconds and dried by blowing air at 25° C.

| Composition of saponification solution: | |
|---|---|
| Isopropyl alcohol | 818 parts |
| Water | 167 parts |
| Propylene glycol | 187 parts |
| Potassium hydroxide | 68 parts |
| Surface active agent (n-$C_{16}H_{33}O(C_2H_4O)_{10}H$) | 12 parts |

A coating composition having the following formulation was applied to the saponified surface of the cellulose acetate film 20 or 21 at a coating rate of 24 ml/m² with a #14 wire bar coater and dried with hot air at 60° C. for 60 seconds and then at 90° C. for 150 seconds to form an alignment layer. The alignment layer was rubbed in a direction at 45° from the stretching direction of the cellulose acetate film 20 or 21 (substantially coinciding with the slow axis).

| Formulation of coating composition for alignment layer: | |
|---|---|
| Modified polyvinyl alcohol (1) | 20 parts |
| Water | 360 parts |
| Methanol | 120 parts |
| Glutaraldehyde (crosslinking agent) | 1.0 part |

Modified polyvinyl alcohol (1):

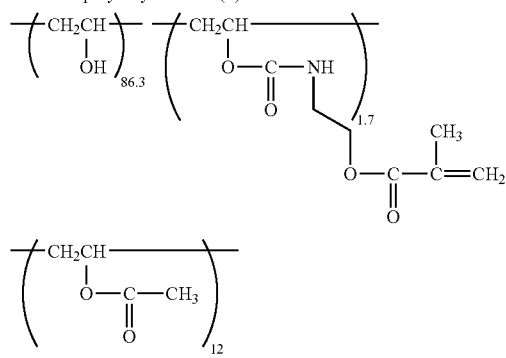

The alignment layer was coated with 6.2 ml/m² of a composition having the following formulation for forming an optically anisotropic layer with a #3.6 wire bar coater at 25° C.

Formulation of coating composition for optically anisotropic layer:

Discotic liquid crystal compound of formula:

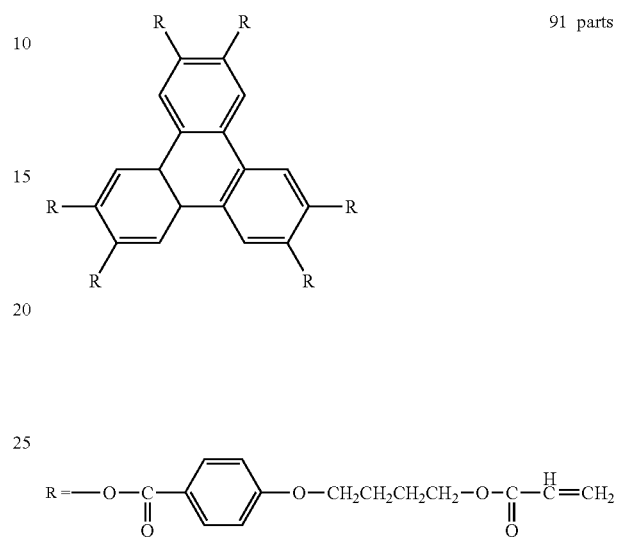

91 parts

| | |
|---|---|
| Ethylene oxide-modified trimethylolpropane triacrylate (V#360 from Osaka Organic Chemistry Industry, Ltd.) | 9 parts |
| Cellulose acetate butyrate (CAB531-1 from Eastman Chemical Co.) | 1.5 parts |
| Photopolymerization initiator (Irgacure 807 from Ciba Geigy, Ltd.) | 3 parts |
| Sensitizer (Kayacure DETX from Nippon Kayaku Co., Ltd.) | 1 part |

Citric mixed ester of formula:

$$H_2C-C(=O)-O-R_1$$
$$HO-C-CO_2R_2$$
$$H_2C-C(=O)-O-R_3$$
$$R_1 = H \text{ or } C_2H_5$$

| R: H or $C_2H_5$ | 1.0 part |
|---|---|
| Methyl ethyl ketone | 214.2 parts |

The coated film was held on a metal frame and heated in a thermostat at 140° C. for 2 minutes to align the discotic liquid crystal molecules. The film was then irradiated with UV light from a 120 W/cm high pressure mercury lamp at 90° C. for 1 minute to polymerize the discotic liquid crystal molecules, followed by slowly cooling to room temperature to obtain a protective film with optically anisotropic layer (film Nos. 20 and 21.

TABLE 1

| Film No. | Cellulose Ester | Substitution Degree A | Acyl Group | Substitution Degree B | Total Substitution Degree (A + B) | 6-Position Substitution Degree | Substitution Degree Ratio (DS6/DS2 + DS3 + DS6) | Plasticizer Kind | Plasticizer Amount (wt %) | Additives Kind | Additives Amount (wt %) | Stretch Ratio (%) |
|---|---|---|---|---|---|---|---|---|---|---|---|---|
| 1 | CTA | 2.750 | — | 0 | 2.750 | 0.965 | 0.351 | TPP/BDP | 7.8/3.9 | RD-1 | 3 | 25 |
| 2 | CTA | 2.82 | — | 0 | 2.82 | 0.908 | 0.322 | TPP/BDP | 7.8/3.9 | RD-1/RD-2 | 1.4/2.1 | 25 |
| 3 | CTA | 2.870 | — | 0 | 2.870 | 0.907 | 0.316 | TPP/BDP | 7.8/3.9 | RD-1 | 2.7 | 25 |
| 4 | CTA | 2.849 | — | 0 | 2.849 | 0.934 | 0.328 | TPP/BDP | 7.8/3.9 | RD-1 | 4 | 23 |
| 5 | CAP | 1.900 | Pr | 0.80 | 2.700 | 0.897 | 0.332 | TPP/BDP | 7.8/3.9 | UV-1/UV-2 | 0.3/0.7 | 31 |
| 6 | CAP | 0.180 | Pr | 2.47 | 2.650 | 0.883 | 0.333 | TPP/BDP | 3.9/1.9 | RD-1 | 3 | 15 |
| 7 | CAB | 1.400 | Bu | 1.30 | 2.700 | 0.880 | 0.326 | TPP/BDP | 3.9/1.9 | UV-1/UV-2 | 0.3/0.7 | 20 |
| 8 | CAB | 0.300 | Bu | 2.50 | 2.800 | 0.890 | 0.318 | TPP/BDP | 3.9/1.9 | UV-1/UV-2 | 0.3/0.7 | 20 |
| 9 | CTA | 2.750 | — | 0 | 2.750 | 0.965 | 0.351 | TPP/BDP | 7.8/3.9 | RD-1 | 5.1 | 25 |
| 10 | CTA | 2.751 | — | 0 | 2.751 | 0.905 | 0.329 | TPP/BDP | 7.8/3.9 | RD-1 | 5.1 | 25 |
| 11 | CTA | 2.779 | — | 0 | 2.779 | 0.923 | 0.332 | TPP/BDP | 7.8/3.9 | RD-1 | 5.1 | 25 |
| 12 | CTA | 2.750 | — | 0 | 2.750 | 0.965 | 0.351 | TPP/BDP | 5.85/2.93 | RD-1 | 5.1 | 24 |
| 13 | CTA | 2.750 | — | 0 | 2.750 | 0.965 | 0.351 | TPP/BDP | 7.8/3.9 | RD-1/RD-2 | 2.4/3.6 | 25 |
| 14 | CTA | 2.870 | — | 0 | 2.870 | 0.907 | 0.316 | TPP/BDP | 7.8/3.9 | RD-1 | 6.5 | 20 |
| 15 | CTA | 2.785 | — | 0 | 2.785 | 0.910 | 0.327 | TPP/BDP | 7.8/3.9 | RD-1 | 5 | 20 |
| 16 | CAP | 1.900 | Pr | 0.80 | 2.700 | 0.897 | 0.332 | TPP/BDP | 7.8/3.9 | UV-1/UV-2 | 0.3/0.7 | 30.5 |
| 17 | CAP | 0.180 | Pr | 2.47 | 2.650 | 0.883 | 0.333 | TPP/BDP | 2/1 | RD-1 | 5 | 30 |
| 18 | CAB | 1.100 | Bu | 1.60 | 2.700 | 0.881 | 0.326 | TPP/BDP | 3.9/1.9 | RD-1 | 3 | 20 |
| 19 | CAB | 0.300 | Bu | 2.50 | 2.800 | 0.890 | 0.318 | TPP/BDP | 3.9/1.9 | RD-1 | 3 | 20 |
| 20 | CTA | 2.870 | — | 0 | 2.870 | 0.907 | 0.316 | TPP/BDP | 7.8/3.9 | RD-1 | 6 | 18 |
| 21 | CTA | 2.750 | — | 0 | 2.750 | 0.965 | 0.351 | TPP/BDP | 7.8/3.9 | RD-1 | 6.5 | 16 |

2-2. Protective Film with Optically Anisotropic Layer (Film No. 22)

A nematic liquid crystal compound and a chiral agent both shown below were mixed so as to show selective reflection at 290 to 310 nm, and a photopolymerization initiator was added thereto to prepare a cholesteric liquid crystal solution. The solution was applied to a biaxially stretched PET film, heated at 80° C. for 3 minutes, irradiated with UV light to induce crosslinking to form a retardation layer B having a thickness of 1.9 μm, Re of 2 nm, and Rth of 132 nm. The retardation layer B was stuck to a commercially available cellulose acylate film (TAC TD80U, from Fuji Photo Film Co., Ltd.) via a 15 μm thick acrylic adhesive layer. The biaxially stretched PET film was stripped off to give a laminate retarder having Re of 2 nm and Rth of 182 nm (film No. 22).

2-3. Protective Film with Optically Anisotropic Layer (Film No. 23)

A polyimide synthesized from 2,2'-bis(3,4-dicarboxyphenyl)hexafluoropropane and 2,2'-bis(trifluoromethyl)-4,4'-diaminobiphenyl was dissolved in cyclohexanone to prepare a 15% solution. The polyimide solution was applied to an 80 μm thick TAC base film (TAC TD80U, from Fuji Photo Film) and dried at 120° C. for 10 minutes to obtain a laminate composed of the TAC base film and a 5 μm thick non-liquid crystal polymer film. The laminate was transversely stretched 1.05 times by use of a tenter to obtain a protective film laminated with an optically anisotropic layer having a total thickness of 73 μm (film No. 23). The resulting film is a laminate of the stretched TAC film as an optical compensa- Nematic liquid crystal compound:

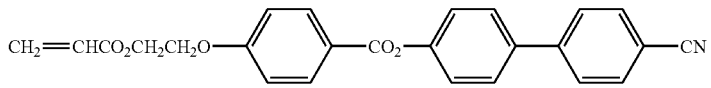

Chiral agent:

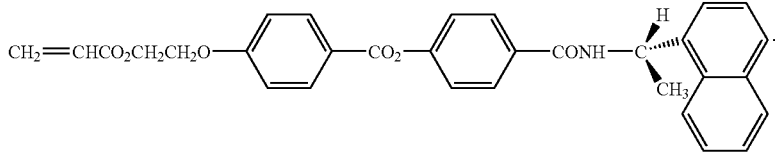

tory layer and the stretched non-liquid crystal polymer layer as an optical compensatory layer.

3. Preparation of Protective Film with Antireflection Function (Film Nos. 24 and 25)

3-1. Protective Film with Antireflection Function (Film No. 24)

(a) Preparation of Coating Composition for Light Scattering Sublayer:

A pentaerythritol triacrylate/pentaerythritol tetraacrylate mixture (PETA, from Nippon Kayaku) weighing 50 g was diluted with 38.5 g of toluene. To the solution was added 2 g of a polymerization initiator (Irgacure 184, from Ciba Specialty Chemicals) and dissolved by stirring. A coating film obtained by UV-curing the resulting solution had a refractive index of 1.51.

Separately, crosslinked polystyrene particles having an average particle size of 3.5 μm (SX-350, from Soken Chemical & Engineering Co., Ltd.; refractive index: 1.60) were dispersed in toluene in a Polytron dispersing device at 10000 rpm for 20 minutes to prepare a 30% dispersion-1. A 30% toluene dispersion-2 of crosslinked acrylic styrene particles having an average particle size of 3.5 μm (from Soken Chemical & Engineering; refractive index: 1.55) was prepared similarly.

To the above prepared monomer solution were added 1.7 g of the dispersion-1 and 13.3 g of the dispersion-2. Finally, 0.75 g of a fluorine-containing surface modifier (FP-1) and 10 g of a silane coupling agent (KBM-5103, from Shin-Etsu Chemical Co., Ltd.) were added. The mixture was filtered through a polypropylene filter having an opening size of 30 μm to prepare a coating composition for light scattering sublayer.

(b) Preparation of Coating Composition for Low Refractive Index Sublayer

In a reactor equipped with a stirrer and a reflux condenser were put 120 parts of methyl ethyl ketone, 100 parts of acryloyloxypropyltrimethoxysilane (KBM5103, from Shin-Etsu Chemical), and 3 parts of diisopropoxy(ethyl acetoacetato) aluminum and mixed. To the mixture was added 30 parts of ion exchanged water, followed by allowing the mixture to react at 60° C. for 4 hours, followed by cooling to room temperature, to obtain a sol solution-a. The weight average molecular weight was 1600, and 100% of the oligomeric and polymeric components had a molecular weight of 1,000 to 20,000. Gas chromatographic analysis revealed no residue of the starting acryloyloxypropyltrimethoxysilane A mixture of 13 g of a heat crosslinkable fluoropolymer having a refractive index of 1.42 (JN-7228, from JSR Corp.; solid content: 6%), 1.3 g of silica sol (MEK-ST of a different size, from Nissan Chemical Industries, Ltd.; average particle: of 45 nm; solid content: 30%), 0.6 g of the sol solution-a, 5 g of methyl ethyl ketone, and 0.6 g of cyclohexanone was stirred and filtered through a polypropylene filter having an opening size of 1 μm to prepare a coating composition for low refractive index sublayer.

(c) Preparation of Protective Film with Antireflective Layer

A 80 μm thick triacetyl cellulose film (TAC TD80U, from Fuji Photo Film) was unrolled and coated with the coating composition for functional layer (light scattering sublayer) using a 50 mm diameter microgravure roll having a gravure pattern of 180 lines/in and a depth of 40 μm and a doctor blade at a gravure rotation speed of 30 rpm and a film running speed of 30 m/min, dried at 60° C. for 150 seconds, irradiated with UV light at a power density of 400 mW/cm² and a dose of 250 ml/cm² using a 160 W/cm air-cooled metal halide lamp (from Eye Graphics Co., Ltd.) in an atmosphere purged with nitrogen to cure the coating layer to form a 6 μm thick light scattering sublayer. The film with the light scattering sublayer was once taken up in roll.

The film with the light scattering sublayer was unrolled. The coating composition for low refractive index sublayer was applied to the light scattering sublayer side of the film using a 50 mm diameter microgravure roll having a gravure pattern of 180 lines/in and a depth of 40 μm and a doctor blade at a gravure rotation speed of 30 rpm and a film running speed of 15 m/min, dried at 120° C. for 150 seconds and than at 140° C. for 8 minutes, irradiated with UV light at a power density of 400 mW/cm² and a dose of 900 ml/cm² using a 240 W/cm air-cooled metal halide lamp (from Eye Graphics Co., Ltd.) in an atmosphere purged with nitrogen to form a 100 μm thick low refractive index sublayer. The film was taken up in roll to prepare a protective film with antireflection function (film No. 24).

3-2. Protective Film with Antireflection Function (Film No. 25)

(a) Preparation of Coating Composition for Hard Coat Sublayer:

To 750.0 parts of trimethylolpropane triacetate (TMPTA, from Nippon Kayaku Co., Ltd.) were added 270.0 parts of polyglycidyl methacrylate having a weight average molecular weight of 3000, 730.0 g of methyl ethyl ketone, 500.0 g of cyclohexanone, and 50.0 g of a photopolymerization initiator (Irgacure 184, from Ciba Geigy, Japan) and stirred. The mixture was filtered through a polypropylene filter having an opening size of 0.4 μm to prepare a coating composition for hard coat sublayer.

(b) Preparation of Titanium Dioxide Dispersion

To 257.1 g of titanium dioxide particles containing cobalt and having been surface treated with aluminum hydroxide and zirconium hydroxide (MPT-129, available from Ishihara Sangyo Kaisha, Ltd.) were added 38.6 g of a dispersant shown below, and 704.3 g of cyclohexanone, and the mixture was dispersed in a Dynomill to prepare a titanium dioxide dispersion having a weight average particle size of 70 nm.

Dispersant:

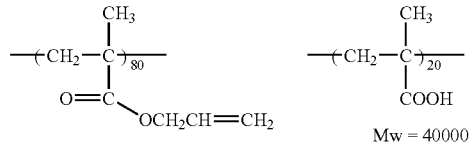

(c) Preparation of Coating Composition for Medium Refractive Index Sublayer

To 88.9 g of the titanium dioxide dispersion prepared above were added 58.4 g of a dipentaerythritol pentaacrylate/dipentaerythritol hexaacrylate mixture (DPHA, from Nippon Kayaku), 3.1 g of a photopolymerization initiator (Irgacure 907, from Ciba-Geigy Japan Ltd.), 1.1 g of a photosensitizer (Kayacure DETX, from Nippon Kayaku), 482.4 g of methyl ethyl ketone, and 1869.8 g of cyclohexanone. The mixture was thoroughly stirred and filtered through a polypropylene filter having an opening size of 0.4 μm to prepare a coating composition of medium refractive index sublayer.

(d) Preparation of Coating Composition for High Refractive Index Sublayer

To 586.8 g of the titanium dioxide dispersion prepared above were added 47.9 g of a dipentaerythritol pentaacrylate/dipentaerythritol hexaacrylate mixture (DPHA, from Nippon Kayaku), 4.0 g of a photopolymerization initiator (Irgacure 907, from Ciba-Geigy Japan Ltd.), 1.3 g of a photosensitizer (Kayacure DETX, from Nippon Kayaku), 455.8 g of methyl ethyl ketone, and 1427.8 g of cyclohexanone. The mixture was stirred and filtered through a polypropylene filter having an opening size of 0.4 µm to prepare a coating composition of high refractive index sublayer.

(e) Preparation of Coating Composition for Low Refractive Index Sublayer

A copolymer (P-1) shown below was dissolved in methyl isobutyl ketone in a concentration of 7%, and a silicone resin having a methacrylate group at the terminal (X-22-164C, from Shin-Etsu Chemical) and a photo radical generator (Irgacure 907) were added to the solution in amounts of 3% and 5%, respectively, based on the solid content of the solution to prepare a coating composition for low refractive index sublayer.

Copolymer (P-1):

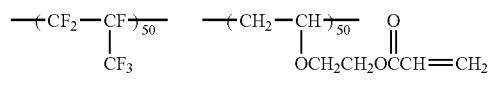

(copolymerization ratio: by mole)

(f) Preparation of Transparent Protective Film with Antireflective Layer

A 80 µm thick triacetyl cellulose film (TAC TD80U, from Fuji Photo Film) was coated with the coating composition for hard coat sublayer with a gravure coater. The coating layer was dried at 100° C. and irradiated with UV light from a 160 W/cm air-cooled metal halide lamp (from Eye Graphics) at a power density of 400 mW/cm$^2$ and a dose of 300 mJ/cm$^2$ while purging the atmosphere with nitrogen to control an oxygen concentration to 1.0 vol % or less. The coating layer thus cured to form an 8 µm thick hard coat sublayer.

Onto the hard coat sublayer were successively applied the coating composition for medium refractive index sublayer, the coating composition for high refractive index sublayer, and the coating composition for low refractive index sublayer using a gravure coater having three coating stations.

The medium refractive index sublayer drying conditions were 100° C. and 2 minutes. The UV irradiation was carried out using a 180 W/cm$^2$ air-cooled metal halide lamp (from Eye Graphics) at a power density of 400 mW/cm$^2$ and a dose of 400 mJ/cm$^2$ while purging the atmosphere to control the oxygen concentration to 1.0 vol % or less. The medium refractive index sublayer thus formed had a refractive index of 1.630 and a thickness of 67 nm.

The drying conditions for the high refractive index sublayer and the low refractive index sublayer were 90° C.×1 minute followed by 100° C.×1 minute. The UV irradiation for formation of both the high and the low refractive index sublayers was carried out using a 240 W/cm$^2$ air-cooled metal halide lamp (from Eye Graphics) at a power density of 600 mW/cm$^2$ and a dose of 600 mJ/cm$^2$ while purging the atmosphere to control the oxygen concentration to 1.0 vol % or less. After curing, the high refractive index sublayer had a refractive index of 1.905 and a thickness of 107 nm, and the low refractive index sublayer had a refractive index of 1.440 and a thickness of 85 nm. There was thus obtained a transparent protective film with antireflective layer (film No. 25).

Example 1

1. Preparation of Polarizing Plate 1

A 75 µm thick PVA film having a degree of polymerization of 2400 was swollen in water at 30° C. for 40 seconds. The swollen PVA film was immersed in an aqueous solution containing 0.06% iodine and 6% potassium iodide at 30° C. for 60 seconds and then in an aqueous solution containing 4% boric acid and 3% potassium iodide at 40° C. for 60 seconds. While the PVA film was being immersed, it was 5.2-fold stretched longitudinally. The water content of the PVA film immediately before stretching was 52%. The longitudinally stretched PVA film was then 1.1-fold stretched in the transverse direction using a tenter. As a result, the final length was 5 times the original length. The stretched film was dried at 50° C. for 4 minutes to obtain a polarizer (designated polarizer 1).

Each of film 1 (previously prepared cellulose acylate film) and a commercially available triacetyl cellulose film (TAC TD80U, from Fuji Photo Film) was immersed in a 1.5 mol/l aqueous solution of sodium hydroxide at 55° C. for saponification and rinsed thoroughly with water to remove sodium hydroxide. The film was then immersed in a 0.005 mol/l dilute sulfuric acid aqueous solution at 35° C. for 1 minute, immersed in water to thoroughly remove the dilute sulfuric acid aqueous solution, and dried well at 120° C.

Polarizer 1 was sandwiched between the saponified cellulose acylate film 1 and the saponified TD80U film via a polyvinyl alcohol adhesive and heated at 70° C. for 30 minutes. Three centimeters were trimmed off the edges with a cutter to yield polarizing plate 1 of roll form with an effective width of 1200 mm and a length of 50 m.

Sheets measuring 39 cm in width and 65 cm in length were cut out from appropriate parts of the resulting polarizing plate 1 and measured for in-plane phase difference Rpva at 1 cm interval with a near infrared phase difference measurement system KOBRA-WX100/IR (available from Oji Scientific Instruments). One of the cut sheets (polarizing plate 1) had a maximum Rpva of 973.0 nm and a minimum Rpva of 945.0 nm, giving a difference of 3.0%. The maximum-minimum Rpva differences of all the other cut sheets fell within a range of 3.0% and less. The maximum difference in Rpva measured at 1 cm interval in all the cut sheets was 6 nm/cm (see Table 3).

2. Preparation of Polarizing Plates 2 to 23 and 27 to 30

Polarizing plates 2 to 23 and 27 to 30 were prepared in the same manner as for polarizing plate 1, except for using a combination of the previously prepared protective film (film Nos. 2 to 25) and a commercially available cellulose acylate film as shown in Table 3. The film thickness and the degree of polymerization of the PVA film used to prepare the polarizer, the conditions of preparing the polarizer, and the like are shown in Table 2.

A plurality of 39 cm wide and 65 cm long cut sheets for each of the resulting polarizing plates were examined in the same manner as for polarizing plate 1. Table 3 shows the maximum Rpva, the minimum Rpva, the difference between the maximum and the minimum, and the maximum difference of Rpva per centimeter of the cut sheet that showed the largest maximum-minimum difference of all the cut sheets from the same polarizing plate.

The commercially available cellulose acylate films used in the polarizing plates were TAC TF80U and TAC TD80U, both from Fuji Photo Film, and KC80UVSFD from Konica Opto Corp.

All the polarizer and the two protective films were supplied in roll form and laminated and united together in a continuous manner with their longitudinal directions parallel to each other. Cellulose acylate films 1 to 19 that were to be used as a protective film of the polarizer on the liquid crystal cell side had their slow axis in parallel with the transmission axis of the polarizer. Protective films 20 to 23 having an optically anisotropic layer were adhered to one side of the polarizer on their transparent substrate side with a polyvinyl alcohol adhesive in such a manner that the slow axis of the transparent substrate and the transmission axis of the polarizer are parallel with each other.

3. Preparation of Polarizing Plate 31

A polarizing plate was prepared in the same manner as described above but by using a commercially available cellulose acylate film TD80U (from Fuji Photo Film) on both sides of a polarizer (see polarizing plate No. 31 shown in Table 3). A 25 μm thick acrylic adhesive layer was applied to one side of the polarizing plate, and a 90 μm thick stretched film described below was stuck thereto to obtain polarizing plate 31. The stretched film was prepared by transversely stretching a 100 μm thick norbornene resin film (ARTON, from JSR Corp.) using a tenter and had Re of 95 nm and Rth of 50 nm as calculated from the refractive indices measured with a phase difference measurement system KOBRA 21ADH (from Oji Scientific Instruments).

An acrylic adhesive was applied to the cell-facing side of polarizing plate 31, and a separate film was stuck to the adhesive layer. A protective sheet was stuck to the opposite side.

Comparative Example 1

Preparation of Polarizing Plates 24 to 26:

Polarizing plates 24 to 26 were prepared in the same manner as in Example 1, except that the step of swelling prior to dyeing was not performed and that the PVA film was not biaxially stretched but uniaxially stretched with the width unfixed. The combination of protective films are shown in Table 3.

TABLE 2

| Polarizing Plate No. | Polarizer | | | | | | | | | | | |
|---|---|---|---|---|---|---|---|---|---|---|---|---|
| | PVA (unstretched) | | Swelling Tank | | Iodine Aq. Solution | | Boric Acid Aq. Solution | | Stretch Ratio | | Final Longitudinal Stretch Ratio | Polarizer Thickness (μm) | Remark |
| | Thickness (μm) | Polymerization Degree | Temp. (°C.) | Time (sec) | Temp. (°C.) | Time (sec) | Temp. (°C.) | time (sec) | Length | Width | | | |
| 1 | 75 | 2400 | 30 | 40 | 30 | 60 | 40 | 60 | 5.2 | 1.1 | 5.0 | 30.0 | invention |
| 2 | 75 | 2400 | 30 | 40 | 30 | 75 | 40 | 70 | 5.3 | 1.2 | 5.0 | 28.5 | |
| 3 | 75 | 2400 | 30 | 40 | 30 | 70 | 40 | 65 | 5.2 | 1.15 | 5.0 | 29.0 | |
| 4 | 75 | 2400 | 30 | 40 | 30 | 70 | 40 | 65 | 5.2 | 1.15 | 5.0 | 29.0 | |
| 5 | 75 | 2400 | 30 | 40 | 30 | 65 | 40 | 65 | 5.2 | 1.1 | 5.0 | 29.5 | |
| 6 | 75 | 2400 | 30 | 40 | 30 | 60 | 40 | 60 | 5.3 | 1.2 | 5.1 | 26.0 | |
| 7 | 75 | 2400 | 30 | 40 | 30 | 60 | 40 | 60 | 5.3 | 1.2 | 5.1 | 26.0 | |
| 8 | 75 | 2400 | 30 | 40 | 30 | 65 | 40 | 65 | 5.3 | 1.2 | 5.1 | 25.5 | |
| 9 | 75 | 1700 | 30 | 40 | 30 | 75 | 40 | 70 | 5.3 | 1.2 | 5.1 | 24.5 | |
| 10 | 75 | 3600 | 30 | 40 | 30 | 75 | 40 | 70 | 5.3 | 1.2 | 5.0 | 28.5 | |
| 11 | 75 | 2400 | 30 | 40 | 30 | 65 | 40 | 65 | 5.3 | 1.2 | 5.1 | 25.6 | |
| 12 | 75 | 2400 | 30 | 40 | 30 | 80 | 40 | 75 | 5.3 | 1.25 | 5.0 | 27.8 | |
| 13 | 75 | 2400 | 30 | 40 | 30 | 65 | 40 | 65 | 5.2 | 1.1 | 5.0 | 29.5 | |
| 14 | 60 | 1700 | 30 | 40 | 30 | 70 | 40 | 70 | 5.2 | 1.2 | 5.0 | 17.8 | |
| 15 | 60 | 3600 | 30 | 40 | 30 | 60 | 40 | 60 | 5.2 | 1.1 | 5.0 | 20.1 | |
| 16 | 75 | 2400 | 30 | 40 | 30 | 55 | 40 | 60 | 5.3 | 1.2 | 5.1 | 26.7 | |
| 17 | 75 | 2000 | 30 | 40 | 30 | 55 | 40 | 60 | 5.2 | 1.1 | 5.0 | 30.5 | |
| 18 | 60 | 2400 | 30 | 40 | 30 | 75 | 40 | 75 | 5.2 | 1.2 | 5.0 | 16.8 | |
| 19 | 60 | 1700 | 30 | 40 | 30 | 60 | 40 | 60 | 5.2 | 1.1 | 5.0 | 19.4 | |
| 20 | 60 | 3600 | 30 | 40 | 30 | 60 | 40 | 60 | 5.2 | 1.1 | 5.0 | 20.2 | |
| 21 | 60 | 2400 | 30 | 40 | 30 | 70 | 40 | 70 | 5.2 | 1.2 | 5.0 | 17.8 | |
| 22 | 75 | 1700 | 30 | 40 | 30 | 55 | 40 | 60 | 5.3 | 1.1 | 5.1 | 26.4 | |
| 23 | 75 | 2000 | 30 | 40 | 30 | 55 | 40 | 60 | 5.2 | 1.1 | 5.0 | 30.4 | |
| 24 | 75 | 1000 | 30 | 40 | 30 | 65 | 40 | 65 | 5.3 | 1.2 | 5.1 | 25.4 | comparison |
| 25 | 75 | 5600 | 30 | 40 | 30 | 55 | 40 | 60 | 5.2 | 1.1 | 5.0 | 30.4 | |
| 26 | 75 | 1000 | 30 | 40 | 30 | 45 | 40 | 55 | 5.2 | 1.05 | 5.0 | 31.3 | |
| 27 | 75 | 2400 | 30 | 40 | 30 | 60 | 40 | 60 | 5.2 | 1.1 | 5.0 | 30.0 | invention |
| 28 | 75 | 2400 | 30 | 40 | 30 | 75 | 40 | 70 | 5.3 | 1.3 | 5.1 | 24.5 | |
| 29 | 60 | 2400 | 30 | 40 | 30 | 50 | 40 | 50 | 5.2 | 1.05 | 5.0 | 22.4 | |
| 30 | 60 | 2400 | 30 | 40 | 30 | 45 | 40 | 50 | 5.2 | 1.05 | 5.0 | 23.5 | |
| 31 | 60 | 2400 | 30 | 40 | 30 | 50 | 40 | 50 | 5.2 | 1.1 | 5.0 | 21.6 | |
| | 75 | 2400 | — | — | — | — | — | — | — | — | — | 25.6 | reference |

TABLE 3

| Polarizing Plate No. | Protective Film on Cell Side | | | | | Protective Film on Opposite Side | | PVA Polymerization Degree | Polarizer Thickness (μm) | Max. of Rpva | Min. of Rpva | Max-Min Difference (%) | Max. Rpva Difference (nm/cm) | Remark |
|---|---|---|---|---|---|---|---|---|---|---|---|---|---|---|
| | Film No. | Thickness (μm) | Re (nm) | Rth (nm) | Re/Rth | Film | Thickness (μm) | | | | | | | |
| 1 | 1 | 80 | 48 | 132 | 0.364 | TD80U | 80 | 2400 | 30.0 | 973 | 945 | 3.0 | 6.0 | Invention |
| 2 | 2 | 92 | 42 | 138 | 0.304 | TF80U | 80 | 2400 | 28.5 | 907 | 898 | 1.0 | 1.9 | |
| 3 | 3 | 92 | 33 | 136 | 0.243 | TD80U | 80 | 2400 | 29.0 | 932 | 914 | 2.0 | 4.3 | |
| 4 | 3 | 92 | 33 | 136 | 0.243 | film 24 | 80 | 2400 | 29.0 | 932 | 914 | 2.0 | 4.3 | |
| 5 | 4 | 92 | 51 | 130 | 0.392 | TF80U | 80 | 2400 | 29.5 | 895 | 856 | 4.6 | 8.9 | |
| 6 | 5 | 80 | 45 | 125 | 0.360 | KC80UVSFD | 80 | 2400 | 26.0 | 844 | 819 | 3.0 | 7.5 | |
| 7 | 5 | 80 | 45 | 125 | 0.360 | film 25 | 80 | 2400 | 26.0 | 840 | 819 | 2.6 | 5.2 | |
| 8 | 6 | 93 | 39 | 138 | 0.283 | TD80U | 80 | 2400 | 25.5 | 832 | 803 | 3.6 | 7.0 | |
| 9 | 7 | 93 | 24 | 140 | 0.171 | KC80UVSFD | 80 | 1700 | 24.5 | 700 | 686 | 2.0 | 4.3 | |
| 10 | 8 | 92 | 28 | 138 | 0.203 | TF80U | 80 | 3600 | 28.5 | 998 | 969 | 3.0 | 6.3 | |
| 11 | 9 | 92 | 70 | 220 | 0.318 | TD80U | 80 | 2400 | 25.6 | 823 | 806 | 2.0 | 3.9 | |
| 12 | 9 | 92 | 70 | 220 | 0.318 | film 24 | 80 | 2400 | 27.8 | 893 | 876 | 2.0 | 3.9 | |
| 13 | 9 | 92 | 70 | 220 | 0.318 | film 25 | 80 | 2400 | 29.5 | 948 | 929 | 2.0 | 3.9 | |
| 14 | 10 | 80 | 61 | 220 | 0.277 | TD80U | 80 | 1700 | 17.8 | 513 | 498 | 3.0 | 6.5 | |
| 15 | 11 | 92 | 72 | 260 | 0.277 | TF80U | 80 | 3600 | 20.1 | 709 | 683 | 3.8 | 7.5 | |
| 16 | 12 | 92 | 61 | 240 | 0.254 | TF80U | 80 | 2400 | 26.7 | 849 | 841 | 1.0 | 2.4 | |
| 17 | 13 | 92 | 70 | 195 | 0.359 | TD80U | 80 | 2000 | 30.5 | 942 | 915 | 3.0 | 6.1 | |
| 18 | 14 | 97 | 50 | 220 | 0.227 | TD80U | 80 | 2400 | 16.8 | 545 | 529 | 3.0 | 5.8 | |
| 19 | 15 | 92 | 71 | 241 | 0.295 | TF80U | 80 | 1700 | 19.4 | 565 | 543 | 4.0 | 8.2 | |
| 20 | 16 | 134 | 76 | 210 | 0.362 | KC80UVSFD | 80 | 3600 | 20.2 | 705 | 687 | 2.6 | 5.0 | |
| 21 | 17 | 91 | 61 | 262 | 0.233 | TD80U | 80 | 2400 | 17.8 | 578 | 561 | 3.0 | 6.2 | |
| 22 | 18 | 92 | 62 | 201 | 0.308 | KC80UVSFD | 80 | 1700 | 26.4 | 775 | 739 | 4.8 | 9.0 | |
| 23 | 19 | 93 | 50 | 242 | 0.207 | TF80U | 80 | 2000 | 30.4 | 990 | 958 | 3.4 | 7.1 | |
| 24 | 3 | 92 | 33 | 136 | 0.243 | TD80U | 80 | 1000 | 25.4 | 672 | 584 | 15.0 | 15.0 | comparison |
| 25 | 10 | 80 | 61 | 220 | 0.277 | TD80U | 80 | 5600 | 30.4 | 1149 | 958 | 20.0 | 40.0 | |
| 26 | 16 | 134 | 76 | 210 | 0.362 | TD80U | 80 | 1000 | 31.3 | 806 | 720 | 12.0 | 28.0 | |
| 27 | 20 | 90 | 36 | 175 | 0.206 | TD80U | 80 | 2400 | 30.0 | 973 | 945 | 3.0 | 6.1 | Invention |
| 28 | 21 | 89 | 36 | 177 | 0.203 | TF80U | 80 | 2400 | 24.5 | 792 | 772 | 2.6 | 5.0 | |
| 29 | 22 | 88 | 2 | 182 | 0.011 | TD80U | 80 | 2400 | 22.4 | 727 | 706 | 3.0 | 6.3 | |
| 30 | 23 | 73 | 60 | 200 | 0.300 | TD80U | 80 | 2400 | 235 | 762 | 740 | 3.0 | 6.3 | |
| 31 | TD80U | 80 | 2 | 50 | 0.040 | TD80U | 80 | 2400 | 21.6 | 699 | 680 | 2.8 | 5.8 | |
| commercially available polarizing plate | | | | | | | | 2400 | 25.6 | 868 | 806 | 7.6 | 18.2 | Reference |

Refractive Index Measurement:

Spectral reflectance of the functional layer side of the polarizing plates at an incidence angle of 5° was measured in a wavelength region of from 380 to 780 nm with a spectrophotometer (from JASCO Corp.) equipped to obtain an integrating sphere-average reflectance at wavelengths from 450 to 650 nm. Polarizers 4 and 12 having film 26, the transparent protective film with antireflective layer, had an average reflectance of 2.3%, while polarizers 7 and 13 having film 27, the transparent protective film with antireflective layer, had an average reflectance of 0.4%. Before the measurement, the protective sheet on the transparent protective film with antireflective layer had been stripped off.

Example 2

An LCD-TV of VA mode (LC-30AD1, manufactured by Sharp Corp.) was stripped of the polarizing plates on the viewing side and the backlight side and instead provided with polarizing plates selected from polarizing plates prepared in Example 1 and a commercially available polarizing plate having no viewing angle compensating film (HLC2-5618, from Sanritzu Corp.) according to the combination shown in Table 4. The polarizing plate on the viewing side was disposed with its absorption axis parallel with the horizontal direction of the LCD panel, and that on the backlight side was disposed with its absorption axis coinciding with the vertical direction of the panel. The polarizing plates were stuck with their adhesive side facing the liquid crystal cell.

After the releasable protect sheet was stripped off, the viewing angle (an angle giving a contrast ratio of 10 or more without gradient reversal in black display) of the LCD-TV was measured with a contrast meter (EZContrast 160D, manufactured by ELDIM) in eight scales from black (L1) to white (L8) display. The LCD-TV exhibited satisfactory viewing angle characteristics with any of the polarizing plates tested.

The LCD-TV (screen size: 30 in (ca. 39 cm×65 cm)) assembled as described above using the polarizing plate(s) of Example 1 was evaluated for screen image uniformity with the backlight lit, and rated as follows. The results obtained are shown in Table 4.

Rating of Screen Image Uniformity:

| | |
|---|---|
| AA: | Very good. |
| A: | A closer look reveals slight, streaky mottling. |
| B: | Streaky mottling observed. |
| C: | Streaky mottling observed clearly. |

Comparative Example 2

Each of the polarizing plates 24 to 26 prepared in Comparative Example 1 was attached to the VA mode LCD panel in the same manner as in Example 2 and evaluated for viewing angle characteristics and screen image uniformity in the same manner as in Example 2. The results obtained are shown in Table 4. Any of the comparative polarizing plates was revealed inferior to the polarizing plates of the present invention in viewing angle compensation performance and in screen image uniformity, suffering from darkening in part of the screen.

TABLE 4

| Polarizing Plate No. | | Image Uniformity on LCD | Viewing Angle Compensation Performance | Remark |
|---|---|---|---|---|
| Backlight Side | Viewing Side | | | |
| 1 | 1 | AA | good | invention |
| 2 | 2 | AA | good | |
| 3 | 3 | AA | good | |
| 5 | 5 | A | good | |
| 6 | 6 | AA | good | |
| 8 | 8 | AA | good | |
| 9 | 9 | AA | good | |
| 10 | 10 | AA | good | |
| 11 | HLC2-5618 | AA | good | |
| 14 | | AA | good | |
| 15 | | AA | good | |
| 16 | | AA | good | |
| 17 | | AA | good | |
| 18 | | AA | good | |
| 19 | | A | good | |
| 20 | | AA | good | |
| 21 | | AA | good | |
| 22 | | A | good | |
| 23 | | AA | good | |
| 24 | 24 | B | no good | comparison |
| 25 | 25 | C | no good | |
| 26 | 26 | B | no good | |
| 29 | 31 | AA | good | invention |
| 30 | HLC2-5618 | AA | good | |
| HLC2-5618 | HLC2-5618 | C | no good | reference |

Example 3

A polyimide film was formed on a pair of glass substrates having an ITO electrode as an alignment layer, which was rubbed. The two glass substrates were assembled with the alignment layers facing each other and the rubbing directions of the two alignment layers being parallel to each other, thereby to make a cell having a cell gap of 5.7 µm. The cell was filled with a liquid crystal compound having Δn of 0.1396 (ZLI1132, from Merck Ltd.) to make a 30-in. (ca. 39 cm×65 cm) liquid crystal cell of bend alignment.

A pair of polarizing plates 27 or a pair of polarizing plates 28 prepared in Example 1 were stuck to both sides of the liquid crystal cell with the optically anisotropic layer facing the cell substrate and with the rubbing direction of the cell and that of the facing optically anisotropic layer being parallel and opposite to each other.

With the backlight on, the resulting LCD was observed. It was proved that the LCDs using the polarizing plates of the present invention showed small changes in contrast and color with viewing angle.

Furthermore, the same LCD panels were evaluated for image uniformity according to the following rating system. The results are shown in Table 5.

Rating of Screen Image Uniformity:

| | |
|---|---|
| AA: | Very good. |
| A: | A closer look reveals slight, streaky mottling. |
| B: | Streaky mottling observed. |
| C: | Streaky mottling observed clearly |

Comparative Example 3

Each of the polarizing plates 24 to 26 prepared in Comparative Example 1 was disposed on an liquid crystal cell in the same manner as in Example 3. After the releasable protect sheet was stripped off, the viewing angle (an angle giving a contrast ratio of 10 or more without gradient reversal in black display) of the LCD-TV was measured with a contrast meter (EZContrast 160D, manufactured by ELDIM) in eight scales from black (L1) to white (L8) display. All the comparative polarizing plates were revealed inferior to the polarizing plates of the present invention in viewing angle compensation performance and in screen image uniformity, suffering from darkening in part of the screen.

TABLE 5

| Polarizing Plate No. | | Image Uniformity on LCD | Viewing Angle Compensation Performance | Remark |
|---|---|---|---|---|
| Backlight Side | Viewing Side | | | |
| 24 | 24 | B | no good | comparison |
| 25 | 25 | C | no good | |
| 26 | 26 | B | no good | |
| 27 | 27 | AA | good | invention |
| 28 | 28 | AA | good | |
| HLC2-5618 | HLC2-5618 | B | no good | reference |

This application is based on Japanese Patent application JP 2004-276108, filed Sep. 22, 2004, the entire content of which is hereby incorporated by reference, the same as if set forth at length.

The invention claimed is:

1. A polarizing plate comprising a polarizer comprising polyvinyl alcohol and a protective film on at least one side of the polarizer, the polarizer having a difference of 5.0% or smaller between maximum and minimum of an in-plane phase difference Rpva thereof in any area thereof measuring 39 cm wide and 65 cm long, wherein the polarizer is biaxially stretched and produced by a process comprising the steps of swelling a polyvinyl alcohol film and stretching the swollen polyvinyl alcohol film.

2. The polarizing plate according to claim 1, wherein a difference of the in-plane phase difference Rpva between any two points 1 cm apart is 10 nm or smaller.

3. The polarizing plate according to claim 1, wherein the protective film on one side of the polarizer has a front retardation value Re(590) and a thickness direction retardation value Rth(590), both at a wavelength of 590 nm, satisfying formulae (1) and (2), respectively:

$$20 \text{ nm} \leq Re(590) \leq 200 \text{ nm} \quad (1)$$

$$70 \text{ nm} \leq Rth(590) \leq 400 \text{ nm} \quad (2).$$

4. The polarizing plate according to claim 3, wherein the protective film on one side of the polarizer has a ratio of the Re(590) to the Rth(590) of 0.1 to 0.8.

5. The polarizing plate according to claim 1, wherein the protective film on one side of the polarizer is a cellulose acylate film containing, as a main polymer component, a cellulose mixed fatty acid ester having an acetyl group and an acyl group containing at least three carbon atoms substituting the hydroxyl groups of cellulose, the cellulose mixed fatty acid ester satisfying formulae (3) and (4):

$$2.0 \leq A+B \leq 3.0 \quad (3)$$

$$0 < B \quad (4)$$

wherein A is a degree of substitution by an acetyl group; and B is a degree of substitution by an acyl group having at least three carbon atoms.

6. The polarizing plate according to claim 5, wherein the acyl group having at least three carbon atoms is a butanoyl group.

7. The polarizing plate according to claim 5, wherein the acyl group having at least three carbon atoms is a propionyl group.

8. The polarizing plate according to claim 1, wherein the protective film on one side of the polarizer is a film of a cellulose acylate having acyl groups containing at least two carbon atoms and satisfying formulae (5) and (6):

$$2.0 \leq DS2+DS3+DS6 \leq 3.0 \quad (5)$$

$$DS6/(DS2+DS3+DS6) \geq 0.315 \quad (6)$$

wherein DS2, DS3, and DS6 represent the degree of substitution of the hydroxyl groups at the 2-position, 3-position and 6-position, respectively, of a glucose unit constituting cellulose by the acyl group.

9. The polarizing plate according to claim 8, wherein the acyl group is an acetyl group.

10. The polarizing plate according to claim 1, wherein the protective film on one side of the polarizer contains at least one of a plasticizer, an ultraviolet absorber, a release agent, a dye, and a matting agent.

11. The polarizing plate according to claim 1, wherein the protective film on one side of the polarizer contains at least one retardation developing agent selected from a rod-like compound and a discotic compound.

12. The polarizing plate according to claim 1, wherein the protective film on one side of the polarizer comprises a polymer film and an optically anisotropic layer.

13. The polarizing plate according to claim 1, which further comprises at least one of a hard coat layer, an antiglare layer, and an antireflective layer on a protective film disposed on the other side of the polarizer.

14. The polarizing plate according to claim 1, further comprising a phase difference film stuck to the protective film on one side of the polarizer via an adhesive.

15. A liquid crystal display comprising a liquid crystal cell and a polarizing plate, the polarizing plate being the polarizing plate according to claim 1, wherein the protective film on one side of the polarizing plate faces the liquid crystal cell.

* * * * *